US010698151B2

(12) United States Patent
Hamilton et al.

(10) Patent No.: US 10,698,151 B2
(45) Date of Patent: Jun. 30, 2020

(54) TEXTURED SURFACES FOR DISPLAY APPLICATIONS

(71) Applicant: Corning Incorporated, Corning, NY (US)

(72) Inventors: James Patrick Hamilton, Horseheads, NY (US); Karl William Koch, III, Elimira, NY (US); Aize Li, Painted Post, NY (US); Jonathan Michael Mis, Horseheads, NY (US); Vasudha Ravichandran, Painted Post, NY (US); Nicholas James Smith, Port Matilda, PA (US); Christine Coulter Wolcott, Horseheads, NY (US); Ruchirej Yongsunthon, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/385,740

(22) Filed: Apr. 16, 2019

(65) Prior Publication Data

US 2019/0243052 A1 Aug. 8, 2019

Related U.S. Application Data

(62) Division of application No. 15/792,167, filed on Oct. 24, 2017, now Pat. No. 10,302,841, which is a
(Continued)

(51) Int. Cl.
*F21V 7/04* (2006.01)
*F21V 8/00* (2006.01)
(Continued)

(52) U.S. Cl.
CPC ............ *G02B 6/0036* (2013.01); *C03C 15/00* (2013.01); *C03C 17/32* (2013.01); *G02B 5/0221* (2013.01);
(Continued)

(58) Field of Classification Search
CPC ... G02B 6/0068; G02B 6/0055; G02B 6/0061
(Continued)

(56) References Cited

U.S. PATENT DOCUMENTS

| 3,374,130 A | 3/1968 | Junge et al. |
| 4,377,723 A | 3/1983 | Dalal |

(Continued)

FOREIGN PATENT DOCUMENTS

| CN | 101191860 A | 6/2008 |
| CN | 101393274 A | 3/2009 |

(Continued)

OTHER PUBLICATIONS

Barboux et al. "Paradoxical crystalline morphology of frosted glass"; Journal of Non-Crystalline Solids 345&346 (2004) 137141.
(Continued)

*Primary Examiner* — Ahshik Kim

(57) ABSTRACT

A substrate with a textured surface is disclosed. The substrate may be, for example, a light emitter comprising a light guide, for example a backlight element for use in a display device, wherein a surface of the light guide, for example a glass substrate, is configured to have a textured surface with a predetermined RMS roughness and a predetermined correlation length of the texture. A plurality of light scatter suppressing features can be provided on the textured surface. Textured surfaces disclosed herein may be effective to reduce electrostatic charging of the substrate surface. Methods of producing the textured surface are also disclosed.

17 Claims, 23 Drawing Sheets

Related U.S. Application Data division of application No. 15/105,025, filed as application No. PCT/US2014/070771 on Dec. 17, 2014, now Pat. No. 9,952,375.

(60) Provisional application No. 61/918,276, filed on Dec. 19, 2013.

(51) Int. Cl.
*C03C 15/00* (2006.01)
*G02B 5/02* (2006.01)
*C03C 17/32* (2006.01)
*G02B 1/118* (2015.01)

(52) U.S. Cl.
CPC ......... *G02B 5/0278* (2013.01); *G02B 5/0294* (2013.01); *G02B 6/0061* (2013.01); *G02B 6/0065* (2013.01); *G02B 6/0068* (2013.01); *C03C 2218/119* (2013.01); *G02B 1/118* (2013.01)

(58) Field of Classification Search
USPC ....................................................... 362/613
See application file for complete search history.

(56) References Cited

U.S. PATENT DOCUMENTS

| | | | |
|---|---|---|---|
| 4,664,748 A | 5/1987 | Ueno et al. | |
| 4,761,244 A | 8/1988 | Scardera et al. | |
| 4,921,626 A | 5/1990 | Rhodenbaugh | |
| 5,091,053 A | 2/1992 | Blonder et al. | |
| 5,242,544 A | 9/1993 | Itoh et al. | |
| 5,289,350 A | 2/1994 | Gehrt | |
| 5,415,731 A | 5/1995 | Kim | |
| 5,528,709 A | 6/1996 | Koike et al. | |
| 5,549,212 A | 8/1996 | Kanoh et al. | |
| 5,792,327 A | 8/1998 | Belscher et al. | |
| 6,045,715 A | 4/2000 | Spierings et al. | |
| 6,199,995 B1 | 3/2001 | Umemoto et al. | |
| 6,322,860 B1 | 11/2001 | Stein et al. | |
| 6,337,029 B1 | 1/2002 | Hardy et al. | |
| 6,350,506 B2 | 2/2002 | Dickinson | |
| 6,420,647 B1 | 7/2002 | Ji et al. | |
| 6,471,880 B1 | 10/2002 | Trouve et al. | |
| 6,538,195 B1 | 3/2003 | Shi et al. | |
| 6,807,824 B1 | 10/2004 | Miwa | |
| 7,052,627 B1 | 5/2006 | Kezuka et al. | |
| 7,685,840 B2 | 3/2010 | Allaire et al. | |
| 7,810,980 B2 | 10/2010 | Kanade et al. | |
| 7,818,980 B2 | 10/2010 | Burdette et al. | |
| 7,997,781 B2 | 8/2011 | Kanade et al. | |
| 8,089,580 B2 | 1/2012 | Kanade et al. | |
| 8,152,348 B2 | 4/2012 | Kanade et al. | |
| 8,598,771 B2 | 12/2013 | Carlson et al. | |
| 9,120,698 B2 | 9/2015 | Park | |
| 9,952,375 B2 | 4/2018 | Nolan et al. | |
| 2005/0243561 A1 | 11/2005 | Etori | |
| 2007/0116913 A1 | 5/2007 | Kimura et al. | |
| 2007/0182882 A1 | 8/2007 | Etori | |
| 2007/0215835 A1 | 9/2007 | Kikuyama et al. | |
| 2009/0316388 A1 | 12/2009 | Chang | |
| 2011/0007512 A1 | 1/2011 | Kanade et al. | |
| 2011/0013387 A1 | 1/2011 | Kanade et al. | |
| 2011/0267697 A1 | 11/2011 | Kohli et al. | |
| 2012/0051092 A1 | 3/2012 | Kanade et al. | |
| 2012/0051093 A1 | 3/2012 | Kanade et al. | |
| 2012/0275745 A1 | 11/2012 | Logunov | |
| 2012/0300304 A1 | 11/2012 | Gollier et al. | |
| 2013/0107370 A1 | 5/2013 | Lander et al. | |
| 2013/0133744 A1 | 5/2013 | Etienne et al. | |
| 2013/0214456 A1 | 8/2013 | Kanade | |
| 2013/0271840 A1 | 10/2013 | Dillon | |
| 2013/0272014 A1 | 10/2013 | Logunov et al. | |
| 2013/0279176 A1 | 10/2013 | Kanade et al. | |
| 2013/0323468 A1 | 12/2013 | Myers et al. | |
| 2014/0043859 A1 | 2/2014 | Yang et al. | |
| 2014/0092623 A1 | 4/2014 | Logunov et al. | |
| 2014/0146564 A1 | 5/2014 | Im et al. | |
| 2014/0183571 A1 | 7/2014 | Lee et al. | |
| 2015/0277023 A1 | 10/2015 | Etienne et al. | |
| 2017/0052288 A1 | 2/2017 | Ludemann et al. | |

FOREIGN PATENT DOCUMENTS

| | | |
|---|---|---|
| CN | 101939266 A | 1/2011 |
| JP | 03215218 B2 | 10/2001 |
| JP | 2010534178 A | 11/2010 |
| JP | 2014041284 A | 3/2014 |
| JP | 2014049243 A | 3/2014 |
| KR | 2009103731 A | 10/2009 |
| WO | 9933910 A1 | 7/1999 |
| WO | 2012058084 A2 | 5/2012 |

OTHER PUBLICATIONS

Barrett et al.; "The Determination of Pore Volume and Area Distributions in Porous Substances. I. Computations from Nitrogen Isotherms" ; J. Am. Chem. Soc., 1951, 73 (1); pp. 373-380.
English Translation of CN201480075859.7 Office Action dated Apr. 19, 2018; 6 pages; Chinese Office Patent.
European Patent Office; International Search Report and Written Opinion for International Application No. PCT/US2014/070771; dated Jul. 20, 2015; pp. 1-15.
Japanese Patent Application No. 2016541554 Office Action dated Nov. 14, 2018; 3 pages; Japanese Patent Office.
Kim et al. "Analysis of Thermo-physical and optical properties of a diffuser using PET/PC/PBT copolymer in LCD blacklight units" Displays, 26 (2005.
Lin et al. "Flatness and microstructure of a light guide plate fabricated by Microinjection Molding" Polymer Engineering and Science, 2013.
P. Beckmann and A. Spizzichino, "The scattering of electromagnetic waves from rough surfaces" Pergamon, New York, 1963).
Sahraei et al.; "Optimum feature size of randomly textured glass substrates for maximum scattering inside thin-film silicon solar cells" ; Proc. of SPIE, vol. 8981 (2014); pp. 89811D-1-89811D-8.
Taiwanese Patent Application No. 108124044; Notice of Allowance and Search Report dated Nov. 19, 2019; Taiwan Patent Office; 3 pgs.

TEXTURED SURFACES FOR DISPLAY APPLICATIONS

CROSS-REFERENCE TO RELATED APPLICATIONS

This application is a divisional of U.S. patent application Ser. No. 15/792,167 filed on Oct. 24, 2017 which is a divisional of U.S. patent application Ser. No. 15/105,025 filed Jun. 16, 2016 which claims the benefit of priority under 35 U.S.C. § 371 of International Patent Application Serial No. PCT/US14/70771, filed Dec. 17, 2014, which claims the benefit of priority under 35 U.S.C. § 119 of U.S. Provisional Application Ser. No. 61/918,276 filed on Dec. 19, 2013, the content of which is relied upon and incorporated herein by reference in their entirety.

BACKGROUND

Field

The present invention relates generally to textured surfaces for display applications. For example, a textured surface as disclosed herein may be used in a light emitter (e.g., a backlight for certain display devices), the light emitter comprising a substrate with a textured surface on one or both major surfaces of the substrate that can operate as a light guide, and processes for making the light emitter. The light guide may include a pattern of discrete dots of material deposited thereon to control the light output of the light emitter. Textured surfaces disclosed herein may also be used as projections surfaces for viewing images from a projecting image source. In certain embodiments micro-replication (nano-replication) techniques may be used to efficiently and economically produce the textured surface. Textured surfaces disclosed herein may even be used to mitigate electrostatic charging for display glass substrates during certain manufacturing processes.

Technical Background

Conventional components used to produce diffused light have included diffusive structures, including polymer light guides and diffusive films which have been employed in a number of applications in the display industry. These applications include bezel-free television systems, liquid crystal displays (LCDs), electrophoretic displays (EPD), organic light emitting diode displays (OLEDs), plasma display panels (PDPs), micro-electromechanical structures (MEMS) displays, electronic reader (e-reader) devices, and others.

The desire for thinner, lighter and more energy efficient displays have led to the development of so-called transparent displays. Long a staple of science fiction, transparent displays are now being commercially implemented in several variations, including vending machine doors, freezer doors, retail advertising, augmented reality screens, heads-up displays in the automotive industry, smart windows for offices, portable consumer electronics, and security monitoring.

Unfortunately, transparent displays are susceptible to several poor performance characteristics. In actuality, currently available displays only partially transmit and reflect light, thus the contrast ratio of the display is greatly limited. Commercially available transparent displays typically offer only about 15% transmission, and performance is even lower in reflection mode.

For many practical applications, a transparent display requires the support of backplane illumination (via a transparent back light element). To maintain transparency, the back light needs to be fully transparent in an OFF-state and fully illuminated in an ON-state. Back lights having a frosted appearance are generally unacceptable. Additionally, the use of a transparent back light necessarily eliminates the use of a conventional reflective medium. Existing technology for providing backplane illumination are not satisfactorily meeting certain cost and performance requirements of the marketplace for transparent displays.

Other components of display devices, particularly the substrates forming the display panel itself, may present problems during manufacture of the thin film devices formed on at least one of the substrates. For example, triboelectrification can impede the ability to remove the substrate from surfaces in contact with the substrate, which can lead to breakage of the substrate and particle generation in some cases. This can be particularly troublesome for substrates, such as glass substrates, produced via processes that result in extremely smooth surfaces on the substrate.

SUMMARY

Conventional transparent display systems, such as transparent and semi-transparent LCD televisions, are commercially available for digital signage and advertising applications. These display systems are semi-transparent in the OFF-state (i.e., when no image is being commanded by the associated electronics driving the LCD elements). To maintain the semi-transparent characteristics, these conventional display systems do not employ an opaque optical light emitter to produce light. Instead, these display systems use background ambient light to illuminate the LCDs in the ON-state (i.e., when the associated electronics is commanding an image), a so-called "white box" approach. In the white box approach, a large "box", such as a food vending machine, includes one or more reflective interior surfaces, for example surfaces coated with white paint, and the box is brightly lighted from within. The window to the box, for example a door, comprises a transparent display panel, wherein the brightly lighted box serves as a light source for the display window. Thus, one can see through the display and view objects (such as merchandise, etc.) behind the display panel. Concurrently, the viewer can also receive visual information on certain portions or the entirety of the display panel, which in a commercial application might be related to the merchandise behind the display panel.

As discussed above, a significant issue with current "transparent" display systems is that they are not particularly transparent. In fact, measurements have shown they exhibit only about a 15% transmission ratio. Thus, a relatively high level of ambient light may be needed in proximity to the display panel, which might not always be feasible or even desirable for any number of reasons. The result is an array of problems related to uniformity of image quality across the display, such as non-uniformity in color, contrast ratio, etc.

Thus, in accordance with one or more embodiments presented herein, a light emitter is described. As used herein, the term light emitter refers generically to a device configured to provide illumination. The light emitter may, for example, include a back light element for use in a display device, or the light emitter may be configured to provide general illumination such as illumination for a room or vehicle. The light emitter includes a light guide into which light can be coupled by one or more slight sources and through which the coupled light propagates. The light guide is generally a substrate comprising opposing major surfaces. As used herein, the term substrate refers generally to a plate-like substrate and which in some embodiments is suitable for use as a light guide. The substrate may be planar, or the substrate may, in some examples, have a wedge-like shape. Nevertheless, the substrate generally has two opposing major surfaces bounded by edge surfaces. The major surfaces may be planar and parallel, or the major surfaces may be planar and non-parallel. In some embodiments the substrate may be curved, for example as used in a curved display device. For light emitter applications at least one of the opposing major surfaces includes a surface texture configured to scatter at least a portion of the light propagating within the light guide. The surface texture is specifically configured to render the light guide visually transparent, without appreciable haze, thereby making the light guide particularly useful in the construction of a back light element for use in a transparent display device. The configuration of the surface texture also provides excellent viewing angle performance.

The light emitter, for example a back light element comprising a light guide, may be positioned behind a transparent display panel relative to a viewer of the display panel. Light may be coupled into the light guide along one or more edge surfaces of the substrate, and/or along one or more borders thereof, wherein the borders represent portions of the major surfaces proximate the edge surfaces. The light propagates in a waveguide fashion within the light guide, for example by total internal reflection, and is incident on the light scattering portion of the at least one major surface. Thus, light propagating through the light guide and which light may be incident on a textured surface of the substrate may be scattered out of the light guide to illuminate the display panel of the display device, such as an LCD display panel. The light emitter described herein can function as an improved light source for the LCD elements of a transparent display system over currently available alternatives by eliminating the need for complex scattering and turning films, which decrease the light output from conventional back light elements. In addition, the surface texture produces a level of haze low enough to achieve a high level of back light element transparency when portions of the display system are in the OFF-state. In examples, the haze may be equal to or less than 6%, equal to or less than 4%, equal to or less than 2% or equal to or less than 1%, it being understood that haze is bounded at its minimum by 0%. In most cases, a haze equal to or less than 1% is desired. As used herein, the term transparent, or variations thereof, is intended to convey visual transparency (for example over a wavelength range from about 400 nm to about 700 nm), wherein an object placed behind the transparent element can be distinctly seen by an observer from the opposite side of the transparent element, the transparent element being disposed on the sight line between the observer and the object.

In use as a back light element, the light emitter can provide additional lighting output over conventional back light elements to increase the brightness, functionality and the viewing angle of a transparent display system. In other uses, the scattering structure of the light guide and its use in a light emitter can be employed in a variety of applications as a source of light, including but not limited to architectural lighting, automotive lighting, decorative lighting and the like. Accordingly, the light emitter in various aspects described herein is not limited to a display back light element, but may be used in a variety of different applications where a source of light may be needed, the foregoing list naming but a few. Moreover, display applications may include devices extending beyond televisions, computer displays, laptop, tablet and phone displays and can include, for example, sky lights, virtual reality goggles or other wearable display devices.

In the context of a display device, the addition of a visually transparent back light element can eliminate the need for a reflective medium in the transparent display, which eliminates a major disadvantage of reflective-type displays). The transparent display may therefore work solely in transmission, eliminating image distortion from glare and reflection. Another advantage to eliminating the reflective medium is in providing an improved color balance. By working in transmission-only mode, the transparent display device can have an improved image rendering quality.

Still further, the light emitters described herein can provide improvements in color fidelity by enabling the tuning of light coupled from the light source into the light guide. When such tuning includes selecting colors to mix with the natural color shade of the transparent display device, the color fidelity of the display device is improved. Additionally, in one or more further embodiments, the light coupled into the light guide may be adaptive (by tuning the light sources, e.g., controlling LEDs of different colors) to enhance scene colors based on instantaneous color content.

The primary advantage of an etching approach according to the present disclosure for making textured surfaces, such as textured surfaces for display applications, and particularly when the substrate is glass, is that it can be accomplished with only wet solutions using chemicals commonly available in industrial quantities. The use of commonly available chemicals can significantly lower the cost of the process compared with other techniques, such as abrasive etch, etching particles, and/or aqueous etching cream processes. The solutions required for the etching techniques disclosed herein may also not include a common but very hazardous hydrofluoric acid component, which results in a much safer etch mixture for production both in terms of worker safety and environmental quality. The process can produce a narrow distribution of lateral feature sizes when compared with some other processes.

In architectural and aesthetic applications, light emitters as described herein may be employed for both indoor and outdoor lighting, both functional and decorative. For example, the light emitter may be used as a skylight, where the textured glass would be relatively unaffected by weather conditions. The advantages of using a substantially transparent light emitter as a skylight include high resistance to discoloration from weathering, the ability to provide artificial light (not simply channel sunlight) in low lighting conditions, such as at night or on cloudy days to provide additional lighting. The transparency of a light emitter employed as a skylight can allow viewing the overhead sky during daylight hours, yet provides illumination to the underlying space during low light or evening hours. Moreover, an advantage of light emitters described in certain examples herein is the ability to provide uniform light output across a surface thereof, if so desired, by the application of light scatter suppressing features on the textured surface of the light guide. As the name implies, such light scattering features function to suppress or completely eliminate scattering of incident light at the feature location. In some embodiments, such as decorative applications, light output from the light emitter may be intentionally configured to be non-uniform, either by eliminating the light scatter suppressing features, or by the intentional placement of a pattern of the light scatter suppressing features so as to produce a desired effect. The range of such designed patterns is limited only by the designer's imagination.

In yet another application, certain transparent substrates can be utilized in a projection mode, wherein a projection system projects an image onto a visually transparent substrate such that the transparent substrate functions as a projection screen. In such applications the projected image is readily viewable on the transparent substrate, and yet the substrate is simultaneously substantially transparent so that the background behind the screen is clearly visible. Ordinarily, such an image projected onto a transparent substrate, for example a glass plate not configured to scatter light, will not be readily visible at the transparent substrate. Instead, light rays from the projection system will be substantially transmitted through the substrate making it difficult if not impossible to view the projected image on the substrate. Textured substrates as described herein, however, are capable of providing sufficient scattering of the incident light to make the image visible, while maintaining the substrate essentially transparent to the viewer without discernible haze. Touch capability can be added to the projection screen by adding touch-functional layers to the projection screen in a manner as is known in the art. Such touch functionality can be accomplished by using transparent oxide materials that do not significantly affect the transparency of the projection screen.

In still other applications, substrates utilizing textures disclosed herein can be positioned in front of but spaced apart from an image device, for example a large screen television device or a computer monitor, as an overlay. Again, touch capability can be incorporated with the substrate which can be electronically coordinated with the displayed image, thereby adding touch capability to the image device that was not previously present. The substrate can be entirely structurally disconnected from the image device, although electrical communication may be required. Accordingly, a controller can be used to relate the touch (contact) location on the overlay panel with a particular location on the display panel image being displayed immediately behind that touch location, and then initiate a predetermined action.

Accordingly, the light emitter for these and other uses, and more particularly the light guide comprising the light emitter, can, in addition to being transparent (e.g. exhibit minimal haze), be configured to be suitably rigid and may, according to some examples, have a bulk modulus in a range equal to or greater than 10 gigaPascals (GPa). For example, the bulk modulus can range from about 10 GPa to about 445 GPa. For example, in a range from about 30 GPa to about 250 GPa, or in a range from about 30 GPa to about 100 GPa. Glass, for example, has a bulk modulus in a range from about 35 to about 55 GPa. In contrast, sapphire has a bulk modulus of about 250 GPa.

To ensure suitable transmittance within the interior of the light guide, the light guide may have an optical loss equal to or less than 26 dB per meter in a wavelength range from about 400 nanometers to about 700 nanometers. In some examples the optical loss can be equal to or less than 17 dB per meter, whereas in certain other examples the optical loss can be equal to or less than 10 dB/meter. Suitable materials include without limitation glass materials including silica-based glasses, crystalline materials such as sapphire or diamond and diamond-like materials, or other materials, including calcium fluoride, as the quality of light emitted from the light guide is more a function of the surface characteristics rather than the bulk material.

A scatter ratio of the light guide, defined as the diffuse transmittance divided by the total transmittance, may be equal to or greater than 0.5. Moreover, for applications needing uniform illumination, a brightness variation of the light guide across an emitting surface of the light guide can be equal to or less than 20%. A viewing angle goodness parameter (VAG), described herein below, may be equal to or greater than 1.0.

Still further, particular processes for producing glass light guides described herein are compatible with both pre and post-process ion-exchange treatments. The use of chemically strengthened glass through ion exchange may be used to provide protection for other delicate structures, such as the LCD panel in a display device.

Compared to other techniques, illumination using light emitters described herein can be very uniform, light transmission is high, and, in the case of glass, the size of the substrate that can be prepared is not particularly limited.

Accordingly, disclosed herein is a substrate comprising at least one textured major surface comprising an RMS roughness $R_q$ where 5 nanometers≤$R_q$≤75 nanometers, for example in a range from about 5 nanometers to about 40 nanometers. The texture of the textured major surface may also include a correlation length T where 0 nanometers<T≤150 nanometers, for example in a range from greater than zero to equal to or less than 100 nanometers. The substrate may further comprise a haze value equal to or less than 6.0% and a transmittance normal to the at least one major surface greater than 90% over a wavelength range from 400 nm to 700 nm. The substrate may comprise a glass layer. The substrate may comprise a polymer layer. For example, the substrate may comprise a glass-polymer laminate including a polymer layer disposed on the glass layer.

In some embodiments the textured major surface is a surface of a polymer layer.

In certain examples the substrate can comprise a first substrate and may further comprise a second substrate joined to the first substrate to form a substrate assembly with the textured surface positioned within an interior of the substrate assembly. For example, the textured surface can be a surface of a polymer material disposed on the first substrate, and a second substrate is positioned such that the polymer layer including the textured surface is sandwiched between the first and second substrates. Both substrates may include a glass layer. For example, in some embodiments the first substrate may be a glass plate and the second substrate may be a glass plate. The polymer layer may be, for example, a pre-textured film produced in a replication process, for example a micro- or nano-replication process, and positioned between the first and second glass plate.

The substrate may be a chemically strengthened substrate, for example an ion-exchanged glass substrate. In some embodiments the substrate may be a laminated substrate comprising a first layer including a first coefficient of thermal expansion and a second layer comprising a second coefficient of thermal expansion different from the first coefficient of thermal expansion. For example, the laminate may be a glass laminate wherein two layers of glass having two different compositions and two different coefficients of thermal expansion may be fused together to produce the laminate. The glass laminate can be produced, for example, via a fusion process wherein multiple streams of molten glass of different compositions are flowed over the surfaces of forming bodies and joined to produce a single glass stream that cools and can be cut into individual glass sheets. The differing coefficients of thermal expansion can produce a compressive stress in the surfaces of the glass sheets.

The polymer layer according to some embodiments may comprise a plurality of discrete light scatter suppressing features, the discrete light scatter suppressing features comprising an index of refraction substantially equal to an index of refraction of the glass layer. For example, the index of refraction of the light scatter suppressing features can be within ±10% of the index of refraction of the substrate. A spatial density of the plurality of light scatter suppressing features can be arranged to vary as a function of distance from an edge of the substrate to produce a predetermined light output as a function of position on a surface of the substrate. For example, a spatial density of the plurality of light scatter suppressing features can be arranged to produce a substantially uniform light output for use as a back light for a display device.

In other embodiments the polymer layer may be a continuous layer, such as a polymer film applied to a glass layer, e.g. the first glass substrate. The second substrate may be a chemically strengthened substrate. For example, in embodiments comprising two glass substrates, both glass substrates can be chemically strengthened substrates. Alternatively, the second substrate is a laminated substrate comprising a first layer including a first coefficient of thermal expansion and a second layer comprising a second coefficient of thermal expansion different from the first coefficient of thermal expansion. Both the first and second substrates can be laminated substrates comprising a plurality of glass compositions with different coefficients of thermal expansion.

Preferably, the substrate comprises a bulk modulus M, where 10 gigaPascals M 450 gigaPascals. The substrate preferably comprises a scatter ratio defined as a diffuse transmittance divided by a total transmittance equal to or greater than 0.5. The substrate preferably comprises an optical attenuation equal to or less than 26 dB/meter in a wavelength range from about 400 nm to about 700 nm.

When used as a light emitter, for example a light guide in a back light element, the substrate may further comprise a light source, or a plurality of light sources, positioned adjacent an edge surface of the substrate.

In some embodiments the substrate may further comprise a frame disposed about a perimeter of the substrate. For example, the substrate may be configured as a projection screen or a display overlay.

In another embodiment a light emitter is disclosed comprising a light guiding substrate comprising a first edge and a second edge opposite the first edge, the substrate further comprising at least one textured surface with an RMS roughness in a range from about 5 nanometers to about 75 nanometers, for example in a range from about 5 nanometers to about 40 nanometers. A correlation length of the texture may be in a range from greater than zero nanometers to about 150 nanometers, for example in a range from about 5 nanometers to about 100 nanometers. The substrate may, for example, be a glass substrate, and more particularly the glass substrate may be a silica-based glass substrate. The substrate may include a plurality of discrete deposited features on the textured surface that function as light scatter suppressing features. A spatial density of the deposited features may vary as a function of distance in a direction from the first edge to the second edge. For example, the spatial density of the deposited features may decrease as a function of distance in a direction from the first edge to the second edge. In one example, the spatial density of the deposited features may vary from about 95% to about 5% in a direction from the first edge to the second edge, the spatial density determined as a percent coverage of a unit area. The spatial density of the deposited features may be substantially constant along a line parallel with the first edge. The deposited features may be locally randomly distributed.

Preferably, the deposited features are transparent. The deposited features may comprise, for example, a polymer resin. An index of refraction of the deposited features may be close to or match a refractive index of the substrate. For example, an index of refraction of the deposited features may be within 10% of the index of refraction of the substrate. Typically, a refractive index of the substrate is in a range from about $25 \times 10^{-7}/°$ C. to about $300 \times 10^{-7}/°$ C. over a temperature range from 25° C. to 300° C. The light emitter may be transparent such that in an OFF state the light emitter can be viewed through, and in the ON state the light emitter emits light.

As will become clear from the following description, the light emitter when configured as a back light element may also function as an opaque light emitter by employing a reflective panel at the back side of the light guide farthest from the display panel. Accordingly, the light emitter disclosed herein may be used where transparency is not required and a greater light output is needed.

The substrate may include a surface porosity characterized by a bimodal parameter (BP) value in a range from about 0.16 to about 0.22.

In another aspect, a display device is disclosed comprising: a display panel, a light emitter, for example a back light element positioned adjacent to the display panel, the back light element comprising a light guide including a substrate with a first edge and a second edge opposite the first edge. The substrate further comprises at least one textured surface with an RMS roughness in a range from about 5 nanometers to about 75 nanometers, for example in a range from about 5 nanometers to about 40 nanometers. A correlation length of the surface texture may be in a range from greater than zero nanometers to about 150 nanometers, for example in a range from 5 nanometers to about 100 nanometers The textured surface may include a plurality of discrete deposited features deposited thereon to control light scattering from the light guide. The deposited features serve as light scatter suppressing features. For example, the deposited features may be used to selectively control the scattering of light from the textured surface of the substrate. Accordingly, the deposited features may be configured to produce a uniform illumination from the light emitter. Thus, a spatial density of the deposited features can decrease as a function of distance from the first edge to the second edge. In other examples the deposited features may be arranged to produce an intentional pattern of illumination, for example a non-uniform pattern such as for decorative lighting. In display applications the textured surface of the light guide may be positioned to face away from the display panel. In other examples the textured surface can be arranged to face toward the display panel. In still other examples, both major surfaces of the light guide may be textured. For use in applications where transparency is not a benefit, the light emitter may be opaque and incorporate, for example a reflective element positioned adjacent a major surface of the light guide to increase light output of the light emitter.

To ensure proper control of light scattering by the light guide, and therefore light extraction, the deposited features may comprise an index of refraction close to or matched with the index of refraction of the substrate. For example, the index of refraction of the deposited features may be within 10% of the index of refraction of the underlying light guide substrate and be considered refractive index-matched. The deposited features may, for example, be a polymer resin.

In other examples the deposited features may include transparent metal oxide layers such as a transparent conductive oxide (TCO) used in the manufacture of semiconductor devices.

The spatial density of the deposited features can vary from about 95% to about 5% in a direction from the first edge to the second edge, for example in a range from about 75% to about 25%, the spatial density being determined as a percent coverage of a unit area. Thus, the spatial density may be a gradient from one edge in a direction toward another edge, or even from one edge to a middle of the glass substrate between two parallel edges. As used herein, an edge may be distinguished from an edge surface in that an edge represents the boundary between an edge surface and a major surface of the substrate. For example, although in some embodiments illustrated in the accompanying drawings the light guide is shown with light coupled from the light source(s) through a single edge surface of the substrate, in other embodiments not shown, light may be coupled from two or more edge surfaces of the substrate. Suitable light sources include light emitting diodes (LEDs). In some examples, light may be coupled from a border area of a major surface proximate an edge (perimeter) of the major surface. Accordingly, the pattern of the deposited features, and therefore the spatial density thereof, may be adjusted to obtain the desired light output uniformity. However, on a local scale, the deposited features may be randomly distributed.

In still another embodiment a method of forming a light guide is described comprising treating a surface of a glass substrate with an etchant comprising acetic acid, for example glacial acetic acid, in an amount from about 92% to about 98% by weight, ammonium fluoride in an amount from about 0.5% to about 5.5% by weight, and less than 6% by weight water. While not wishing to be bound by any particular theory, it is believed that for some embodiments the lower the water content, the lower the ammonium fluoride dissociation rate, which leads to a reduced release of HF. A reduced concentration of HF can also lead to a reduction in the removal of glass from the glass substrate, which in turn results in shallower pits in the etched surface thereof, which is needed for low haze (e.g. greater transparency). Additionally, reduced water content can provide for a reduction in the solubility of the precipitated crystal mask in the etchant. This means the mask stays on the glass substrate surface longer. When the nucleated crystals stay undissolved on the glass surface, the etch rate for the etchant is lower and the crystal lateral dimension remains unchanged, thus leading to the desired low correlation length.

The method may further comprise depositing a plurality of dots (deposited features) of a transparent material on the textured surface of the glass substrate. The deposited features serve as light scatter suppressing features. For example, the deposited features may be used to selectively control the scattering of light from the textured surface of the substrate. The dots comprising the deposited material may have an index of refraction that is close to or matches a refractive index of the glass substrate, for example within ±10%. A spatial density of the deposited features preferably decreases as a function of distance from a first edge of the glass substrate to a second edge of the glass substrate parallel with the first edge to produce a graduated spatial density. The deposited dots can, for example, comprise a polymer resin. The graduated spatial density may comprise a linear graduation or a non-linear graduation.

The spatial density of the deposited features can vary from about 95% to about 5% in a direction from a first edge of the glass substrate toward a second edge of the glass substrate, for example in a range from about 75% to about 25%, the spatial density being determined as a percent coverage of a unit area. The spatial density of the deposited features (dots) can be substantially constant along a line parallel with the first edge.

In some embodiments the light guide may include a suitable underlying substrate comprising a polymer layer deposited thereon. The underlying substrate provides rigidity to the polymer layer, whereas the polymer layer provides the necessary surface roughness characteristics. The underlying substrate may include any of the foregoing materials, including glass. The polymer layer may, in some examples, have a thickness less than 100 micrometers. A surface texture may then be produced in the exposed surface of the polymer layer such as by pressing (stamping) with a master mold (e.g. an etched glass plate produced by the methods disclosed herein). In some embodiments the polymer layer may be a film and the texture may be produced on the polymer layer prior to its application to the glass layer.

In aspects where a glass substrate is required to minimize electrostatic charging, the etchant may be adjusted. For example, in some embodiments the etchant comprises acetic acid ($HC_2H_3O_2$) in a range from about 10% by weight to about 90% by weight, for example in a range from about 10% to about 80% by weight, in a range from about 20% to about 70% by weight, in a range from about 20% by weight to about 30% by weight or in a range from about 40% by weight to about 60% by weight. The etchant may further include $NH_4F$ in a range from about 1% to about 50% by weight, for example in a range from about 5% to about 40% by weight, in a range from about 10% by weight to about 30% by weight. In certain embodiments polyethylene glycol or other organic solvents can be substituted for the acetic acid. Depending on the desired texture, etching times can be in a range from about thirty seconds to two minutes, and in some cases up to four minutes. When the etching is complete, the glass substrate can be soaked in 1M $H_2SO_4$ for up to 1 minute to remove precipitated crystal residue on the surface of the glass substrate. However, in some embodiments other mineral acids may be substituted for $H_2SO_4$, for example HCl or $HNO_3$. In some cases hot water may be sufficient. A low pH value and/or a high temperature can increase the solubility of the crystals. Finally, the glass substrate may be rinsed with water (e.g. deionized water) and dried. To avoid increased production costs associated with high temperature etching, the etching process can be performed at room temperature, with the understanding that higher temperature etching, if desired, falls within the scope of the method.

Additional features and advantages of the embodiments described herein will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description present embodiments of the present disclosure, and are intended to provide an overview or framework for understanding the nature and character of the embodiments as they are claimed. The accompanying drawings are included to provide a further understanding of the embodiments, and are incorporated into and constitute a part of this specification. The drawings illustrate various embodiments of the present disclosure and together with the description serve to explain the principles and operations of the embodiments.

DETAILED DESCRIPTION

Figure 1:
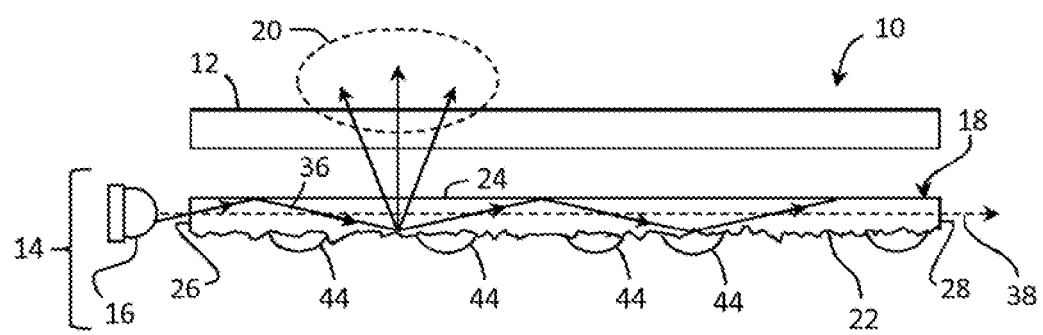
FIG. 1 is a cross sectional side view of a display device according to an embodiment described herein.

Conventional back light elements for illuminating visual display devices are typically made using polymers such as polymethyl methacrylate (PMMA) or polycarbonate. Such materials are relatively inexpensive and offer good light transmission. As display devices become slimmer, however, the light guides comprising the back light must also become thinner. For example, in some handheld devices these light guides are less than 1 millimeter thick. Thin polymer light guides become expensive to fabricate. In addition, very thin polymer light guides degrade quickly under constant exposure to the light and heat emitted from the LED sources during device use (e.g. photo-aging), especially near the light coupling zone where the LEDs are arrayed. Additionally, manufacturing thin warp-free polymer sheets is challenging, and exposure to a non-uniform temperature field during display operation can cause polymer light guides to warp, leading to a defect called "pooling mura". Polymers also have a low thermal conductivity, approximately 0.18 watts per meter per Kelvin (W/m·K) for PMMA, and 0.19 W/m·K for polycarbonate. Consequently, polymer light guides have a reduced ability to dissipate heat buildup near the light coupling zone and can discolor and become brittle. Moreover, polymer light guides typically also display poor angular uniformity of luminance, such that the peak intensity of light emitted from a light guide produced from materials like PMMA and polycarbonate can occur at angles approaching approximately 70 degrees as measured from a normal to the light guide surface. Consequently, optical films are often utilized at the front surface of these light guides to produce scattering and turn the light in the normal direction. Unfortunately, such optical films typically have poor transparency, making them unsuitable for use in a transparent display. As used herein, the front surface refers to the surface from which the light is emitted from the light guide for lighting purposes. For a liquid crystal display, the front surface of the light guide, as used herein, is the surface facing the LCD panel. Accordingly, the back side is the surface facing away from the display panel.

For at least the reasons above, alternatives that offer greater rigidity, less warping, less discoloration and exhibit an optical loss sufficiently low to produce viable light emitters are attractive alternatives. Material options include without limitation glass, sapphire, certain diamond-like materials or even calcium fluoride.

Glass, in particular, is not susceptible to photo-aging and discoloration under the prolonged light exposure conditions typical of a display device. Moreover, glass, particularly silica-based glass, can be produced with very high thickness uniformity in exceptionally transparent sheets at low cost compared to other materials that might otherwise be suitable. As a result, glass can be an ideal light guide in a light emitter, and is particularly well suited for applications in a back light element for display devices. Accordingly, the following description and examples present methods and articles based on glass, with the understanding that other materials may be used in the manufacture of a textured substrate having the characteristics, e.g. surface texture, disclosed herein.

In accordance with one or more embodiments disclosed herein, a "maskless" etching technique may be used to produce glass light guides that can be used in any number of applications, including as a light guide for a backlight element in transparent or non-transparent display applications. The methodology involves a low cost, highly controllable process for producing a light scattering portion that includes nanometer-sized features distributed in and/or on a surface of a glass substrate. In addition, micrometer-sized light scatter suppressing features may be deposited over the nanometer-sized features on the glass surface. The combination of etched nanometer-sized features and deposited micron-sized light scatter suppressing features tremendously improves the light emitting properties of the light guide. In operation, light is coupled into and propagates through the glass substrate in a waveguide fashion and is incident on the light scattering surface portion. In response, the light scatters out of the glass structure across a surface thereof in accordance with desirable optical characteristics. However, where the light propagating through the glass substrate encounters a light scatter suppressing feature, total internal reflection may be restored, and the light continues propagating through the glass substrate without being scattered out. Thus, light extraction from the glass substrate via scattering is suppressed, and light output may thereby be controlled by controlling the distribution of light scatter suppressing features (dots) on the surface of the glass substrate.

FIG. 1 shows a cross-sectional view of a textured light guide substrate as a dielectric slab waveguide illuminated from an edge thereof by an array of light emitting diodes (LEDs). In the ray optics illustration of FIG. 1, light rays emanate from the LEDs and propagate in the dielectric slab waveguide in a zigzag pattern, each ray reflecting alternatively from the two major surfaces of the glass substrate. If the interfaces of the slab waveguide with the surrounding environment are perfectly smooth and the angle that each ray forms with an interface at which the ray is incident is greater than a critical angle $\varphi_c$, relative to a normal to that interface, the ray bounces off the interface at the same angle as the incident angle and stays confined within the waveguide. This phenomenon is called total internal reflection.

However, total internal reflection breaks down when texture features at an interface of the light guide at the point of incidence are small compared to the wavelength of the incident light. That is, when the surface of the light guide at the point of incidence is roughened and the features comprising the texture are very small some light scattering occurs at each bounce of the light ray on the textured interface of the light guide. Scattering produces light rays at angles different than the incident angle. Some of these rays do not satisfy the total internal reflection criterion and escape from the textured interface of the slab waveguide and can illuminate the LCD panel at various angles. Some rays may continue to reflect at or greater than the critical angle.

The methodologies described herein involve a wet chemical etching process for texturing a glass substrate for illumination applications and articles made by that process that may be incorporated into subsequent devices, such as the aforementioned display applications. Additionally, such treatments may be applied to glass substrates for other purposes, such as suppressing electrostatic charging of substrates during processing of such substrates.

Creating texture on glass surfaces using fluoride-containing solutions requires an etch mask, since without a mask amorphous homogenous silicate glass tends to etch evenly on a scale larger than the molecular level, reducing a thickness of the glass, but without creating texture. Many methods have been proposed for masking glass etching to provide patterned textures for various applications. Such methods can be divided into those requiring a separate masking process prior to etching and those which form a mask in situ during etching, so-called "maskless" etching since there is no mask prior to the start of the etching. For the purposes of this disclosure, a mask can be considered any material that provides a barrier to etching, and may be applied to a glass surface with various lateral feature sizes and with various levels of durability and adhesion to the glass.

Many methods of mask application, such as ink jet printing, have limitations on the scale of the mask that can be applied in that they do not enable the deposition of small, nanometer-sized features. In fact, most methods produce textures that are on a micrometer scale in both lateral feature size and depth of etch and so create a visible "frosted" appearance to glass that reduces transparency, increases haze, and decreases glare and surface reflectivity.

In situ masking and glass etching involves a complex process of mask formation from byproducts of glass dissolution plus etchant. Precipitates that form (sometimes crystalline) are often somewhat soluble in the etchant, making modeling of this process difficult. Moreover, creating a differential etch using maskless etching may involve multiple steps to create the mask by contact with a frosting solution or gel, and subsequent steps to remove the mask and etchant. In situ etch masks can also produce various textures depending on their adhesion to the substrate and durability in the wet etchant, and it can be shown that less durable masks result in shallower textures. Depth of etch is also determined by the size of the mask features, with smaller features unable to support deeper etch profiles because mask undercutting occurs more readily. Therefore, mask chemistry, glass chemistry, and etch chemistry should all be considered when forming nanometer-scale textures.

Disclosed herein is a glass substrate with a textured surface suitable as a light guide plate for a light emitter with a broad angular distribution of luminance, and a process for making the same utilizing a modified maskless etch method. The method produces texture on a glass surface that is useful for a display light guide applications and any other applications where controlled illumination is desired, and in particular a transparent source of light. Methods disclosed herein may also be used to produce textured surfaces that reduce electrostatic charging without a noticeable formation of haze.

The present disclosure describes substrates and light guides that enhance thermal stability, have a relatively low coefficient of thermal expansion and resistance to thermal breakdown, can produce uniform luminance over a broad viewing angle range with high brightness, and exhibit transparency with low haze. The surface texture properties that have been observed and can be responsible for these desirable optical properties may include a correlation length of the texture features equal to or less than 150 nm and a root mean square (RMS) roughness ($R_q$) of the textured surface in a range from about 5 nm to about 75 nanometers, for example in a range from about 5 nanometers to about 40 nm, in a range from about 5 nanometers to about 30 nm, and in a range from about 5 nanometers to about 20 nm. Generally, the smaller the value of the RMS roughness, the better the performance of the light guide in terms of its scattering characteristics, as the influence of roughness on physical quantities can depend, inter alia, on the correlation properties and/or spatial frequencies present on the surface. The notion of a correlation length is introduced, the correlation length being related to the autocorrelation function $G_x(\tau_x)$ of a surface expressed as a one-dimensional function $z(x)$, where $$G_x(\tau_x) = \lim_{L \to \infty} \frac{1}{2L} \int_{-L}^{L} z(x)z(x + \tau_x) dx, \quad (1)$$

where L represents one half the profile length of the sample scan (distance over which the autocorrelation function is determined), z is the height of the surface relative to a mean height, x represents a position on the surface in the x direction, $\tau$ is the distance between two positions $x_1$ and $x_2$. Sampling of the surface obtains an array of heights $z(j)$ across M positions spaced $\Delta x$ apart. Here, k is an integer from 0 to M−1. Approximating for $\tau_x = k\Delta_x$, equation (1) can be reduced to equation (2) below, $$G_k = \frac{1}{M-k} \sum_{j=0}^{M-1-k} z_j z_{j+k} \quad (2)$$

The autocorrelation function describes how the surface is correlated to itself at a distance $\tau_x$. The autocorrelation function goes to zero for large $\tau_x$ such that the heights of the surface features become independent. Thus, one can refer to the autocorrelation length T, or simply the correlation length to represent the characteristic lateral feature size of a surface. To obtain the correlation length from measured data, one may select, for example, a Gaussian model for $G_x(\tau_x)$, for example of the form, $$G_x(\tau_x) = \sigma^2 \exp\left(-\frac{\tau_x^2}{T^2}\right), \quad (3)$$

calculate a discretized $G_k$ from measured data (using, for example, a fast Fourier transform), and fit the model on the discretized autocorrelation function. Alternative approaches may use an exponential model. Calculations used herein employed a Gaussian model and all correlations lengths are expressed as a Gaussian correlation length unless otherwise stated. In other embodiments the calculations above may be altered to include a two-dimensional consideration of the surface rather than a one dimensional approach. Software programs such as Gwyddion, an open-source software platform developed and supported by the Department of Nanometrology, Czech Metrology Institute intended for analysis of height fields obtained by scanning probe microscopy techniques to calculate an autocorrelation function are available that can compute the correlation length based on measured data.

These chemical etch methods can be divided into three areas needed to make specific textures resulting in good light guide optical properties: 1) etchant chemistry, 2) glass chemistry, and 3) process steps.

As described supra, the chemical etch process includes etching the glass substrate in an etchant, for example an etchant bath, that comprises a mixture of an organic solvent such as acetic acid (AA) and an inorganic acid such as ammonium fluoride ($NH_4F$). The glass structure resulting from exposure to the etchant is a textured glass substrate. For illumination applications, the textured glass substrate may be optimized by controlling parameters of the process, such as but not limited to the composition of the etchants, the etching time, the etchant temperature and the glass temperature. A reliance on the addition of alkali or alkaline earth salts for removal of the mask is unnecessary.

Other additives may provide advantages as well. These may include: A dye to add color to the etchant and enable a visual aid for rinsing (common food-grade dye can suffice), and viscosity modification components to thicken the acid and enable painting or spraying the etchant on glass as opposed to dipping. A thickened acid can also prove advantageous since this is likely to reduce the vapor pressure and thereby reduce defects caused by acid vapor contact with the substrate. For example, a suitable thickening agent is polycaprolactone, a synthetic polyester which melts at 60° C. and which can be used to make a wax etchant. Polycaprolactone is soluble in acetic acid and insoluble in water.

The process for modifying a glass substrate with an etched texture on at least one surface thereof may in some embodiments comprise at least six steps, all of which can be performed within a temperature range from about 18° C. to about 22° C. (it should be noted that acetic acid begins to freeze at temperatures below approximately 17° C. Accordingly, a minimum temperature should be greater than 17° C.).

In a first step of an example process, the glass substrate to be etched is cleaned using a detergent to remove all inorganic contamination, then rinsed sufficiently to remove detergent residue. A level of cleanliness sufficient to obtain a water contact angle of less than about 20° should be attained. Contact angle can be evaluated using, for example, a DSA100 drop shape analyzer manufactured by Kruss GmbH and employing a sessile drop method, which was done for experiments described herein, although other suitable methods may also be used. In an optional second step of the example process the back side of the glass substrate can be laminated with a suitable adhesive polymer film (or other acid barrier), if only a single side of the glass substrate is to be etched. The polymer film can be removed from the glass substrate after the etching process is completed. It should be noted that a similar process can be used if the opposite (back side) of the substrate is to be etched, wherein the polymer film is added to the front surface of the substrate.)

In a third step of the example process, the glass substrate is contacted with an etchant for a time sufficient to create the desired texture (typically in a range from about 0.5 minutes to 6 minutes). For immersion, fast insertion and suitable environmental controls, for example an ambient air flow of at least a 2.83 cubic meter per minute in the enclosure in which the etching occurs may be used to limit exposure of the glass substrate to acid vapor prior to and/or during insertion. The glass substrate should be inserted into the acid bath using a smooth motion to prevent defects forming in the etched surface. The glass substrate should be dry prior to contact with the etchant.

In a fourth step, the glass substrate is removed from the etchant and allowed to drain, then rinsed one or more times with water, for example deionized water, or alternatively with a solution in which the precipitant is dissolvable. Agitation of either the glass substrate or the rinse liquid sufficient to ensure uniform diffusion of fluoride-containing acid clinging to the glass substrate may be performed. Rinse steps can employ agitation to prevent defects. Small oscillations of approximately 300 oscillations per minute are sufficient, for example between about 250 and 350 oscillations per minute. The etchant bath may in some instances be recirculated to prevent stratifications and depletion.

In a fifth step of the example process any etchant-blocking film previously applied to the back side of the glass substrate can be removed, such as by peeling.

In a sixth step of the example process, the glass substrate can be dried using forced clean (filtered) air to prevent water spots, or spots from other rinsing solutions, from forming on the glass substrate.

The example process outlined briefly above is capable of providing the specific textures and optical properties described herein, and also to enable high uniformity of etch for each sample when combined with features from the following detailed description.

With reference to FIG. 1, not shown to scale, an edge view of a display device 10 is depicted comprising a display panel 12, such as an LCD display panel, and a light emitter 14 in accordance with one or more embodiments described herein. Light emitter 14 may be employed to process light for a display system or other application.

Figure 2:
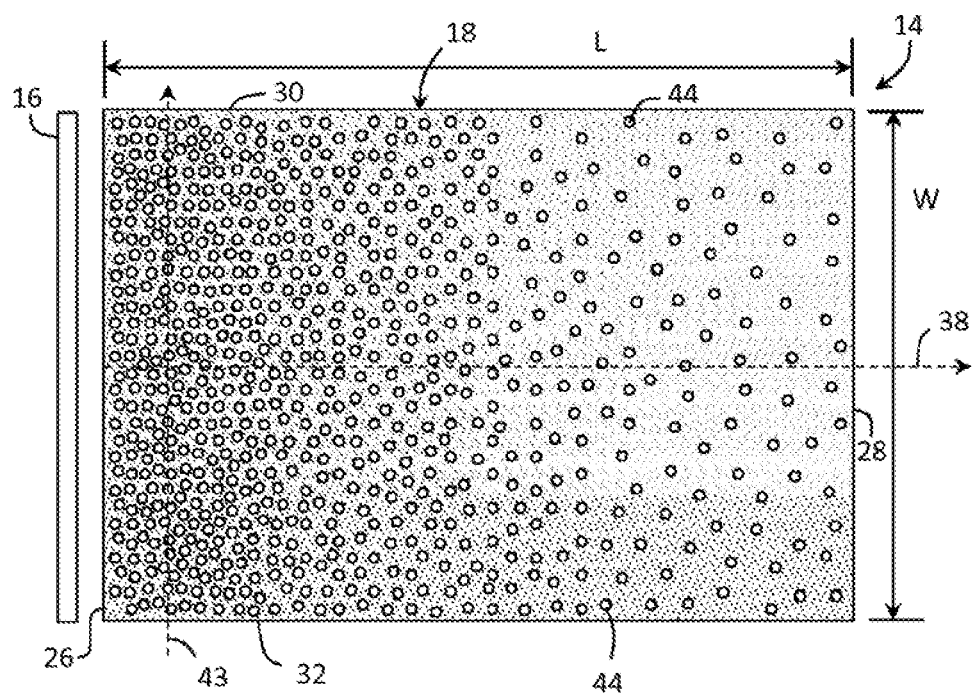
FIG. 2 is a top down view of the display device according to FIG. 1, showing a distribution of dots of a deposited material on a roughened surface.

In reference to FIGS. 1 and 2, light emitter 14 comprises a light source 16 and a glass substrate 18 that serves as a light guide. Light coupled into glass substrate 18 from light source 16 propagates within the glass substrate and is scattered at a major surface of glass substrate 18 and directed, in the present figure, through an opposite surface of glass substrate 18, as indicated by arrows 20. Glass substrate 18 comprises first and second spaced apart major surfaces 22, 24. First and second major surfaces 22 and 24 may in some examples be parallel with one another. Glass substrate 18 may have a rectangular shape with a first edge 26 and a second edge 28 opposite to and parallel with first edge 26. First and second major surfaces 22, 24 extend between first and second edges 26, 28.

For purposes of description and not limitation, the distance between first and second edges 26, 28, as best seen with the aid of FIG. 2, will be referred to as the length L of glass substrate 18. Accordingly, glass substrate 18 further comprises a width W extending between third and fourth edges 30 and 32, wherein third edge 30 is parallel with fourth edge 32, and both third and fourth edges 30, 32 are generally perpendicular to and intersect with first and second edges 26 and 28.

Glass substrate 18 may be any suitable glass that can withstand the processing parameters expressly or inherently disclosed herein may be employed as glass substrate 18, for example an alkali silicate glass, an aluminosilicate glass, or an aluminoborosilicate glass. The glass material may be a silica-based glass, for example code 2318 glass, code 2319 glass, code 2320 glass, Eagle XG® glass, Lotus™, and soda-lime glass, etc., all available from Corning, Inc. Other display-type glasses may also benefit from the processes described herein. Thus, glass substrate 18 is not limited to the previously described Corning Incorporated glasses. For example, one selection factor for the glass may be whether a subsequent ion exchange process may be performed, in which case it is generally desirable that the glass be an alkali-containing glass.

Display glass substrates can have various compositions and be formed by different processes. Suitable formation processes include, but are not limited to float processes and downdraw processes such as slot-draw and fusion draw processes. See, for example, U.S. Pat. Nos. 3,338,696 and 3,682,609. In the slot-draw and fusion draw processes, the newly-formed glass sheet is oriented in a vertical direction. One glass substrate, Lotus™, manufactured by Corning, Inc., has a small coefficient of thermal expansion and is superior in dimensional stability and workability at relatively high processing temperatures. Lotus™ glass contains little, if any, alkali components in the glass.

Suitable glass display substrates include high performance glass substrates manufactured by Corning, Inc. The glass substrates are specifically designed to be used in the manufacture of flat panel displays and exhibit densities of less than 2.45 g/cm$^3$ and a liquidus viscosity (defined as the viscosity of the glass at the liquidus temperature) greater than about 200,000 poises, or greater than about 400,000 poises, or greater than about 600,000 poises, or greater than about 800,000 poises. Additionally, suitable glass substrates exhibit substantially linear coefficients of thermal expansion over the temperature range of 0° to 300° C. of 28-35×10$^{-7}$/° C., or of 28-33×10$^{-7}$/° C., and strain points higher than about 650° C. As used in this specification and the appended claims, the term "substantially linear" means that the linear regression of data points across the specified range has a coefficient of determination greater than or equal to about 0.9, or greater than or equal to about 0.95, or greater than or equal to about 0.98 or greater than or equal to about 0.99, or greater than or equal to about 0.995. Suitable glass substrates include those with a melting temperature less than 1700° C. In addition, suitable glass substrates may exhibit a weight loss of less than 0.5 mg/cm$^2$ after immersion in a solution of 1 part HF (50 wt. %) and 10 parts NH$_4$F (40 wt. %) for 5 minutes at 30° C.

In one embodiment of the described process, the glass substrate has a composition in which the major components of the glass are SiO$_2$, Al$_2$O$_3$, B$_2$O$_3$, and at least two alkaline earth oxides. Suitable alkaline earth oxides include, but are not limited to MgO, BaO and CaO. The SiO$_2$ serves as the basic glass former of the glass and has a concentration greater than or equal to about 64 mole percent in order to provide the glass with a density and chemical durability suitable for a flat panel display glass, e.g., a glass suitable for use in an active matrix liquid crystal display panel (AM-LCD), and a liquidus temperature (liquidus viscosity) which allows the glass to be formed by a downdraw process (e.g., a fusion process) described in more detail below. Suitable glass substrates have a density less than or equal to about 2.45 grams/cm$^3$, or less than or equal to about 2.41 grams/cm$^3$, a weight loss which is less than or equal to about 0.8 milligrams/cm$^2$ when a polished sample is exposed to a 5% HCl solution for 24 hours at 95° C., and a weight loss of less than 1.5 milligrams/cm$^2$ when exposed to a solution of 1 volume of 50% by weight HF and 10 volumes 40% by weight NH$_4$F at 30° C. for 5 minutes.

Suitable glass for use with embodiments of the present disclosure have an SiO$_2$ concentration less than or equal to about 71 mole percent to allow batch materials to be melted using conventional, high volume melting techniques, e.g., Joule melting in a refractory melter. In detailed embodiments, the SiO$_2$ concentration is in a range from about 66.0 to about 70.5 mole percent, or in a range from about 66.5 to about 70.0 mole percent, or in a range from about 67.0 to about 69.5 mole percent. As a result of the SiO$_2$ content, suitable glasses may have melting temperatures equal to or greater than about 1600° C.

Aluminum oxide (Al$_2$O$_3$) is another glass former suitable for use with embodiments of the disclosure. Without being bound by any particular theory of operation, it is believed that an Al$_2$O$_3$ concentration equal to or greater than about 9.0 mole percent provides a glass with a low liquidus temperature and a corresponding high liquidus viscosity. The use of at least about 9.0 mole percent Al$_2$O$_3$ may also improve the strain point and the modulus of the glass. In detailed embodiments, the Al$_2$O$_3$ concentration may be in the range from about 9.5 to about 11.5 mole percent.

Boron oxide (B$_2$O$_3$) is both a glass former and a flux that aids melting and lowers the melting temperature. To achieve these effects, glasses for use with embodiments of the present disclosure can have B$_2$O$_3$ concentrations equal to or greater than about 7.0 mole percent. Large amounts of B$_2$O$_3$, however, lead to reductions in strain point (approximately 10° C. for each mole percent increase in B$_2$O$_3$ above 7.0 mole percent), modulus, and chemical durability.

Suitable glass substrates may have a strain point equal to or greater than about 650° C., equal to or greater than about 655° C., or equal to or greater than about 660° C., a Young's modulus equal to or greater than 10.0×10$^6$ psi, and a chemical durability as described above in connection with the discussion of the SiO$_2$ content of the glass. Without being bound by any particular theory of operation, it is believed that a high strain point may help prevent panel distortion due to compaction/shrinkage during thermal processing subsequent to manufacturing of the glass. Accordingly, it is believed that a high Young's modulus may reduce the amount of sag exhibited by large glass sheets during shipping and handling.

In addition to the glass formers (SiO$_2$, Al$_2$O$_3$, and B$_2$O$_3$), suitable glass substrates may also include at least two alkaline earth oxides, i.e., at least MgO and CaO, and, optionally, SrO and/or BaO. Without being bound by any particular theory of operation, it is believed that alkaline earth oxides provide the glass with various properties important to melting, fining, forming, and ultimate use. In some embodiments, the MgO concentration is greater than or equal to about 1.0 mole percent. In detailed embodiments, the MgO concentration is in the range of about 1.6 and about 2.4 mole percent.

Of the alkaline earth oxides, the CaO concentration of some embodiments of the glass substrate is the largest. Without being bound by any particular theory of operation, it is believed that CaO produces low liquidus temperatures (high liquidus viscosities), high strain points and moduli, and coefficients of thermal expansion (CTE's) in the most desired ranges for flat panel applications, specifically, AMLCD applications. It is also believed that CaO contributes favorably to chemical durability, and compared to other alkaline earth oxides, CaO is relatively inexpensive as a batch material. Accordingly, in some embodiments, the CaO concentration is greater than or equal to about 6.0 mole percent. In specific embodiments, the CaO concentration in the display glass is less than or equal to about 11.5 mole percent, or in the range of about 6.5 and about 10.5 mole percent.

In some examples, the glass may comprise 60-70 mol % SiO$_2$; 6-14 mol % Al$_2$O$_3$; 0-15 mol % B$_2$O$_3$; 0-15 mol % Li$_2$O; 0-20 mol % Na$_2$O; 0-10 mol % K$_2$O; 0-8 mol % MgO; 0-10 mol % CaO; 0-5 mol % ZrO$_2$; 0-1 mol % SnO$_2$; 0-1 mol % CeO$_2$; less than 50 ppm As$_2$O$_3$; and less than 50 ppm Sb$_2$O$_3$; wherein 12 mol % Li$_2$O+Na$_2$O+K$_2$O≤20 mol % and 0 mol %≤MgO+CaO≤10 mol %, and wherein the silicate glass is substantially free of lithium.

Certain glass substrates described herein can be what is referred to in the art as laminated glass. In one aspect, the display glass substrate is produced by fusion drawing a glass skin to at least one exposed surface of a glass core. Generally, the glass skin will possess a strain point equal to or greater than 650° C. In some embodiments, the skin glass composition has a strain point equal to or greater than 670° C., equal to or greater than 690° C., equal to or greater than 710° C., equal to or greater than 730° C., equal to or greater than 750° C., equal to or greater than 770° C., or equal to or greater than 790° C. The strain point of the disclosed compositions can be determined by one of ordinary skill in the art using known techniques. For example, the strain point can be determined using ASTM method C336.

In some embodiments, the glass skin can be applied to an exposed surface of a glass core by a fusion process. An example of a suitable fusion process is disclosed in U.S. Pat.

No. 4,214,886, which is incorporated by reference herein in its entirety. The fusion glass substrate forming process can be summarized as follows. At least two glasses of different compositions (e.g., the base or core glass sheet and the skin) are separately melted. Each of the glasses is then delivered through an appropriate delivery system to a respective overflow distributor. The distributors are mounted one above the other so that the glass from each flows over top edge portions of the distributor and down at least one side to form a uniform flow layer of appropriate thickness on one or both sides of the distributor. The molten glass overflowing the lower distributor flows downwardly along the distributor walls and forms an initial glass flow layer adjacent to the converging outer surfaces of the bottom distributer. Likewise, molten glass overflowing from the upper distributor flows downwardly over the upper distributor walls and flows over an outer surface of the initial glass flow layer. The two individual layers of glass from the two distributers are brought together and fused at the draw line formed where the converging surfaces of the lower distributor meet to form a single continuously laminated ribbon of glass. The central glass in a two-glass laminate is called the core glass, whereas the glass positioned on the external surface of the core glass is called the skin glass. A skin glass can be positioned on each surface of the core glass, or there may be only one skin glass layer positioned on a single side of the core glass. When just one skin glass is fused directly to the core, the skin is "adjacent" to the core.

The overflow distributor process provides a fire polished surface to the glass ribbon so formed, and the uniformly distributed thickness of the glass ribbon provided by the controlled distributor(s), and the glass sheets cut therefrom, provides the glass sheets with superior optical quality. The glass sheets used as display glass substrates can have a thickness in the range of 100 micrometers (μm) to about 0.7 μm, but other glass sheets that may benefit from the methods described herein may have a thickness in a range from about 10 μm to about 5 mm. Other fusion processes, which can be used in the methods disclosed herein, are described in U.S. Pat. Nos. 3,338,696, 3,682,609, 4,102,664, 4,880,453, and U.S. Published Application No. 2005/0001201, which are incorporated by reference herein in their entireties. The fusion manufacturing process offers advantages for the display industry, including glass that is flat with excellent thickness control and glass that has a pristine surface quality and scalability. Glass substrate flatness can be important in the production of panels for liquid crystal display (LCD) televisions as any deviations from flatness can result in visual distortions.

In some embodiments, the glass substrate will possess a strain point equal to or greater than 640° C., a coefficient of thermal expansion in a range from about $31 \times 10^{-7}$/° C. to about $57 \times 10^{-7}$/° C., a weight loss less than 20 mg/cm$^2$ after immersion for 24 hours in an aqueous 5% by weight HCl solution at about 95° C., that is nominally free from alkali metal oxides and has a composition, calculated in weight percent on the oxide basis, comprising about 49 to 67% $SiO_2$, at least about 6% $Al_2O_3$, $SiO_2+Al_2O_3>68\%$, $B_2O_3$ in a range from about 0% to about 15%, at least one alkaline earth metal oxide selected from the group consisting of, in the preparations indicated, about 0 to 21% BaO, about 0 to 15% SrO, about 0 to 18% CaO, about 0 to 8% MgO and about 12 to 30% BaO+CaO+SrO+MgO.

Figure 3:
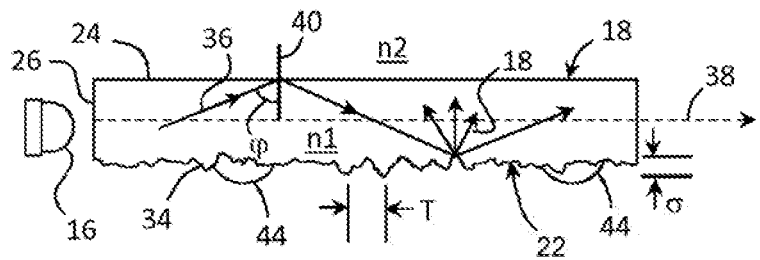
FIG. 3 is a cross sectional side view of a lighting apparatus (backlight) comprising the display device of FIG. 1.

In accordance with embodiments disclosed herein and shown in a close up view in FIG. 3, at least one surface of glass substrate 18, e.g. first major surface 22, is treated to include a plurality of nanometer-scale light scattering elements 34. As will be shown below, the plurality of light scattering elements 34 produce a texture on first major surface 22 and the texture can be formed by a modification of first major surface 22 through the action of etching with an etchant as described supra and disclosed in greater detail below.

A light ray 36 entering glass substrate 18 through first edge 26 propagates through the glass substrate under conditions of total internal reflection in a direction generally along axis 38 until the ray of light impinges on scattering elements 34. For example, if the angle φ between a normal 40 to a surface of the glass substrate is greater than the critical angle $\varphi_c$, where $\varphi_c$ can be calculated according to equation (4) below, $$\varphi_c = \arcsin(n_2/n_1) \quad (4)$$

where $n_1$ is the index of refraction of glass substrate 18 and $n_2$ is the index of refraction of air, the light propagating in glass substrate 18 and incident at the glass-air interface will be totally internally reflected.

Figure 4:
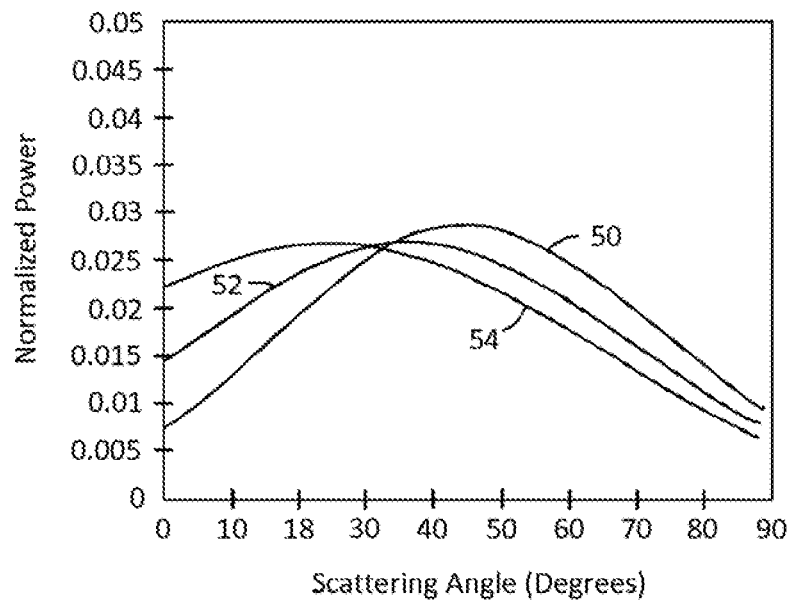
FIG. 4 is a plot showing modeled data of normalized power versus scattering angle for a textured surface having an RMS roughness of 50 nm and several correlation lengths.

However, when the propagating light is incident on a textured surface at least a portion of the incident light is scattered, as shown by arrows 20 (FIG. 1). At least some of the scattered light can be directed out of the glass substrate. If the glass substrate is to be used as a light source (e.g. a back light element) for an LCD display device, glass substrate 18 can be positioned such that the emitted light is directed through an adjacent LCD panel 12. The textured surface may be the first major surface 22 farthest from display panel 12 or the textured surface may be second major surface 24 closest to display panel 12. In some instances, both first and second surfaces may be textured. The optical characteristics of glass substrate 18 are controllable inter alia, via the process for producing the scattering elements 34. FIG. 4 depicts modeled data showing normalized power as a function of scattering angle for a surface, e.g. first major surface 22, comprising an RMS roughness ($R_q$) of approximately 50 nanometers (nm). Curve 50 represents a surface wherein a correlation length of the scattering elements is 200 nanometers, while curve 52 represents a correlation length of 150 nm and curve 54 represents a correlation length of 100 nanometers. The data show a trend toward increased forward scattering (reduced scattering angle) as the correlation length is reduced. Textured surfaces produced according to the present disclosure can provide a glass substrate that does not create a visibly frosted appearance to the glass. Such a frosted appearance reduces transparency and increases haze. The surfaces resulting from the treatments described herein have been shown to produce Distinctness of Image (DOI) values equal to or greater than 90%.

It has been found that the sizes of the plurality of light scattering elements 34 will affect the light scattering properties of light emitter 14. For example, the textured first major surface 22 including light scattering elements 34 can comprise a root mean square (RMS) roughness $R(_q)$ in a range from about 5 nanometers to about 75 nanometers, for example in a range from about 20 nanometers to about 60 nanometers, and in other examples in a range from about 20 nanometers to about 35 nanometers, or from about 20 nanometers to about 30 nanometers. In other examples, a root mean square (RMS) roughness $R(_q)$ in a range from about 5 nanometers to about 20 nanometers, or in a range from about 5 nanometers to about 15 nanometers can be attained. A correlation length T of the scattering elements can be equal to or less than about 252 nm, for example equal to or less than 200 nm, equal to or less than 150 nm, or equal to or less than 100 nm. As noted previously, it has been found that a correlation length equal to or less than about 100 nm is particularly advantageous when considered in the context of a viewing angle goodness parameter, described in more detail herein. The correlation length may be found, for example, by measuring a roughness of the treated surface via a scanning probe microscopy technique such as atomic force microscopy (AFM), and using a software computational package, like Gwyddion.

Figure 5:
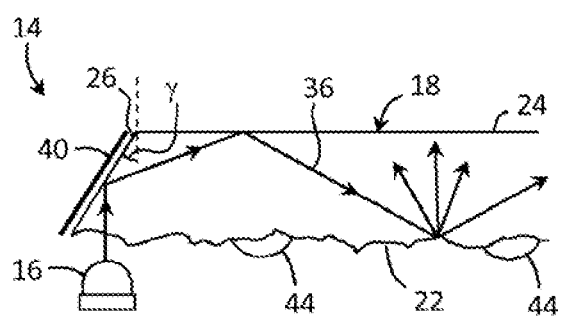
FIG. 5 is a cross sectional side view of another embodiment of a backlight wherein the glass substrate comprising the backlight includes at least one angled edge.

Light source 16 may be one or a plurality of LEDs, or other suitable light generating elements. Moreover, while FIG. 2 illustrates light source 16 along only a single edge or edge surface of glass substrate 18, a light source 16 may be disposed along one or more edge surfaces or one or more borders of glass substrate 18. In one or more embodiments, the one or more edge surfaces of glass substrate 18 may be beveled, as shown in FIG. 5, and may include a metalized reflective surface. The bevel angle γ is chosen to redirect any light propagating within the glass substrate 18 in one or more directions that reduce the escape of light out of the at least one edge surface. Light emitter 14 may optionally include a light redirecting (or blocking) border 40 to improve the optical appearance near the edges of the glass substrate 18.

One or more alternative embodiments may employ one or more light sources 16 and associated structures of the type(s) disclosed in PCT Publication No. WO12/058084 (PCT/US11/57032), published on May 3, 2012, the entire disclosure of which is incorporated herein in its entirety by reference.

Figure 6:
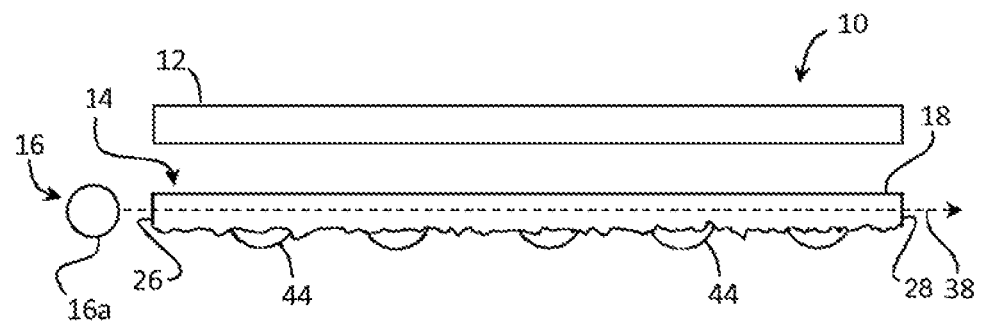
FIG. 6 is a cross sectional side view of another display device wherein the lighting apparatus comprises a fiber optic light source.

FIG. 6 illustrates a light emitter 14 wherein light source 16 comprises at least one light diffusing fiber 16a extending along first edge 26 of glass substrate 18. The light diffusing fiber 16a may be on the order of about 250-300 microns in diameter. Light extracted from light diffusing fiber 16a, such as by scattering, can be coupled into substrate 18.

Figure 7:
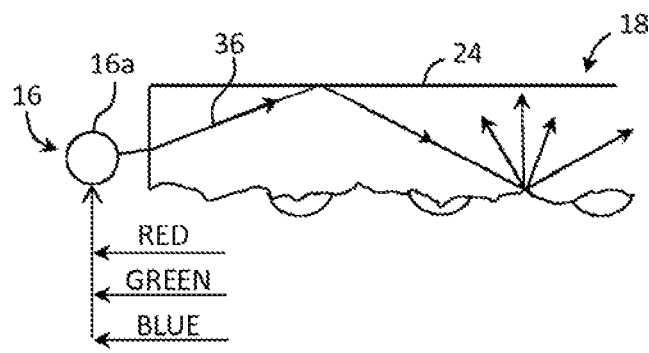
FIG. 7 is a cross sectional side view of a lighting apparatus comprising the display device of FIG. 6 wherein different wavelengths of light can be coupled into the fiber optic light source.

In another embodiment shown in FIG. 7, one or more laser sources may produce white (or semi-white) light to couple into light diffusing fiber 16a and thereafter into substrate 18. In one or more alternative embodiments, one or more laser sources, such as a red laser source (RED), a green laser source (GREEN) and a blue laser source (BLUE), may couple light energy of differing wavelengths into a single light diffusing fiber 16a, or multiple light diffusing fibers, in a way that couples such light into glass substrate 18 and causes diffusion and scattering as discussed previously. Using multiple laser sources permits the production of any number of colors by adjusting the power level of each laser source.

Further details concerning various structures and methodologies associated with modulating the laser sources (e.g., time sequential modulation) to achieve desirable color image functionality and other details concerning the use of the light diffusing fiber 16a may be found in: U.S. Patent Publication No. US2012/0275745A1, published on Nov. 1, 2012; U.S. Patent Publication No. US2013/0272014A1, published on Oct. 17, 2013; and; U.S. Patent Publication No. US2014/0092623A1, published on Apr. 3, 2014, the entire disclosures of which are incorporated herein by reference.

Figure 8:
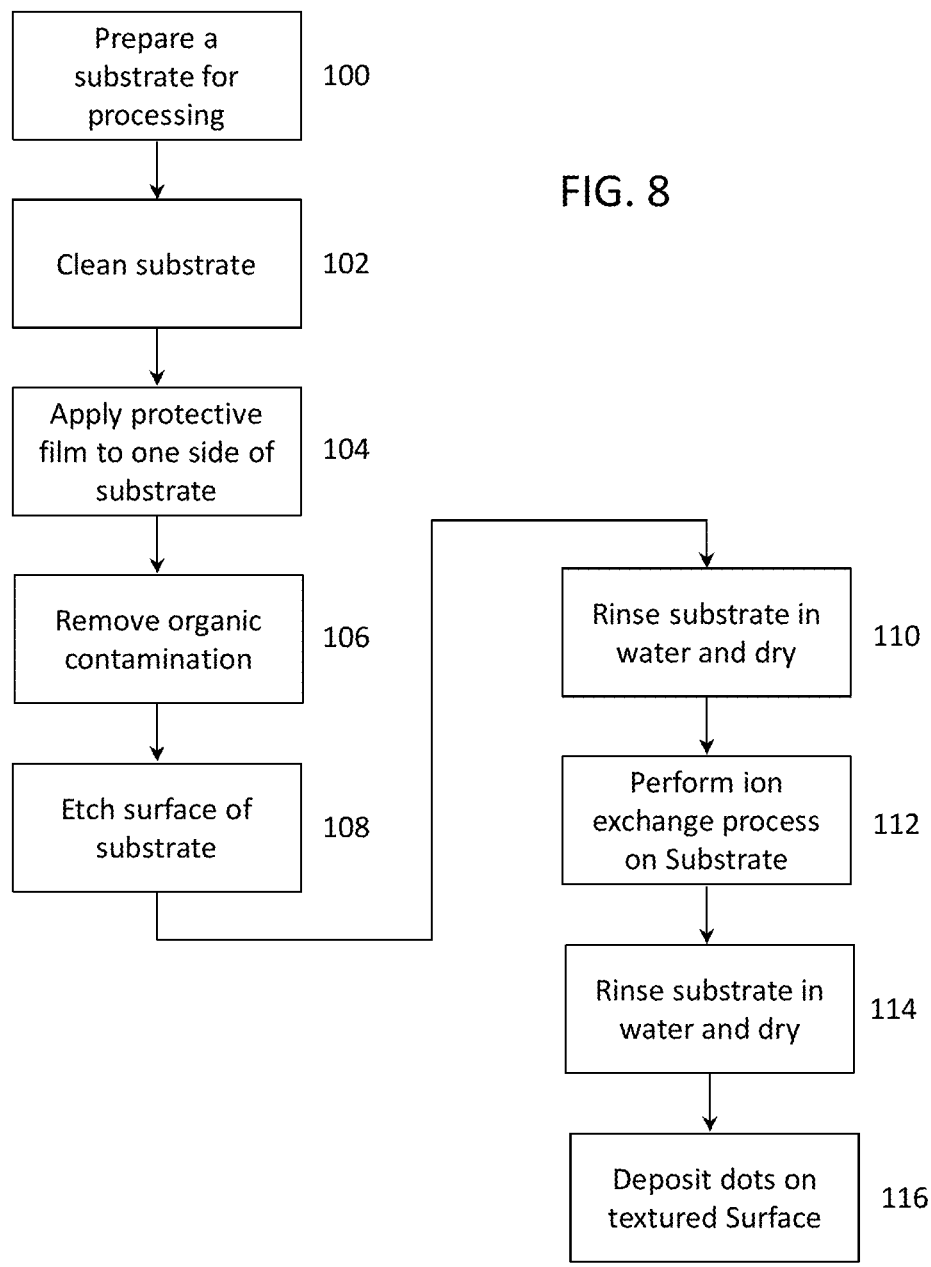
FIG. 8 depicts a process flow diagram for a method of producing a lighting apparatus according to an embodiment of the present disclosure.

Reference is now made to FIG. 8, a flow chart illustrating example process steps in connection with producing light emitter 14, and variants thereof, in accordance with embodiments disclosed herein.

At step 100, glass substrate 18 may, if necessary, be processed to make the glass substrate ready for the subsequent etching step. In particular, glass substrate 18 may be ground and polished, if necessary, to achieve a desirable thickness and/or flatness and/or otherwise sized, and thereafter cleaned and washed in step 102. Step 100 may include edge dressing of substrate 18, for example edge/edge surface beveling. Washing may be accomplished, for example, by exposing first major surface 22, alternatively second major surface 24, or both first and second major surfaces 22, 24, to a suitable detergent cleaning solution such as Semiclean KG, with or without ultrasonic agitation, and multiple de-ionized rinsing steps, followed by drying of the glass substrate. For example, the glass substrate may be placed in a bath comprising the cleaning solution, then rinsed by dipping or spraying with water. The glass substrate should be cleaned sufficiently such that a water contact angle of the surface to be etched is equal to or less than about 20 degrees.

Figure 9:
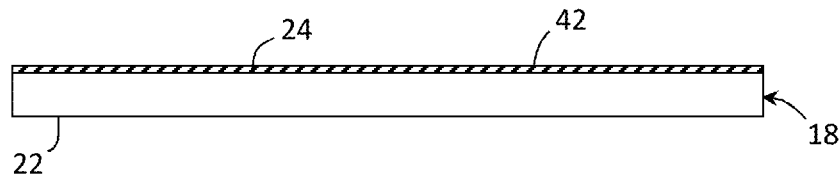
FIG. 9 is a cross sectional side view of a glass substrate for use in a backlight as disclosed herein, wherein a protective laminate is applied to a surface of the glass substrate.

At step 104, if a major surface of the glass substrate 18 will not be etched, for example second major surface 24, the major surface not to be etched may optionally be laminated (preferably over the entire surface) with a protective film 42 that resists or prevents etching (see FIG. 9). It should be apparent that should it be desired to etch both major surfaces of the glass substrate with the etchant, a protective laminating film may not be required. In another optional next step 106, the major surface or surfaces to be etched, for example first major surface 22, may be subjected to a process for removing contamination, such as adsorbed organic contamination. Such process may include exposing at least first major surface 22 to a plasma cleaning process as is known in the art.

At step 108, the major surface of glass substrate 18 to be etched is subjected to etching by exposing the surface to an etchant comprising an organic solvent, for example acetic acid (AA), and an inorganic acid, such as ammonium fluoride ($NH_4F$), for a time and at a temperature sufficient to obtain the requisite roughness and correlations lengths. The etchant may comprise an organic solvent, for example acetic acid, in a range from about 10% by weight to about 98% by weight. In further examples, the organic solvent may be in a range from about 10% to 80% by weight, in a range from about 20% to about 70% by weight, or in a range from about 30% to about 60% by weight. In still other examples the organic solvent may be in a range from about 80% by weight to about 98% by weight, for example in a range from about 90% by weight to about 98% by weight or in a range from about 92% by weight to about 98% by weight.

The etchant may further comprise an inorganic acid in a range from about 0.5% by weight to about 50% by weight. For example, the etchant may comprise an inorganic acid in a range from about 10% by weight to about 40% by weight, from about 15% by weight to about 30% by weight. In other examples the etchant may comprise an inorganic acid in an amount from about 0.5% to about 10% by weight, or from about 0.5% by weight to about 6% by weight. In certain embodiments the etchant may contain water (e.g. de-ionized water) in an amount equal to or less than 8% by weight, for example in a range from about 0.5% by weight to about 6.0% by weight, from about 0.5% by weight to about 4.0% by weight, or from about 0.5% by weight to about 2.0% by weight. Optimal concentrations may vary depending on glass composition and environmental conditions, such as dew point, which can affect physisorbed water on the glass surface, and the resultant texture desired.

In some embodiments certain other additives may be incorporated into the etchant. For example, a dye may be added to the etchant to add color and produce a visual aid for rinsing. In addition, as previously described, viscosity modification components may be added to increase the viscosity of the etchant and enable contact by slot, slide or curtain coating etchant on glass vs. dipping, to provide a light emitter with uniform appearance. Alternatively, artistic effects can be achieved for when non-uniform light extraction is required by applying etchant using spraying or painting techniques. A high viscosity etchant may reduce the vapor pressure and thereby reduce vapor-induced defects. The viscosity of the etchant can be adjusted to be compatible with the selected method of application as needed. Suitable polymers such as polycaprolactone that are soluble in acetic acid may be used to modify the rheology of the etch solutions.

The etch time may range from about 30 seconds to about 10 minutes, although other times may be employed if such other times yield desirable results. For example, exposure times in a range from about 1 minute to about 4 minutes have been found useful for many glass compositions. The temperature of the etchant may be in a range from about 18° C. to about 90° C., for example in a range from about 18° C. to about 40° C., in a range from about 18° C. to about 35° C., in a range from about 18° C. to about 30° C., in a range from about 18° C. to about 25° C., or even in a range from about 18° C. to about 22° C. Etchant temperatures in the lower ranges, for example, ranges in the 18° C. to 30° C. range, are favored since this can reduce vapor pressure and produces fewer vapor-related defects on the glass. Again, the etch time and etchant temperature will have an effect on the feature size, shapes, and distribution of the resulting light scattering elements 34, which are nanometer-scale protrusions extending from the etched surface of the glass substrate and produced by the etching process. Etch texture can vary with glass composition. Accordingly, etchant recipes optimized for one glass composition may require modification to remain effective for other compositions. Such modification is typically accomplished through experimentation.

In some embodiments, as best seen in FIG. 9, if a surface is not to be etched, e.g. second major surface 24, that surface may be protected by applying an etchant-resistant protective film 42 to the surface. Etchant-resistant protective film 42 may be removed after the etching step(s). Table 1 below presents non-limiting examples of some suitable etchant solutions and etch times.

TABLE 1

| Solution number | Weight % etch components | | | Etch Time, min |
|---|---|---|---|---|
| | Acetic Acid | Ammonium Fluoride | Water | |
| 1 | 92.8 | 5.4 | 1.8 | 2.5 |
| 2 | 94.1 | 4.1 | 1.8 | 3.5 |
| 3 | 95.8 | 1.4 | 2.9 | 4.1 |
| 4 | 93.4 | 3.8 | 2.8 | 5.1 |
| 5 | 94.9 | 1.1 | 4.0 | 5.5 |
| 6 | 92.1 | 2.2 | 5.8 | 5.5 |
| 8 | 91.0 | 8.0 | 1.0 | 9.0 |
| 9 | 91.0 | 1.0 | 8.0 | 9.0 |
| 10 | 91.0 | 4.5 | 4.5 | 7.0 |

Thus, the etchant should include an organic solvent, e.g. acetic acid, in a concentration from about 90.0 percent by weight to about 96 percent by weight, and ammonium fluoride in a concentration in a range from about 1.0 percent by weight to about 8.0 percent by weight. The etchant may include water in an amount equal to or less than about 8.0 percent by weight, for example from about 1.0 percent by weight to about 6.0 percent by weight. In addition, it has been found that the temperature of the glass substrate itself at the time the glass substrate is exposed to the etchant can in some instances also affect etching results. Accordingly, the glass substrate when exposed to the etchant may be at a temperature in a range from about 20° C. to about 60° C., for example in a range from about 20° C. to about 50° C., or in a range from about 30° C. to about 40° C. (see Example 3). The optimal temperature will depend on glass type, environmental conditions and the desired texture. Etch times may extend from about 1 minute to about 10 minutes, although other etch times as may be needed to achieve the desired surface texture may also be used. As will be discussed further below, the foregoing chemistry may be adjusted to accommodate different applications and different glass compositions.

At step 110, glass substrate 18 can be rinsed with a rinsing solution, for example water, in one or more rinsing (de-acidifying) actions. Alternatively, in some embodiments the glass substrate can be soaked in 1M $H_2SO_4$ for up to 1 minute to remove precipitated crystal residue on the surface of the glass substrate. However, other mineral acids may be substituted for $H_2SO_4$, for example HCl or $HNO_3$. The rinsing solution may be heated in one or more of the rinsing actions. In some embodiments the rinsing solution may include other fluids in which precipitant from the etching process is dissolvable.

At an optional step 112, the glass substrate may be subject to an ion exchange process. If such a process is desired, then the process can begin with preparing at step 100 a glass substrate 18 capable of being ion exchanged. For example, ion-exchangeable glasses suitable for use in embodiments described herein include without limitation alkali aluminosilicate glasses or alkali aluminoborosilicate glasses, though other glass compositions may be substituted. As used herein, being capable of ion exchange means a glass capable of exchanging cations located at or near the surface of the glass substrate 18 with cations of the same valence that are either larger or smaller in size.

The ion exchange process is carried out by immersion of the glass substrate 18 into a molten salt bath for a predetermined period of time, where ions within the glass substrate at or near the surface thereof are exchanged for larger metal ions, for example, from the salt bath. By way of example, the molten salt bath may include potassium nitrate ($KNO_3$), the temperature of the molten salt bath may be within a range from about 400° C. to about 500° C., and the predetermined time period may be within a range from about 4 hours to 24 hours, for example in a range from about 4 hours to 10 hours. Incorporation of larger ions into glass substrate 18 strengthens surfaces of the glass substrate by creating a compressive stress in a near-surface region. A corresponding tensile stress is induced within a central region of the glass substrate 18 to balance the compressive stress.

By way of further example, sodium ions within glass substrate 18 may be replaced by potassium ions from the molten salt bath, though other alkali metal ions having a larger atomic radius, such as rubidium or cesium, may replace smaller alkali metal ions in the glass. According to particular embodiments, smaller alkali metal ions in glass substrate 18 may be replaced by $Ag+$ ions. Similarly, other alkali metal salts such as, but not limited to, sulfates, halides, and the like may be used in the ion exchange process. The replacement of smaller ions by larger ions at a temperature below that at which the glass network can relax produces a distribution of ions across the surface of the glass substrate 18 that results in a stress profile. The larger volume of the incoming ion produces a compressive stress (CS) on the surface and tension (central tension, or CT) in the center region of the glass substrate 18. At optional step 114 the glass substrate after ion exchange is subjected to a final water rinse followed by drying.

It should be apparent from FIG. 1, for example, that the intensity of the scattered light as a function of propagation distance will be dependent at least on the number of "bounces" as the light propagates generally along axis 38. Thus, light that is scattered nearer light source 16 will typically have a greater intensity than light that is scattered farther from light source 16. Moreover, intrinsic attenuation within the light guide will reduce the intensity of the propagating light. Accordingly, methods to control the scattering to account for these optical losses can be applied. In one example, a deposition of micrometer-sized features after the etching can be used to control the light scattering as a function of distance across a surface of the glass substrate. This deposition process can be implemented, for example, by ink-jet printing, silk screening or other suitable deposition process.

As best shown in FIGS. 1, 2 and FIG. 6, etched first major surface 22 can be provided with a pattern of deposited material comprising discrete layers 44 at step 116, hereinafter "dots" 44. The dots 44 suppress scattering at first major surface 22. As seen in FIG. 2, while locally randomized, dots 44 are arranged on a macro scale in a graduated configuration such that the spatial density of dots, defined by a percent coverage of a unit surface area by the dot material, decreases as one moves away from light source 16 along axis 46. For example, a spatial density of dots proximate first edge 26 can be at a percent coverage of 75%, whereas a spatial density of dots proximate second edge 28 can be at a percent coverage of 25%. It should be understood, however, that the spatial density of dots can be configured in different percentages based on the desired effect. In other examples the spatial density can vary in a range from about 90% to about 10%, in a range from about 60% to about 40%. The variation in spatial density of the dots can vary linearly or nonlinearly as necessary to match the light attenuation between the maximum spatial density and the minimum spatial density or the desired optical effect. In comparison, the spatial density along a line parallel with first edge 26 can be substantially uniform, so that no substantial gradient exists along axis 43. The plurality of dots 44 may be configured to be non-overlapping. To avoid being visually apparent to an observer, the plurality of dots 44 may be transparent, and should have an index of refraction that is within ±10% of the index of refraction of the underlying substrate. The closer the index matching, the more effective the dotsd will be at suppressing scattering. Accordingly, in some embodiments the index of refraction of the dots can be within ±5% of the index of refraction of the underlying substrate. The spatial density of the dots can be varied depending upon how many edges of the substrate are lighted by coupling light from a suitable light source. For example, using the example described supra, if the glass substrate is lighted from both first edge 26 and second edge 28, the density of dots may be high at both first edge 26 and second edge 28, since the intensity of the light is greatest proximate the light source, and decreasing from each edge as one moves toward the middle of the glass substrate, midway between the two edges (assuming, for example, the light intensity at each edge is the same). A similar rationale applies if all four edges are lighted such that the lowest suppression of scattering occurs within the central portion of the light guide, yet a substantially uniform amount of light is extracted across the surface of the glass substrate to produce substantially uniform illumination.

Each dot 44 may be formed by depositing a predetermined amount of a suitable material, e.g. a polymer resin, having an index of refraction approximately equal to the index of refraction of the glass substrate to which they are applied (e.g., within 10%), and at a prescribed position on the etched surface of glass substrate 18. Any number of suitable resins may be employed. For example, one suitable resin is Accuglass® T-11 produced by the Honeywell Corporation. Accuglass® T-11 is a family of heat-cured methylsiloxane polymer resins useful for planarization of media, particular in the field of integrated circuits. Accuglass® T-11 includes an index of refraction of 1.39 @ 633 nm. It should be noted, however, that dots 44 need not be a polymer resin. For example, dots 44 could be a transparent conductive oxide material having a similar index of refraction or any other material that includes an index of refraction closely matching the index of refraction of the underlying substrate and is simultaneously suitably transparent. Deposition of dots 44 may be performed by any suitable deposition technique compatible with the nature of the material deposited. For example, polymer resin can be deposited by an ink jet printer, or by silk screen printing. For example, a FujiFilm® Dimatix™ 2831 ink jet printer with a 1 picoLiter print head has been successfully employed for this purpose. In the case of ink jet deposition, a desired dot configuration can be assembled as a digital bit map and provided to the printer. Each dot may comprise a diameter in a range from about 15 micrometers to about 30 micrometers, for example from about 20 micrometers to about 28 micrometers or from about 22 micrometers to about 26 micrometers. A maximum thickness t of each dot may be in a range from about 4 nm to about 10 nm, for example, from about 4 nm to about 8 nm. If the dots are deposited via an ink jet printer, the volume of polymer resin can be in a range from about 1 picoLiters (pL) to about 15 pL. Ink jet printing has so far been shown to be the most controllable and consistent method of depositing the dots. Moreover, the ability to easily program the deposition pattern, and if necessary make changes thereto, is particularly advantageous. After the deposition process is completed, the deposited resin may then be cured at an elevated temperature to harden the resin. If the resin is instead curable by an ultraviolet light, the resin may be cured by exposure to the requisite wavelength of light. It should be noted that the volume of ink used during the deposition of the dots is controlled such that the ink does not protrude significantly above the surface of the substrate they have been deposited on.

As described supra, an area of the etched surface covered by a dot 44 extracts less light through scattering than a non-covered area by enhancing total internal reflection (conversely, by suppressing scattering). Thus, the deposition of dots on a textured surface provides a means for controlling the brightness at specific locations on the textured surface by controlling the percentage of surface area covered by dots 44 as a function of position on the textured surface. Once the dots have been deposited, protective film 42 applied to the un-etched surface of the glass substrate may be removed if desired.

In still another aspect, production of substrates comprising a textured surface can be produced in a production-friendly manner that largely eliminates messy wet chemical etching of individual substrates.

In a first step, a master mold can be produced in accordance with steps described previously, for example through wet chemical etching to obtain a substrate with a surface texture, the textured surface having an RMS surface roughness equal to or less than 75 nm, for example in a range from about 5 nm to about 75 nanometers and wherein a correlation length of the surface texture is equal to or less than 150 nanometers, for example in a range from greater than zero to equal to or less than 150 nanometers, or in a range from greater than zero to equal to or less than 100 nanometers.

In a second step, an uncured elastomer can be applied to the textured surface of the master mold to coat the textured surface. Once the textured surface has been coated with the uncured elastomer, the elastomer can be cured in accordance with the curing method of the particular elastomer. For example, if the elastomer is an ultraviolet light (UV) curable resin, the coated textured surface can be exposed to a suitable UV light from a UV light source to cure the elastomer. In other embodiments, the uncured elastomer may be a thermoplastic material that is cured with exposure to heat. When curing is finished, the cured elastomer coating can be removed from the textured surface of the master mold to produce an elastomer production mold in a third step.

To produce additional substrates including a textured surface comprising a surface roughness and correlation length identical to the surface texture of the master mold, one or more substrates, for example glass substrates, can be coated with a suitable UV-curable resin on at least one major surface of the one or more substrates. The UV-curable resin should be selected such that upon curing, the UV-curable resin attains an index of refraction that matches or nearly matches the index of refraction of the substrate (e.g. within ±10% of the index of refraction of the substrate). The production mold produced in the foregoing process may then be pressed into the UV-curable resin, after which the UV-curable resin is cured by exposing the UV-curable resin to UV light in accordance with the curing requirements of the particular resin. Once the UV-curable resin has been cured, the elastomer production mold can be removed, leaving a substrate with at least one textured major surface having an RMS surface roughness equal to or less than 75 nanometers, for example in a range from about 5 nanometers to about 75 nanometers and wherein a correlation length of the surface texture is equal to or less than 150 nanometers, for example in a range from greater than zero to equal to or less than 150 nanometers, or in a range from greater than zero to equal to or less than 100 nanometers.

In some embodiments the substrate may be a glass substrate. A thickness of the glass substrate can be, for example, equal to or less than 3 millimeters, for example, in a range from about 0.01 millimeters to about 3 millimeters, in a range from about 0.01 millimeters to about 2 millimeters, in a range from about 0.01 millimeters to about 1 millimeters, in a range from about 0.01 millimeters to about 0.07 millimeters. In some embodiments the glass substrate can be a flexible glass substrate having a thickness in a range from about 0.01 millimeters to about 0.3 millimeters, in a range from about 0.01 millimeters to about 0.2 millimeters, or in a range from about 0.01 millimeters to about 0.1 millimeters. The flexible glass substrate may be a flexible glass ribbon. In some embodiments the flexible glass ribbon can be in the form of a roll, wherein the UV-curable resin is applied to at least one major surface of the flexible glass ribbon as or after the flexible glass ribbon is dispensed from the roll.

Figure 10:
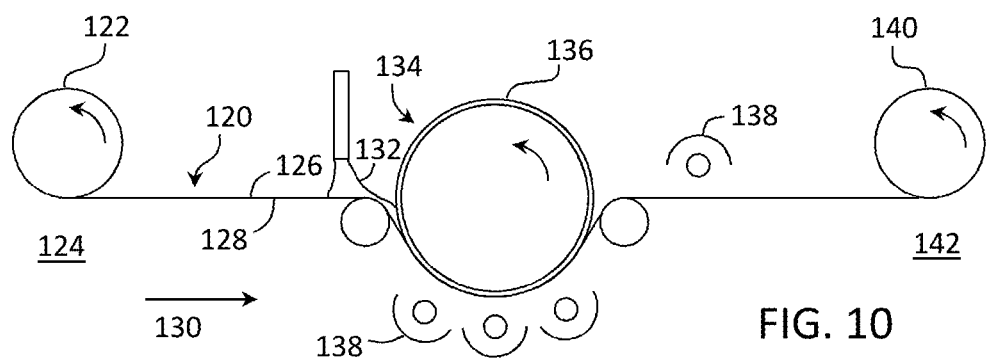
FIG. 10 is a schematic diagram of an example nano-replication process that can be used to produce a polymer film with a textured surface.
Figure 11:
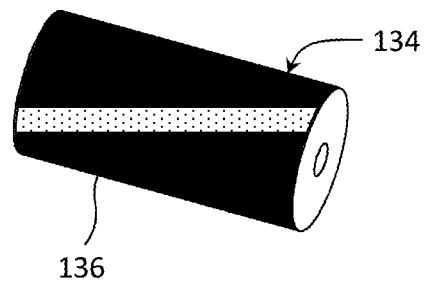
FIG. 11 is a drum used to produce a textured surface in the process shown in FIG. 10.

FIG. 10 illustrates a process wherein at least one major surface of a flexible glass ribbon can be processed to produce at least one textured major surface in a continuous manner. As shown in FIG. 10, a flexible glass ribbon 120 is configured in a roll 122 at a pay-out station 124. The flexible glass ribbon comprises two longitudinal edges extending along a length of the flexible glass ribbon, the two longitudinal edges defining the lateral width of two major surfaces 126, 128 of the flexible glass ribbon. The flexible glass ribbon 120 is payed out from roll 122 in a conveyance direction 130 along a predetermined conveyance path and coating 132 of a suitable index-matched UV-curable resin is applied to the least one major surface of the flexible glass ribbon, for example major surface 126. The at least one major surface of the flexible glass ribbon may then be contacted with an embossing drum 134 including a textured surface 136 and, simultaneous with the contacting, the index-matched resin is cured by exposing the resin to a UV light from UV light sources 138. The embossing drum surface contacting the UV-curable resin can include, for example, a production mold manufactured in accordance with the foregoing process, wherein the production mold is attached to a peripheral surface of embossing drum 134. As the embossing drum rotates and the flexible glass ribbon continues advancing along the predetermined conveyance path, the production mold ceases contact with the cured UV-curable resin and comes into contact with uncured UV-curable resin in a continuous manner. The upstream (leading) portion of the flexible glass ribbon, including a polymer surface layer comprising a textured surface, may then be taken up by receiving roll 140 at take up station 142.

In another embodiment, embossing drum 134 can have the appropriate texture formed directly into a peripheral surface thereof. For example, a laser can be used to produce a texture directly on the outer circumferential peripheral surface of the embossing, such as by laser etching (engraving) or ablation. The laser may heat up the surface and subsequently vaporize the surface of the embossing drum, or may ablate the surface. In some examples a pulsed, short-duration laser beam can be used to produce pitting of the surface in a pattern programmed into the laser controller, the pattern conforming to a predetermined surface roughness such as the surface roughness and correlation length described herein.

Polymer films produced in a manner as described above, where a texture is applied to a surface thereof, can be used in a variety of applications. For example, in one such application, a transparent glass substrate including a polymer film comprising a texture can be used in a projection viewing system. In such as system, an image screen is produced comprising a glass substrate including textured surface as previously described. The textured surface may be formed on a first surface of the glass substrate itself, such as by etching, or the textured surface may be formed in a polymer layer that was deposited on a surface of the first glass substrate. The glass screen may then be mounted, for example positioned in a frame or stand. A projector can then project an image onto the glass screen. The light forming the image is scattered by the texture present on the textured surface such that the image is visible on the glass screen. In some embodiments a second glass substrate may be joined to the first glass substrate such that the textured surface is sandwiched between the first glass substrate and the second glass substrate. The glass screen may include a surface roughness equal to or less than 100 nanometers, for example an RMS surface roughness ($R_q$) in a range from about 5 nanometers to 75 nanometers, and a correlation length equal to or less than 150 nanometers, such as greater than 0 nanometers but equal to or less than 150 nanometers. In some examples the correlation length is greater than 0 nanometers but equal to or less than 100 nanometers.

Figure 12:
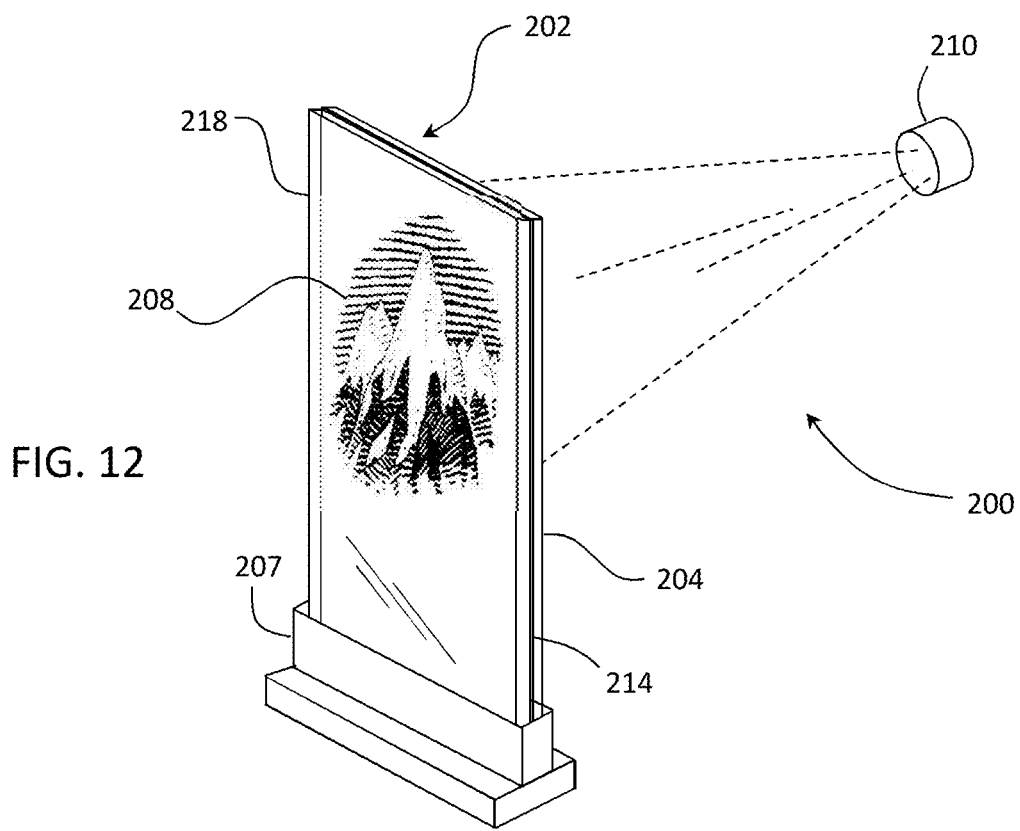
FIG. 12 is a perspective drawing of a projection system for projecting an image onto a transparent projection screen.

FIG. 12 illustrates a projection system 200 comprising projection screen 202 including a textured substrate 204. Projection screen 202 is shown as a free-standing structure supported in an upright posture by a base 207. The textured substrate can be a glass substrate, a polymer substrate or a combination of polymer and glass as discussed more fully below. An image 208 may be projected onto projection screen 202 from projecting device 210. A cover glass 218 may be positioned adjacent textured substrate 204.

Figure 13A:
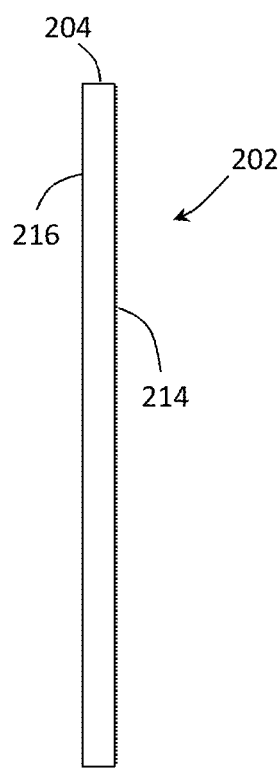
FIGS. 13A, 13B and 13C are edge views of several embodiments of projection screens useable with the projection system of FIG. 12.

In one embodiment, shown in FIG. 13A, projection screen 202 comprises textured glass substrate 204 including a surface texture as described supra. Textured glass substrate 204 may include, for example, a surface 214 etched with an etchant as previously described to produce the requisite surface roughness (and correlation length if applicable) on at least one surface of the glass substrate. An opposing surface, here shown as surface 216, may or may not be etched to produce a desired texture. A cover substrate 218 may be bonded to the textured surface 214 of glass substrate 204 if desired in order to protect textured surface 206 from damage.

Figure 13B:
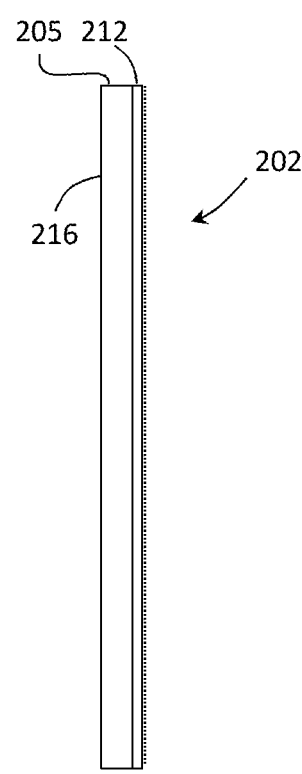
Figure 13C:
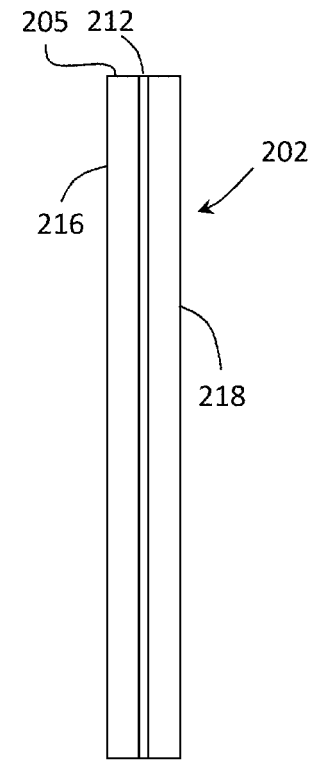

In another embodiment, shown in FIG. 13B, projection screen 202 may comprise a glass layer, for example untextured glass substrate 205, and a polymer layer 212 disposed on the glass layer. Polymer layer 212 includes a surface texture having the surface roughness characteristics described supra. For example, the surface texture can be produced via a micro or nano-replication technique as described above, or any other suitable replication process. The surface texture can be applied to the polymer layer after deposition of the polymer layer to the glass substrate, or the polymer layer may be added to the glass substrate, for example as a pre-textured film. As shown in FIG. 12 and FIG. 13C, a cover glass substrate 218 may be positioned over the polymer layer 212. Cover glass 218 may be configured with touch functionality. Alternatively, non-textured surface 216 may be provided with touch functionality.

In another aspect, a textured glass substrate configured to minimize electrostatic charging of the glass substrate, such as through triboelectrification that can occur during contact separation, is disclosed.

Flat panel display glass used to build a display panel, and particularly that portion of the display panel including thin film transistors consists of two sides, a functional side ("backplane") upon which thin film transistors (TFTs) may be built (A-side) and a non-functional B-side. During processing, the B-side glass contacts a variety of materials (i.e. paper, metals, plastics, rubbers, ceramics, etc.) and can accumulate an electrostatic charge through triboelectrification. For example, when the glass substrate is introduced into the production line and an interleafing material, for example a laminated paper, is peeled from the glass substrate, the glass substrate can accumulate an electrostatic charge. Moreover, during the manufacturing process for semiconductor deposition, the glass substrate is commonly placed on a chucking table, B-side in contact with the chucking table, where the deposition is performed. The chucking table may, for example, restrain the glass via one or more vacuum ports in the chucking table during processing. When the glass substrate is removed from the chucking table, the B-side of the glass substrate can be electrostatically charged through triboelectrification and/or contact electrification. Such electrostatic charge can cause many problems. For example, the glass substrate can be adhered to the chucking table by the electrostatic charge and the glass substrate subsequently broken into pieces when an attempt is made to remove the glass substrate from the chucking table. Moreover, due to the electrostatic charge, particles and dust can be attracted to the glass surface and contaminate it. More importantly, the release of electrostatic charge from the B-side to the A-side (so-called electrostatic discharge, ESD) can cause failure of the TFT gate and/or line damage on the A-side that reduces product yield.

Methods described herein may be used to minutely texture a glass surface by reducing he contact area in a manner that effectively reduces the intimacy of contact during triboelectrification and/or contact electrification, resulting in reduced glass voltage or surface charge, without a noticeable reduction in the transparency of the glass, for example with minimal haze. As previously described, an organic solvent is introduced to an inorganic acid to produce rapid localized precipitation that forms crystal features on a glass substrate surface. These precipitates are the etching byproducts, normally fluorosilicate salts, which mask the underlying glass surface and hinder etching in these locations. Residual crystalline precipitates are dissolved away during a subsequent hot water wash or with an acid wash, leaving texture features on the glass surface as a result of the etching. By adjusting the organic solvent-to-etchant ratio or etch time or etchant temperature a wide range of texture roughness can be obtained, from nanometer to micrometer range.

Methods described herein can be applied to almost all of the traditional etchants used in the glass industry. For example, the inorganic acid could be hydrogen fluoride acid, buffered hydrogen fluoride acid (or the mixture of ammonium fluoride and hydrogen fluoride), sodium fluoride and their mixtures with mineral acids including hydrogen chloride, sulfuric acid, phosphoric acid and nitric acid. The organic solvent must be miscible with the etchant. Suitable organic solvents include without limitation acetic acid, polyethylene glycol, isopropanol alcohol, ethanol, methanol, and others.

Accordingly, in some embodiments the processes described herein may be altered as necessary. For example, if the intent is to reduce electrostatic charging and not to produce a light guide, such aspects as viewing angle may not be important considerations. Additionally, changes in glass type and/or composition may further warrant adjustments to the chemistry involved in the etching process.

In one example process, a glass substrate is initially washed with a KOH solution to remove organic contaminants and dust on the surface as a pristine glass surface is needed to achieve uniformly distributed protrusions (texture features) on the glass surface. Other washing solutions may be substituted as needed. The presence of contaminants or dust on the surface can act as nucleation seeds. These nucleation seeds can induce crystallization around them, resulting in a non-uniform surface texture.

Next, the glass substrate is soaked in a solution containing an organic solvent in a range from about 10% by weight to about 90% by weight, for example in a range from about 10% to about 80% by weight, in a range from about 20% to about 70% by weight, in a range from about 20% by weight to about 30% by weight or in a range from about 40% by weight to about 60% by weight. The etchant may further include an inorganic acid in a range from about 1% to about 50% by weight, for example in a range from about 5% to about 40% by weight, or in a range from about 10% by weight to about 30% by weight. For example, in some embodiments a solution containing $NH_4F$ in a range from about 1% to 20% by weight and 5% to about 50% by weight acetic acid or polyethylene glycol can be selected. Depending on the desired texture roughness, the etching time can range from about 30 seconds to a few minutes, for example in a range from about 30 seconds to about 4 minutes, from about 30 seconds to about 3 minutes or from about 30 seconds to about 2 minutes. The solution may be static in some examples, while the solution can be stirred or otherwise agitated in other examples. For example, the etchant may be recirculated. Experiments have shown no discernible difference in surface texture based on etchant agitation within the etchant concentrations and etch times described.

After etching is completed, the glass substrate can be soaked in 1M $H_2SO_4$ for up to 1 minute to remove crystal residues on the surface. However, the $H_2SO_4$ acid wash can be replaced by other mineral acids such as HCl or $HNO_3$. Alternatively, or in addition, a hot water wash may be applied. A low pH value (or high temperature) can increase the solubility of the precipitated crystals. Consequently, a pH greater than 7, for example greater than 8, is desired. After the wash the glass substrate may be rinsed with water to remove the acid residue, then dried.

The resulting average roughness found to be effective to reduce surface voltage (e.g. electrostatic charging), expressed as an average roughness ($R_a$) is typically in a range from about 0.4 nanometers to about 10 nanometers. Typical haze values are equal to or less than 1% but may in some examples extend to as great as 6%. Accordingly, specific solution recipes as described above can be varied within the disclosed ranges as necessary to attain a surface within the foregoing constraints.

Using the treatment methods described herein can result in a reduction of surface voltage exhibited by a glass substrate surface from about 20% to about 70%, for example in a range from about 23% to about 67%, over the untreated substrate surface when tested via the disclosed peel test. In the context of reducing the danger from electrostatic discharge and the potential damage to sensitive electronic components, such a change in acquired electrostatic charge is significant and useful.

However, further disclosure reveals a contact-area-based metric that can be used to characterize the advantageous component of surface topography most impactful to electrostatic charging behavior, and which describes regimes of ESD-advantaged surface topography not captured or predicted by simple parameters like average roughness ($R_a$).

It is known that surface topography can be quantitatively defined or described using a variety of metrics over a variety of length scales with corresponding advantages and disadvantages to the different data collection and quantification methods. Techniques like atomic-force microscopy (AFM) or optical profilometry described elsewhere herein provide images with height (z) for each pixel measured in x and y dimensions. The size of the x-y pixel determines the ability of the technique to resolve small features, while the x-y field-of-view limits the ability to capture larger features (or changes in topography that occur over wider scales). An important note in this regard is that the essential character of surface texture can be well-described using some metrics, but totally fail by other metrics. For example, if one had a surface texture covered by a regular array of 1 millimeter diameter dots of 100 nanometer height, but collect images 50 nanometer×50 nanometer in size and quantify the pattern using only correlation length, one could completely fail to capture the salient aspects of the topography. The degree to which this might be true depends on the behavior one wishes to understand.

With this in mind, average roughness ($R_a$) or root mean square roughness ($R_q$) are some of the most commonly used parameters to describe surface topography, and yield information about the amplitude variation of heights on a surface (consistent with the traditional sense of "roughness"). In practice, however, this definition is only really appropriate when the topography being described has more-or-less "random" variations of heights on its surface. Ra and Rq fail to capture or suitably quantify the presence of "features" on a surface that one can visibly see in an image, instead serving to average them out over the field-of-view. It is thus not the most appropriate metric for quantifying the benefit of surface texture in terms of contact separation when the surface contains topography other than random roughness.

Other parameters like skewness or kurtosis also seek to quantify the asymmetry of the surface height profile about a mean surface level. For example, as described previously, negative skew indicates a predominance of "valleys," while positive skew is seen on surfaces with a predominance of "peaks." Kurtosis measured the deviation from "random" amplitude variations, with 3 representing a normal/Gaussian distribution of heights. However, these single values also do not suitably describe the height distributions of nanometer-scale features on a surface considered important for contact separation, and tend to underestimate the contribution of surface features, for example, when the features are sparsely distributed on a surface.

Accordingly, a metric is used that can define ESD-advantaged surface topographies in a way that captures their essential benefit through enhanced contact separation. Hereafter we define this metric as a figure-of-merit (FOM) specific to contact separation, per the following equation:

$$FOMm = \frac{CA \cdot \delta^m}{N} \times \sum_{i=1}^{N} \frac{1}{\Delta_i^m} \quad (5)$$

with:

$$\Delta_i = \begin{cases} h_t - h_i + \delta & h_i \leq h_t \\ h_t + \delta & h_i > h_t \end{cases} \quad (6)$$

where the parameter $h_t$ is a "threshold height", effectively defining the contribution of uppermost heights on a surface that comes into contact with a second surface during a contact event. For example, $h_t$=0.95 corresponds to the top 5% of height values in an image represents pixels that are "in contact" while $h_t$=0.50 considers the top 50% of height values in an image represents pixels that are "in contact."

An alternative way of thinking about this parameter is the "depth" to which surface features elastically compress during a contact event, such that multiple pixels at the peak of a feature are rendered in contact, and thus not artificially restricted to the single topmost pixel at the top of each peak.

The parameter δ is a "stand-off", representing a minimum distance between the contacted area and an imaginary plane during a contact event, Δ effectively describes for pixels not "in-contact" the extent of separation from the imaginary contact plane during a contact event, CA is the contact area, given by the number of pixels for which $h_i \geq h_t$, m is the exponent of the denominator and weights the importance of separation distance for pixels not "in-contact." In evaluations of FOM, m is selected to be either 2 ("FOM2") or 6 ("FOM6"), respectively representing physics of Coulombic ($\sim r^2$) or Lennard-Jones ($\sim r^6$) interaction-length dependencies. The surface height data for individual pixels is $h_i$, where there are N total surface height elements in the $h_i$ data.

In plain language, the first term in equation (5) captures the area of the surface in "direct" contact with a secondary surface, in this case mathematically equivalent to an imaginary plane, during a contact event. The second term in the equation describes for regions of the surface not in "direct" contact how separated it is from the contacting surface. In the limit of improved ESD behavior, FOM approaches zero as (a) effective surface-to-surface contact-area is reduced (CA→0) and (b) those regions not in direct contact are as far away from the second surface as possible (Δ→∞). Accordingly, in some examples a substrate, such as a glass substrate, includes at least one textured surface comprising an FOM in a range from 0 to 0.8, for example in a range from greater than zero to about 0.78, in a range from about 0.01 to about 0.7, in a range from about 0.05 to about 0.6, or in a range from about 0.01 to about 0.5 for m in a range from 2 to 6 and wherein $0.1 \leq \delta \leq 10$ nm, for example $0.1 \leq \delta \leq 2$ nm, and $0.5 \leq h_t \leq 0.999$, for example $0.75 \leq h_t \leq 0.99$.

It should be noted that the foregoing discussion in terms of electrostatic charging does not by itself address the optical qualities of the substrate should those optical properties be of interest. That is, FOM is directed toward minimizing electrostatic charging of a substrate based on, for example, contact separation, and is equally applicable for transparent or opaque substrates (e.g. glass substrates). Accordingly, for instances where attention must be paid to a transparency of the substrate, the ESD characteristics must be balanced with the optical qualities. To wit, a substrate having optimal surface properties for electrostatic charging may still present less than optimal optical properties. Thus, obtaining a substrate comprising both an acceptable FOM and acceptable transparency may require compromise between the two requirements, and while it has been shown that FOM is generally insensitive to roughness (either $R_a$ or $R_q$), these attributes may still have importance to transparency. In further examples, a substrate comprising an FOM in a range from 0 to 0.8, for example in a range from greater than zero to about 0.78, in a range from about 0.01 to about 0.7, in a range from about 0.05 to about 0.6, or in a range from about 0.01 to about 0.5 may also include an RMS roughness $R_q$ where 5 nanometers≤Rq≤75 nanometers, and wherein the texture of the textured major surface includes a correlation length T where 0 nanometers<T≤150 nanometers.

EXAMPLES

The present disclosure will be further clarified by the following examples.

Example 1

Corning® Code 2320 glass samples were etched in solutions 1-6 from Table 1. Brightness and haze were measured and the data are presented below in Table 2. Code 2320 glass is a sodium alumino silicate glass.

TABLE 2

| Sample | Solution | Decay exponent, mm$^{-1}$, b | Brightness @ 3 mm, Watts | % Haze |
|---|---|---|---|---|
| 1 | 1 | 0.012 | 2.96E−07 | 0.791111 |
| 2 | 2 | 0.009 | 2.57E−07 | 0.346667 |
| 3 | 3 | 0.012 | 3.03E−07 | 0.715556 |
| 4 | 4 | 0.013 | 4.09E−07 | 0.798889 |
| 5 | 5 | 0.012 | 4.75E−07 | 0.856667 |
| 6 | 6 | 0.021 | 6.39E−07 | 4.261111 |

As the data show, samples exposed to etchants 1-5 are similar in respect of the attenuation of light. A good metric to compare brightness uniformity of the two conditions is b, the exponent in an exponential fit (e.g., where the fit equation is of the form $y=Ae^{bx}$) of the brightness data. The data of Table 2 describe a brightness decay exponent b ranging from about 0.009 mm$^{-1}$ to about 0.013 mm$^{-1}$ and with etchant 2 exhibiting the lowest brightness decay. The sample treated with etchant 6, although initially brighter than the others, exhibited a steeper decay curve with X=0.21 mm$^{-1}$. Samples made with solutions 1-5 have less than 1% haze, indicating a very high transparency to light in the visible wavelength range and minimal scatter. Etchant 6 had the highest haze (4.26%), but was still useable in a transparent backlight element.

Figure 14:
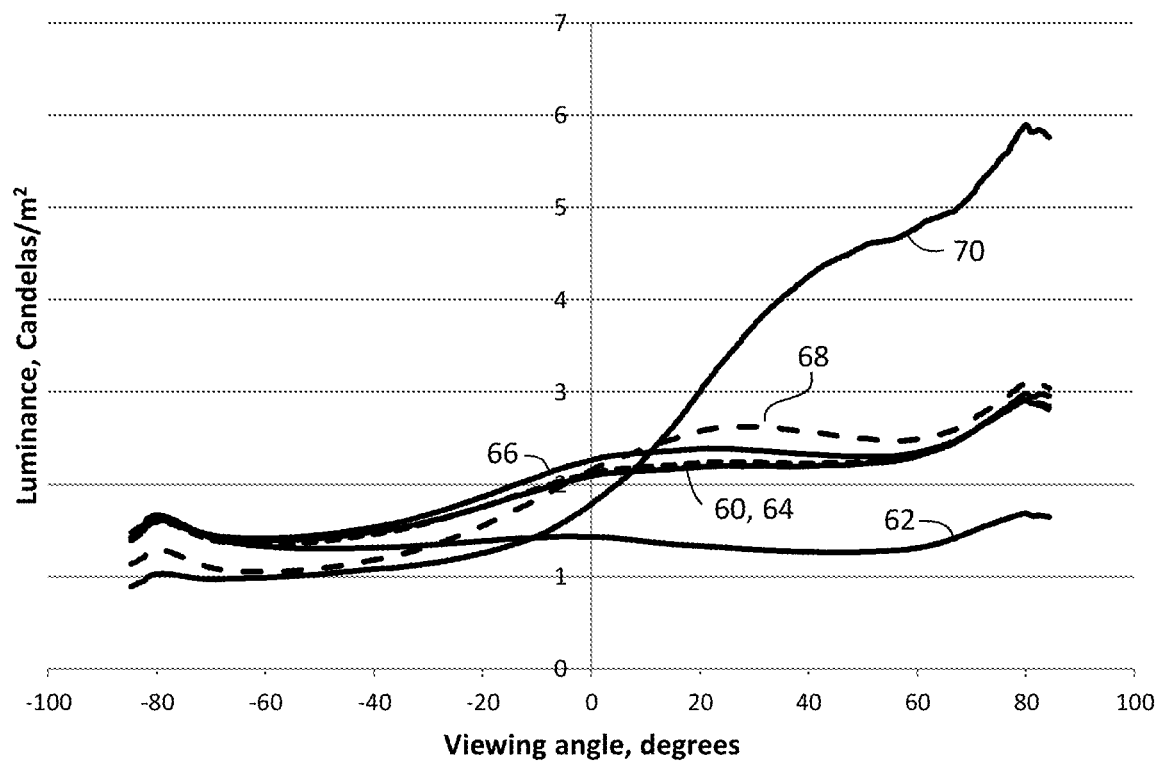
FIG. 14 is a plot of luminance versus viewing angle for an example backlight etched under different etching conditions as described herein.

The luminance in candelas per meter square as a function of viewing angle in degrees of the glass samples etched with solutions 1-6 above (curves 60, 62, 64, 66, 68, 70 respectively), for viewing angles from −80 to 80 degrees, was measured and is depicted in the plot of FIG. 14. This plot shows that luminance is most uniform for the glass sample etched with etchant 2 (curve 62), and intermediate uniformity resulted from using etchants 1, 3, 4 and 5. Etchants 1 and 3 produced almost identical results. Non-uniformity of luminance increased significantly for the sample treated using etchant 6.

Additionally, roughness parameters, including correlation lengths of the samples treated with etchants 1, 2 and 6 through 9 were measured and are presented below in Table 3, along with RMS roughness $R_q$. The columns, from left to right, are the sample identification (7 through 17), the particular etch conditions used (including glass temperature in degrees centigrade and etchant solution identification according to Table 1), roughness parameters as determined with an atomic force microscope (AFM) including $R_a$ in nanometers, $R_q$ in nanometers, skew ($R_{sk}$), kurtosis ($R_{ku}$), Gaussian correlation length (T) and a "viewing angle goodness" (VAG) parameter. $R_a$ is the arithmetic mean roughness value, $R_q$ is the quadratic mean roughness value (RMS roughness), skew is a measure of the asymmetry of a probability distribution. If skew<0, it can be a surface with valleys and if $R_{sk}>0$ it can be a flat surface with peaks. Values numerically greater than 1.0 may indicate extreme valleys or peaks on the surface. Kurtosis is a measure of the randomness of heights, and of the sharpness of a surface. A perfectly random surface has a value of 3; the farther the result is from 3, the less random and more repetitive the surface is. Surfaces with spikes exhibit higher kurtosis values; bumpy surfaces exhibit lower kurtosis values.

Since most people watch a display (e.g. television) from a viewing angle in a range from about −30 degrees to about +30 degrees as measured from a normal to the display panel surface, the luminance (as measured in candela/meter$^2$) should be high at those low angles. However, displays are sometimes seen from higher angles, so high luminance from about −80 degrees to about +80 degrees are also highly desired. Accordingly, a display with uniform luminance at angles of −80 to +80 degrees is said to have high viewing angle uniformity. Displays lighted with a backlight element acquire viewing angle uniformity primarily via the light scattering properties of the backlight element.

Figure 15:
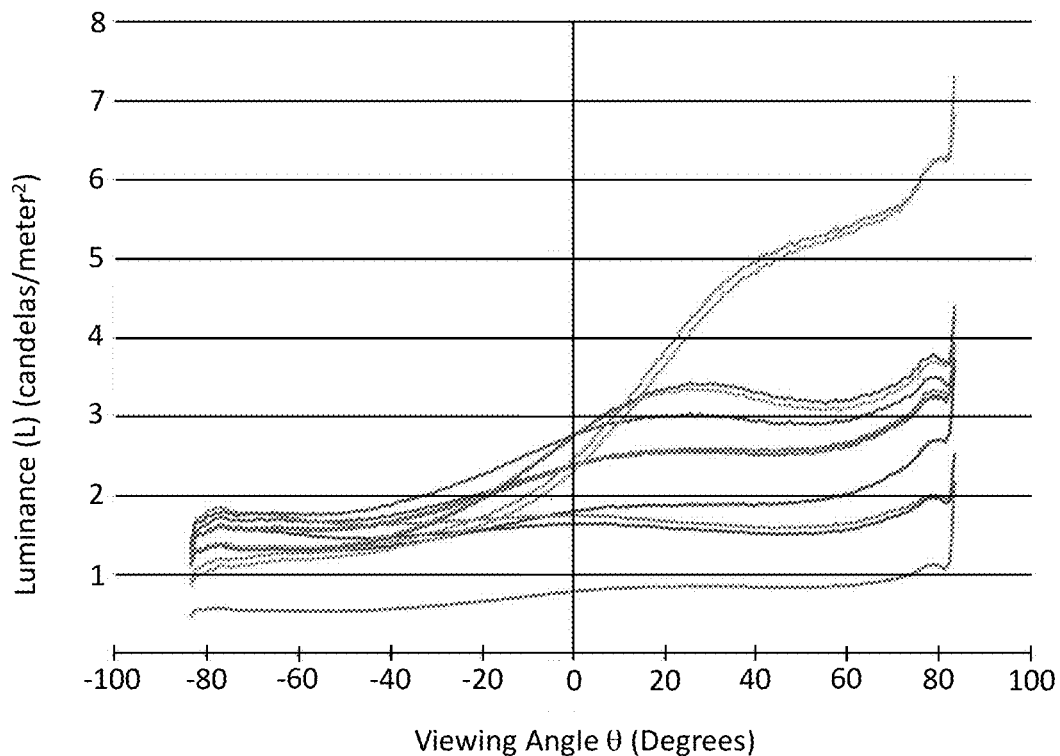
FIG. 15 is a plot showing luminance as a function of viewing angle for 12 different backlights.

When luminance is measured with equipment capable of measuring at various viewing angles, the results can be displayed as a spherical "radar" plot, or as an X/Y plot of viewing angle vs. luminance at a 90 degree slice through the total hemispherical dataset, as shown in FIG. 15 illustrating luminance as a function of viewing angle L(θ) for 12 different backlights. Tools for acquiring viewing angle luminance may be a Radiant Zemax imaging sphere and an ELDIM EZ Contrast. Since comparing desirability of viewing angle plots can be difficult, a metric called viewing angle goodness (VAG) was developed. VAG is calculated by first multiplying the luminance curve, L(θ), by the cosine of the viewing angle θ to preferentially weight the light scattered at low viewing angles θ. The average luminance at a viewing angle θ from 0 to 30 degrees is then divided by the average luminance at a viewing angle θ from 30 to 80 degrees (see Equation 7 below).

$$VAG = \frac{\text{Average}[L(\theta)\cos\theta]\,|_{30}^{0}}{\text{Average}[L(\theta)\cos\theta]\,|_{80}^{30}} \quad (7)$$

VAG is a quantitative metric that accounts for the "goodness" of the luminance as perceived by a viewer, for example a viewer of a display lighted by a backlight element. The greater the VAG value, the greater the perceived goodness (acceptability) of the illumination.

Figure 16:
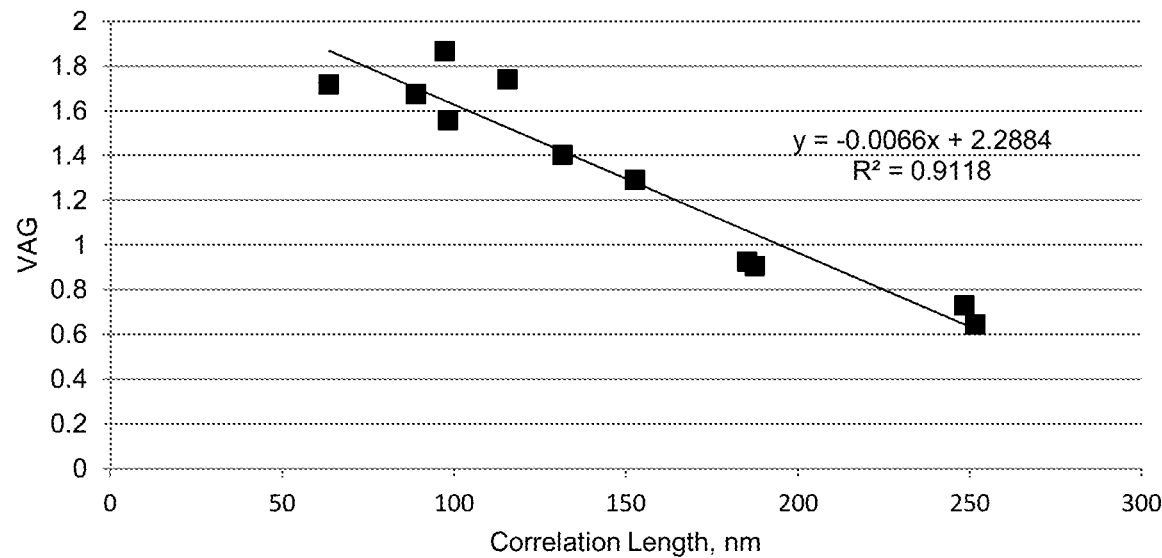
FIG. 16 is a plot illustrating the correlation between the correlation length of the glass substrate surface texture and the viewing angle goodness parameter.

The data from Table 3 show that generally the samples treated with etchants #1 and #2 (samples 8 to 11 and 14 in particular) have greater VAG values (e.g. greater than 1.5), and Gaussian correlation lengths (T) substantially smaller than for the samples treated with etchants 6 through 9. Generally, the smaller the correlation length the better, with correlation lengths less than 100 nm being considered the most desired. In particular, sample 11 processed with solution 2 had the highest VAG value. A graph of the relationship between correlation length and VAG is shown in FIG. 16.

TABLE 3

| | Etch Conditions | | | | | | | |
|---|---|---|---|---|---|---|---|---|
| | Glass Temp, | | AFM Derived Roughness Parameters | | | | | |
| Sample | ° C. | Solution | Ra, nm | Rq, nm | Skew | Kurtosis | T | VAG |
| 7 | −19 | 2 | 48.4 | 62.2 | −1.38 | 1.73 | 248.49 | 0.730499 |
| 8 | 37 | 2 | 25.6 | 33.4 | −1.58 | 2.50 | 88.892 | 1.675984 |
| 9 | 60 | 2 | 16.1 | 21.8 | −1.87 | 4.30 | 63.528 | 1.717703 |
| 10 | 22 | 1 | 23.6 | 31.6 | −1.53 | 2.98 | 115.65 | 1.740163 |
| 11 | 22 | 2 | 19.9 | 26.7 | −1.37 | 2.75 | 97.24 | 1.865436 |
| 12 | 22 | 6 | 36.3 | 43.9 | −0.57 | −0.14 | 187.58 | 0.905445 |
| 13 | 4 | 2 | 19.4 | 26.0 | −1.56 | 3.19 | 131.59 | 1.402849 |
| 14 | 22 | 2 (without water) | 19.4 | 26.0 | −1.56 | 3.19 | 98.318 | 1.558392 |
| 15 | 22 | 7 | 19.2 | 25.7 | −1.59 | 3.27 | 152.6 | 1.29123 |
| 16 | 22 | 9 | 19.3 | 25.9 | −1.57 | 3.21 | 185.22 | 0.925579 |
| 17 | 22 | 8 | 19.3 | 25.9 | −1.57 | 3.22 | 251.53 | 0.644086 |

To better understand the surface morphology of the etched glass, porosity measurements were carried out on glass samples via argon sorption measurements using a Micromeritics® ASAP™ 2420 accelerated surface area and porosimetry system. The samples were all Corning code 2320 glass (150 mm×150 mm×0.7 mm) manually dip-etched in acid solutions and rinsed in deionized water. All samples were allowed to outgas for 24 hours prior to measurement at 300° C. All pore size measurements were based on the volume of argon adsorbed via the Barrett-Joyner-Halenda (BJH) model at a temperature of 87 K for pressures ranging from 4.72 to 734.12 millimeters Hg absolute pressure. All pore size distribution fitting was conducted using a Rosin-Rammler model via the Microsoft Excel Solver function to extract pore size distributions into their respective modes.

For the purpose of this study the foregoing method was employed to determine the volume fraction of the two types of pores that appeared to present in the overall pore size distribution: pores centered at an alpha (α) value above or below 1,000 Angstroms (Å) where alpha represents the 63rd percentile of a Weibull distribution and corresponds generally to the peak value. The data is shown in Table 4 below. For each sample, the parsed pore volume fraction centered at 1,000 Angstroms is shown as the parameter $X_1$, while its counterpart population is calculated as $1-X_1$.

TABLE 4

| Sample | Solution | Etch Time, min | Glass Temp., ° C. | VAG | Fraction below 1000 Å [$X_1$] | "Bimodality" [$X_1(1 - X_1)$] |
|---|---|---|---|---|---|---|
| 15 | 8 | 9 | 22 | 1.21 | 0.887 | 0.100231 |
| 16 | 10 | 9 | 22 | 1.06 | 0.869 | 0.113839 |
| 17 | 9 | 7 | 22 | 1.01 | 0.87 | 0.1131 |
| 18 | 2 | 3.5 | −19 | 0.776 | 0.113 | 0.100231 |
| 19 | 2 | 3.5 | 37 | 1.616 | 0.795 | 0.162975 |
| 20 | 2 | 3.5 | 60 | 1.599 | 0.292 | 0.206736 |

Figure 17:
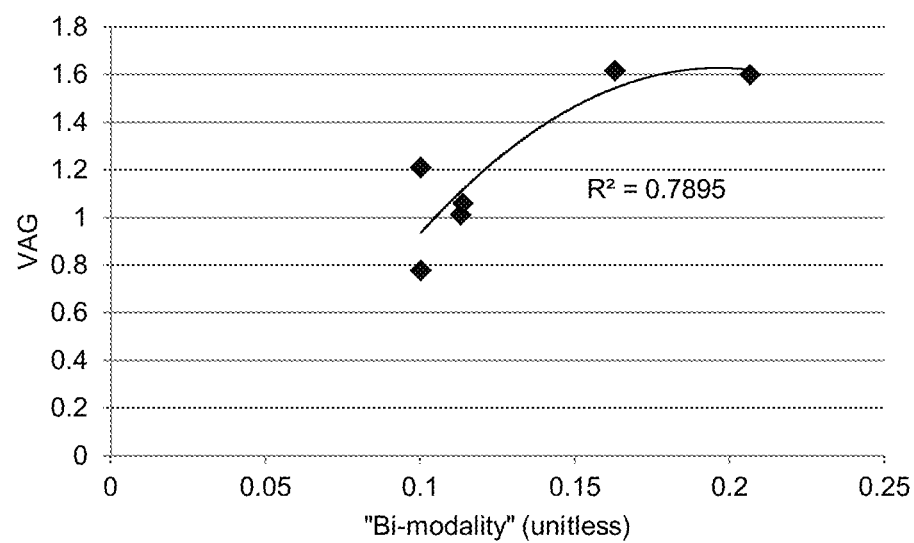
FIG. 17 is a plot illustrating the correlation between a unit-less porosity bi-modality parameter characterizing the glass substrate surface texture and the viewing angle goodness parameter.

After calculation of these fractions, a "bi-modality" parameter BP was created by determining the product of these two volume fractions $[X_1*(1-X_1)]$. The bi-modality was then correlated with the VAG parameter using a second order polynomial fitted to the data to determine any empirical correlations. This fit, shown in FIG. 16, exhibits an empirical correlation with the VAG parameter. The data suggest a unitless bimodality parameter (BP) can adequately express a favorable surface porosity for generating a scattering light guide with a high (≥1.0) VAG value. FIG. 17 suggests a BP value between about 0.16 and 0.22 as being suitable for this purpose.

Example 2

In a series of experiments, 0.7 mm thick Corning code 2318 glass samples having dimensions of 150 mm×150 mm were etched by immersing the samples in a mixture of glacial acetic acid and aqueous ammonium fluoride. Corning code 2318 is an alkali alumino silicate glass. The samples were etched in a bath with a component ratio of 15:6:4 of glacial acetic acid, water and ammonium fluoride, respectively. The etchant bath immersion time was 3 minutes, after which the samples were rinsed in de-ionized water and air dried. The samples were lighted along one edge surface using an LED strip and the brightness of the samples' output at a major surface thereof was measured starting from the edge nearest the LED strip across to the opposite edge.

Figure 18:
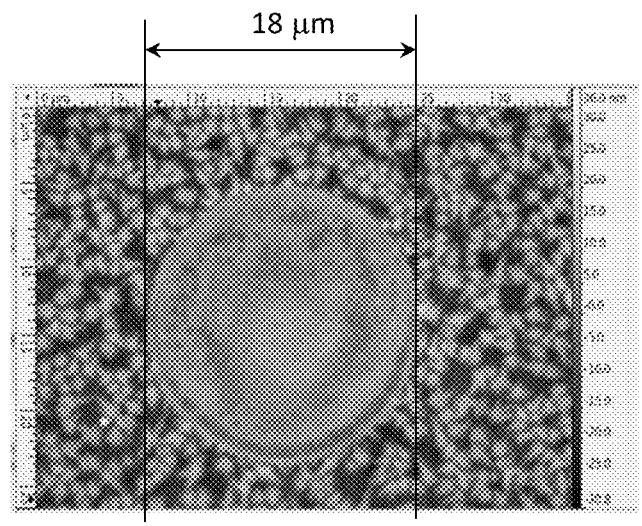
FIG. 18 is a photomicrograph of a single dot deposited on a textured surface of a glass substrate (deposited feature)
Figure 19:
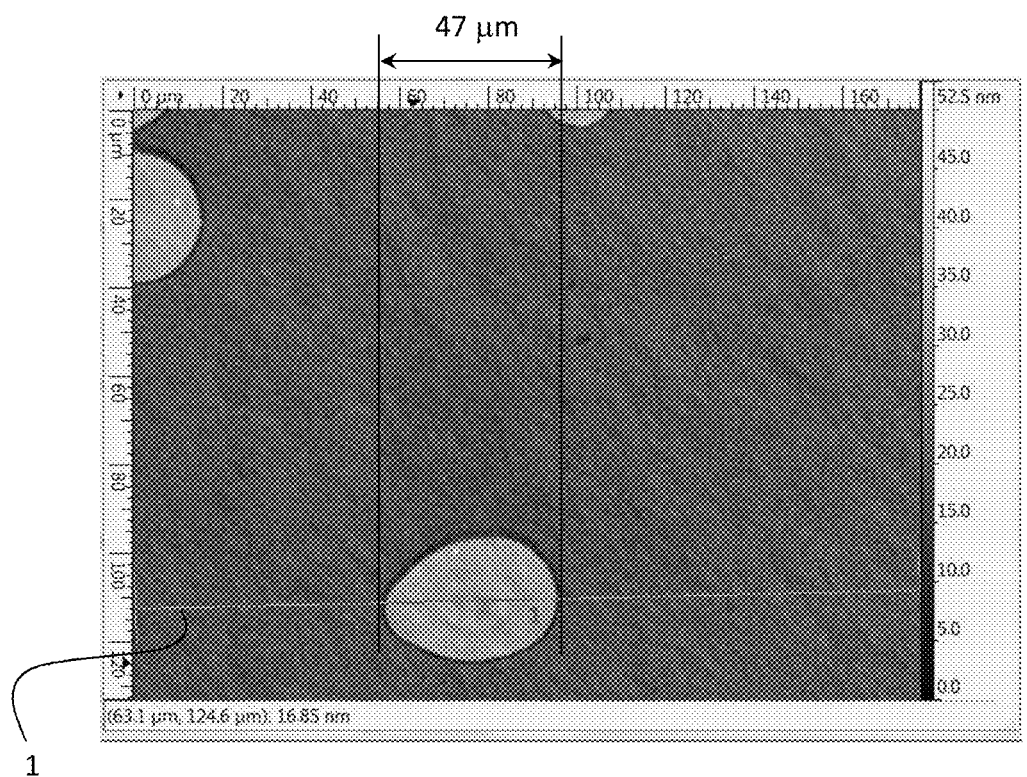
FIG. 19 is another photomicrograph of another dot deposited on a textured surface of a glass substrate (deposited feature)
Figure 20:
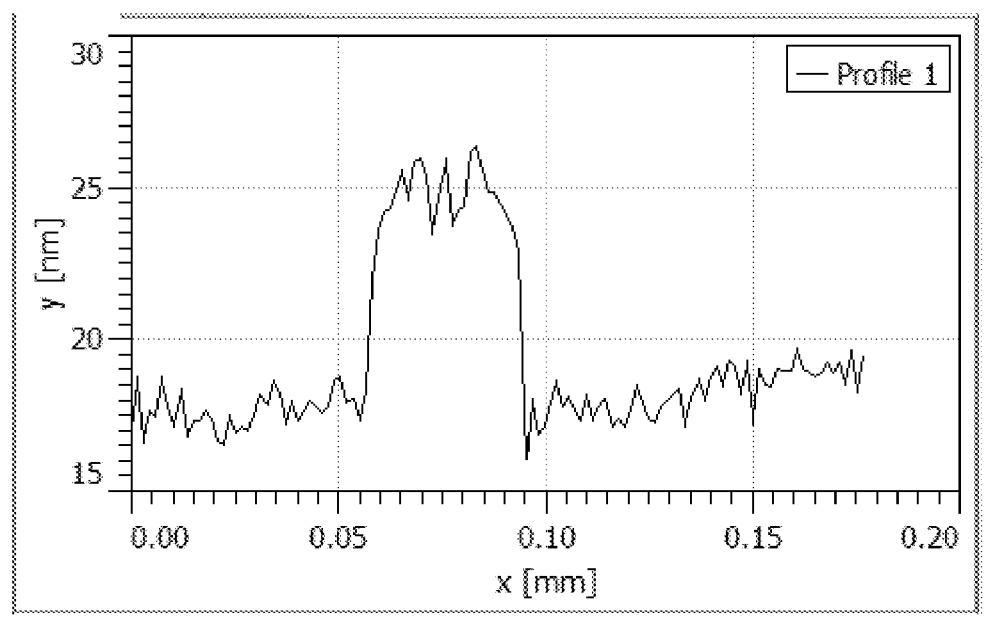
FIG. 20 is a plot showing the dimensions of the deposited feature of FIG. 14.

The etched surfaces of the samples were then printed with a transparent resin in selected areas using a FujiFilm® Dimatix™ 2831 ink jet printer with a 1 picoLiter print head, depositing droplets of resin, each resin droplet containing approximately 1 picoLiter of polymer resin. The polymer resin was Accuglass® T-11. The gradient patterns used to print the polymer resin were designed using Adobe® Illustrator software and converted to a bit map format compatible with the printer driver. The printed pattern was a (locally) random distribution of polymer resin dots configured such that a coverage of dots per unit area proximate one edge of each glass sample, i.e. the edge closed to the LED strip, was greater than the coverage of dots per unit area proximate the opposite edge. The gradient thus produced was an approximately linear gradient from the first edge to the second edge. The printing resulted in dots that were about 15-47 microns in diameter. FIG. 18 is a photograph of a single dot deposited on the roughed surface of the glass substrate, in a top-down view, and shows the dot to be of an approximately circular shape with a diameter of approximately 18 micrometers (μm). FIG. 19 is a second photograph of another dot (having a more oval or egg-like shape). FIG. 20 is a plot of the profile of the dot of FIG. 19 showing the dot height on the left (y) axis and the width on the bottom (x) axis along line 1 of FIG. 19.

Figure 21:
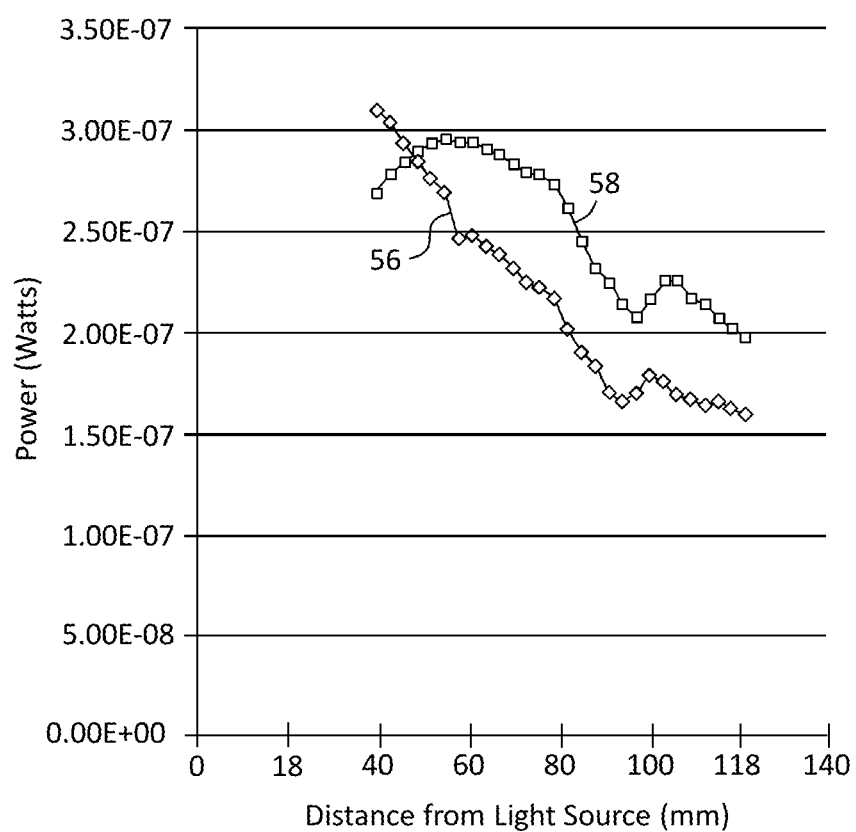
FIG. 21 is a plot showing measured brightness as power scattered through a surface of the glass substrate in a region comprising a surface texture without dots, and a region comprising texture and dots.

The plot in FIG. 21 compares sample brightness after etching (both without dots), curve 56 to the brightness of the same sample etched and printed with the T-11 resin, curve 58. The sample brightness was determined by measuring an optical power adjacent the surface opposite the etched surface as a function of distance from the light source. The brightness decay exponent b for the etched sample before printing was 0.009 mm$^{-1}$ and the brightness decay exponent b for the etched and T-11 printed samples was 0.005 mm$^{-1}$. Printing the T-11 resin on etched samples significantly reduced the brightness decay exponent, leading to improved illumination uniformity across the etched and printed sample.

The roughness of the etched but not printed region measured an RMS roughness of 4 nanometers using a Zygo Newview™ model 7300 white light interferometer with a 100× lens and a 2× zoom. The dots resulting from the resin deposition increased the surface RMS roughness ($R_q$) to about 8 nm.

Example 3

Figure 22:
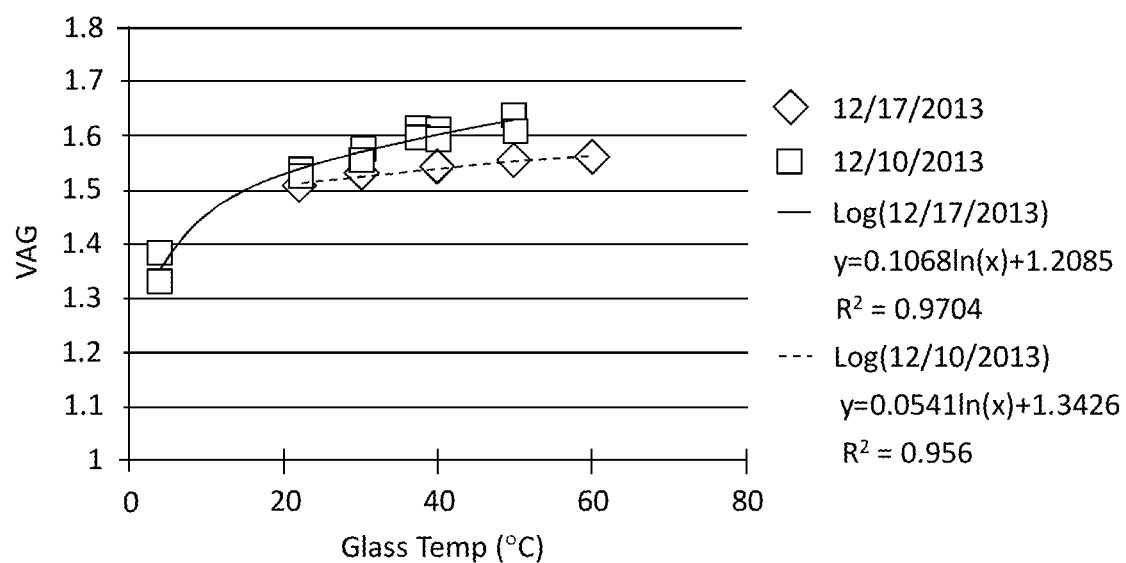
FIG. 22 is a plot showing the relationship between glass substrate temperature during embodiments of the etching process described herein and the viewing angle goodness parameter on two separate days.

In one laboratory experiment glass substrate samples were cooled in a freezer to a temperature of about −19° C.) and a refrigerator to a temperature of about −4° C., heated to various temperatures in an oven, then immediately etched in a fresh solution #2 (as shown in Table 1), and rinsed. Glass temperature experiments were performed on two separate dates approximately 1 week apart, and strong positive log correlations ($R^2$>0.95) were exhibited between glass temperature prior to etch and the VAG parameter, as seen in FIG. 22. However, this relationship was not the same from one day to the next. It is believed that changes in the relative humidity, room temperature and dew point between the two dates may have been responsible for differences in the glass temperature vs. VAG curves shown, and stabilizing the etching environments could eliminate this variability.

Example 4

Samples of Corning code 2320 glass were etched with etchant solution #2 from Table 1 for the times and at the temperatures shown below in Table 5 below. Each sample was measured for haze and transmittance using a BYK Haze-Gard Plus instrument from the Paul N. Gardner Company, Inc. in accordance with ASTM D 1003, ASTM D 1044. The Haze-Gard Plus is capable of directly determining total transmittance, haze and clarity. The instrument utilizes an Illuminant C light source representing average day light with a correlated color temperature of 6774 K. The results are provided below in Table 5, and indicate very low haze (for example, less than 2%) and high transmittance (greater than 94%, it being understood that the maximum transmittance is bounded by 100%), providing for a highly transparent glass substrate after treatment with an etchant as described herein.

TABLE 5

| Sample | Etch solution | Etch time (minutes) | Etch temp ° C. | % Haze | % Transmittance |
|---|---|---|---|---|---|
| 21 | #2 | 1 | 22 | 1.6 | 94 |
| 22 | #2 | 1 | 22 | 0.86 | 94 |
| 23 | #2 | 1 | 22 | 0.76 | 95 |
| 24 | #2 | 1 | 22 | 0.71 | 95 |

Example 5

To understand the performance of an etch wax, 2.5 grams polycaprolactone (Sigma a704105, MW 45k) were added to 50 milliliters acetic acid in a 100 milliliter round bottom glass flask and stirred for 45 minutes in a hot water bath to dissolve the polycaprolactone and produce a 5% polycaprolactone mixture. The flask was then removed from the water bath and 0.9 milliliter deionized water was gradually added while stirring. The mixture was transferred to a Nalgene™ bottle, after which 2.1 grams of ammonium fluoride was added and the mixture stirred for 1 hour. Upon cooling, the mixture formed a 5% polycaprolactone etch wax.

The etch wax was apply to a cleaned 150 millimeter×150 millimeter×2 millimeter sample of Corning® Code 4318 glass manually using a height adjustable Gardco Teflon coated drawdown bar, 10.16 cm wide, set at <0.0254 cm gap. Code 4318 is an alkali alumino silicate glass. The sample was laminated with a polymer film to protect one major surface of the sample from the etchant. The etch wax coating was left on the glass for 3.5 minutes, then rinsed in 3 water baths with agitation.

The glass sample was subsequently delaminated by removing the layer of protective film covering the non-etched major surface of the sample, and the sample was dried.

Additionally, both 10% and 15% polycaprolactone etch waxes were also made using the same process. These required remixing using a planetary mixer after initial stir since after several days of sitting they became quite viscous (would not flow). This indicates the solutions are thixotropic. After remixing, they were fine for draw down application. The samples for all three applications were then tested for VAG, percent haze and average luminance as previously described. The data is presented in Table 6 below.

TABLE 6

| Sample | % polycaprolactone | VAG | % Haze | Average Luminance, Candelas/m$^2$ |
|---|---|---|---|---|
| 25 | 5 | 1.74 | 0.67 | Incomplete coating |
| 26 | 5 | 1.74 | 0.67 | 477 |

TABLE 6-continued

| Sample | % polycaprolactone | VAG | % Haze | Average Luminance, Candelas/m² |
|---|---|---|---|---|
| 27 | 10 | 1.73 | 1.14 | 652 |
| 28 | 15 | 1.87 | 0.41 | Incomplete coating |
| 29 | 15 | 1.79 | 0.47 | 422 |

It has been found that the etching processes described herein are capable of producing a surface texture that significantly reduces electrostatic charging, and subsequent discharge, of glass substrates, for example glass substrates used in the manufacture of other display components, including display panels.

Example 6

In one example exploring the effect of a textured glass surface on electrostatic charge characteristics of a glass substrate, glass substrates were etched in a solution comprising ammonium fluoride ($NH_4F$) with a concentration of 1 weight percent and 5 weight percent, and acetic acid in a concentration in a range from about 10 weight percent and 90 weight percent. The results describe the impact of acid concentration and etch time on glass roughness using a 2-factor fractal design developed using Minitab software. Table 7 lists the average glass roughness $R_a$ of a sample of Corning® Lotus™ glass etched with the foregoing different acid concentrations and etch times of 30 seconds and 120 seconds. Lotus™ represents a family of substantially alkali-free alumino silicate glasses having a high annealing point (for example, greater than 765° C.). A high annealing point can produce a low rate of relaxation, and hence comparatively small amounts of dimensional change, making the glass ideal for use as a backplane substrate in low-temperature polysilicon processes. Glass surface roughness was measured using a Zygo instrument over a scan area of 130 micrometers×180 micrometers. The data show that a broad range of solution chemistry can be used to obtain very low surface roughness.

TABLE 7

| Sample | Acetic Acid (vol. %) | $NH_4F$ (wt. %) | Etch Time (sec) | Roughness $R_a$ (nm) |
|---|---|---|---|---|
| 30 | 10 | 1 | 30 | 0.369 |
| 31 | 10 | 1 | 120 | 0.439 |
| 32 | 10 | 5 | 30 | 0.472 |
| 33 | 10 | 5 | 120 | 0.361 |
| 34 | 90 | 1 | 30 | 0.717 |
| 35 | 90 | 1 | 120 | 9.287 |
| 36 | 90 | 5 | 30 | 7.270 |
| 37 | 90 | 5 | 120 | 6.662 |
| Reference: 0.5M $NH_4FHF$, 90 sec., 40° C., Lotus ™ | | | | 0.610 |

Example 7

A solution composing of 20 weight percent of ammonium fluoride ($NH_4F$) and 50 weight percent of acetic acid was used to etch Corning Lotus™ display glass samples. The glass was dipped in the solution for the following periods of time: 30 seconds, 60 seconds, 90 seconds, 120 seconds and 180 seconds. Some glass characteristics, such as average glass roughness ($R_a$), the maximum height of convex shapes on the glass surface ($R_z$), which is essentially a measure of the average distance between the highest peak and lowest valley in each sampling length, glass haze and glass clarity obtained at different etch time are summarized in Table 8 below. Table 8 shows that slightly changing the etch time using this solution dramatically increased both $R_a$ and $R_z$. As the etch time is extended to 120 seconds and 180 seconds, increased glass roughness values, 17.85 nanometers and 46.80 nanometers, respectively, were achieved. Visible haze was observed on the glass surface at 180 seconds and the glass clarity was not acceptable for some display applications. However, such a surface roughness, even with haze, can be useful for other potential applications such as an anti-glare surface or anti-reflection surface, etc., and may also be used for backlight application where transparency may not be required, such as for standard opaque display back light elements. It can also be used for general lighting purposes that do not require a high degree of transparency.

TABLE 8

| Sample | Etch time (s) | $R_a$ (nm) | $R_z$ (nm) | Haze (%) | Clarity | Voltage Reduction (%) |
|---|---|---|---|---|---|---|
| 38 | 30 | 0.79 | 71.47 | 0.14 | 5 | 23 |
| 39 | 60 | 2.86 | 155.33 | 0.33 | 5 | 24 |
| 40 | 90 | 6.98 | 291.33 | 0.94 | 4 | 28 |
| 41 | 120 | 17.85 | 324.00 | 3.70 | 2 | 53 |
| 42 | 180 | 46.80 | 386.67 | 16.30 | 1 | 67 |

Figures 23A, 23B, 23C:
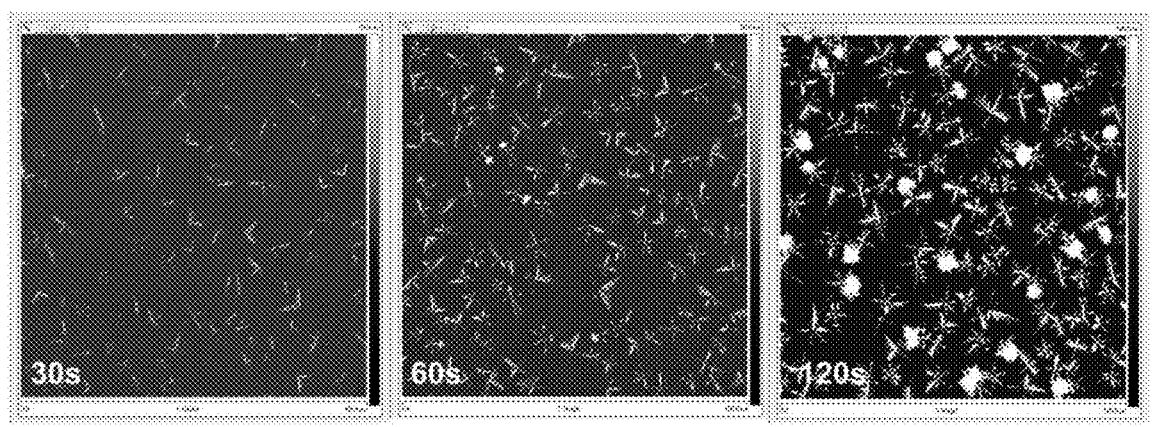
FIGS. 23A, 23B and 23C are photomicrographs of a glass substrate surface showing deposited crystalline precipitates resulting from an etching process on the glass substrate surface.
Figure 24:
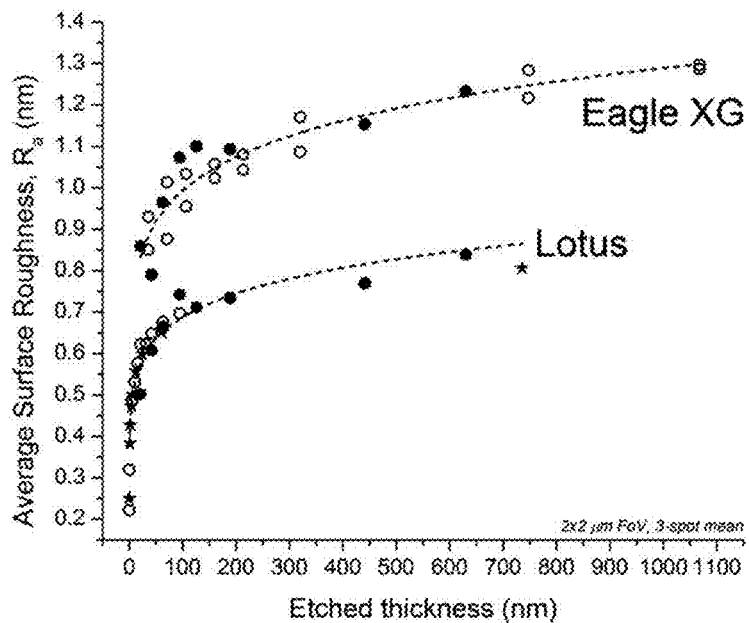
FIG. 24 is a plot showing the effect of a conventional etching process on several different glasses.

The impact of etch time on surface topography was studied by atomic force microscopy (AFM) with a scan size of 100 micrometer×100 micrometer. It was found that glass roughness increased approximately exponentially as the etching time increased, and that the roughness was tunable within the nanometer to micrometer range through the methods disclosed herein. As the etching time is extended, the precipitant crystals grow and more nucleation seeds are formed. As a result, denser and larger crystal patterns were observed on the AFM images depicted in FIGS. 23A-23C as the etching time was increased from 30 seconds to 60 seconds and then 120 seconds. FIGS. 23A-23C illustrate the topography of Lotus™ glass surfaces etched in 50% acetic acid and 20% ammonium fluoride for 30s, 60s and 120s over a mapping area of 100 micrometers×100 micrometers. Concurrently, glass roughness was found to have increased from 0.79 nanometers to 19.5 nanometers over the range of etch times. In comparison to traditional etching (the reference solution without using organic solvents shown in Table 7), the surface obtained by the in situ mask method described herein is effective at reducing accumulated charge on glass surface for at least two reasons. First, a large range of surface roughness can be achieved whereas traditional etching tends to plateau at slightly more than 1 nanometer, as shown in FIG. 24. FIG. 24 illustrates average roughness $R_a$ as a function of etch depth for samples of Corning® Eagle XG® glass and Corning® Lotus™ glass and shows the plateauing of the depth of etch. $R_a$ in FIG. 24 was measured by AFM with a scan size of 2 micrometers×2 micrometers. Second, the method creates protrusions (peaks) on the glass surface, which enables a relatively smaller contact surface area compared to the depressions obtained by traditional etching, which is absent an organic component in the solution. It should be noted that for the current application, the achieved effects are constrained by both an electrostatic consideration and optical considerations. The glass must exhibit reduced electrostatic charging while also being highly optically transparent with minimal haze. The small contact surface area is preferred to more effectively reduce the accumulated charges on glass substrate.

Example 8

To better understand the effect of surface texture on electrostatic charging, Corning Lotus™ glass samples (180 mm×230 mm×0.5 mm) were etched in the foregoing NH$_4$F/acetic acid solution (50% acetic acid and 20% ammonium fluoride at 25° C.) for varying amounts of time as indicated in Table 7 and surface voltage was measured with a commercially available lift tester manufactured by the Harada Corporation using a grounded 304 stainless steel chuck plate. Reference samples were etched in a 0.2M NaF and 1M H$_3$PO$_4$ etchant solution. A −36 kPa vacuum was created against the glass samples through a single vacuum port in the chuck table and insulative Vespel pins (5 mm radius) were used to lift the glass substrate samples from the chuck plate. The lift pin speed was 10 mm/sec. Three samples per etch time were sampled and run in random order. Six lift cycles per sample were conducted with ionization used between lift cycles to neutralize the samples. Values were reported at 80 mm pin height. The voltage probe was configured to track with the glass substrate during lift pin movement. The glass samples were cleaned using a wash with 4% SemiClean KG, and the samples conditioned in a class 100 clean room for 1 hour prior to test execution at a relative humidity of about 13%. The chuck and pins were HEPA vacuumed and wiped down with DI cleanroom wipe 1 hour before testing. A sacrificial glass sample was used to contact clean the chuck and pins at the start of testing, side B then side A. Individual measurements were averaged to produce the reported voltage change.

The percent reduction in voltage was calculated using the following Equation (8):

$$[(V_o-V)/V_o]\times 100, \quad (8)$$

where $V_o$ is the average voltage measured after contact separation of the glass sheet before treatment and V is the average voltage measured after contact separation of the glass sheet after treatment.

Figure 25:
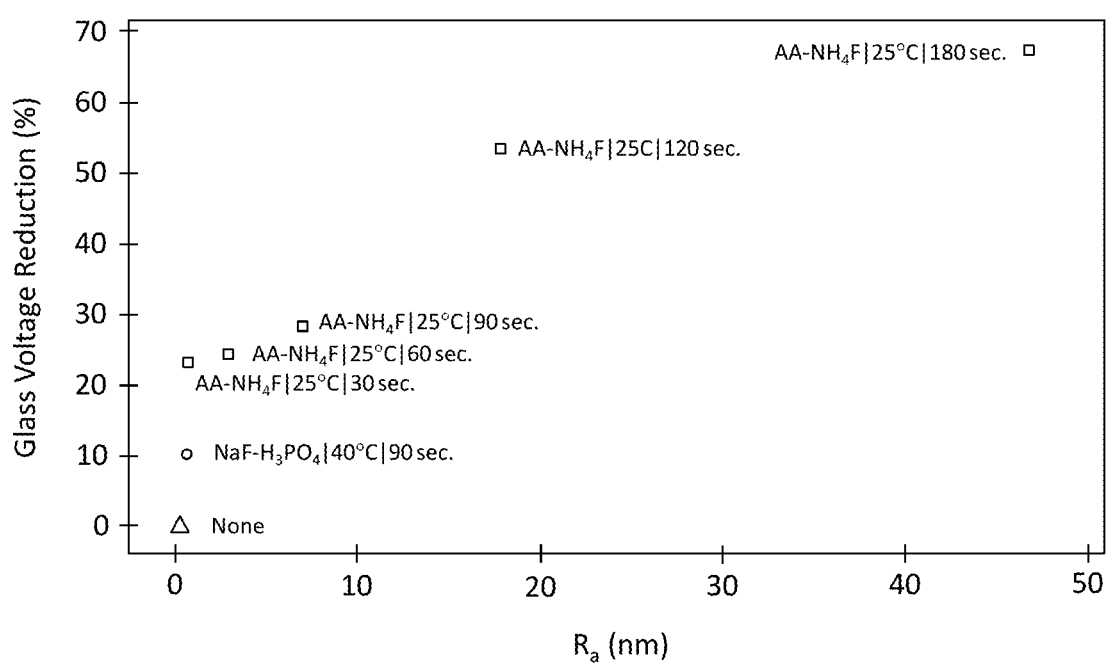
FIG. 25 is a plot illustrating surface voltage reduction for glass samples etched by different chemistries as a function of average roughness $R_a$.

The glass voltage reduction in percent as a function of glass roughness measured by AFM was plotted and is shown in FIG. 25. The glass that was etched in the reference etchant (0.2M NaF/1M H$_3$PO$_4$ at 40° C. for 90 seconds) is shown as the circle. The acetic acid/ammonium fluoride-etched samples are represented by the square data points. A triangle denotes a sample for which no surface treatment was conducted. The results indicate that the glass voltage was significantly reduced in a range from about 23% to about 67% as glass roughness varied from 0.79 nanometers to 54 nanometers when using the in situ mask etching approach when compared to a traditional inorganic acid etchant.

Example 9

Figure 26A:
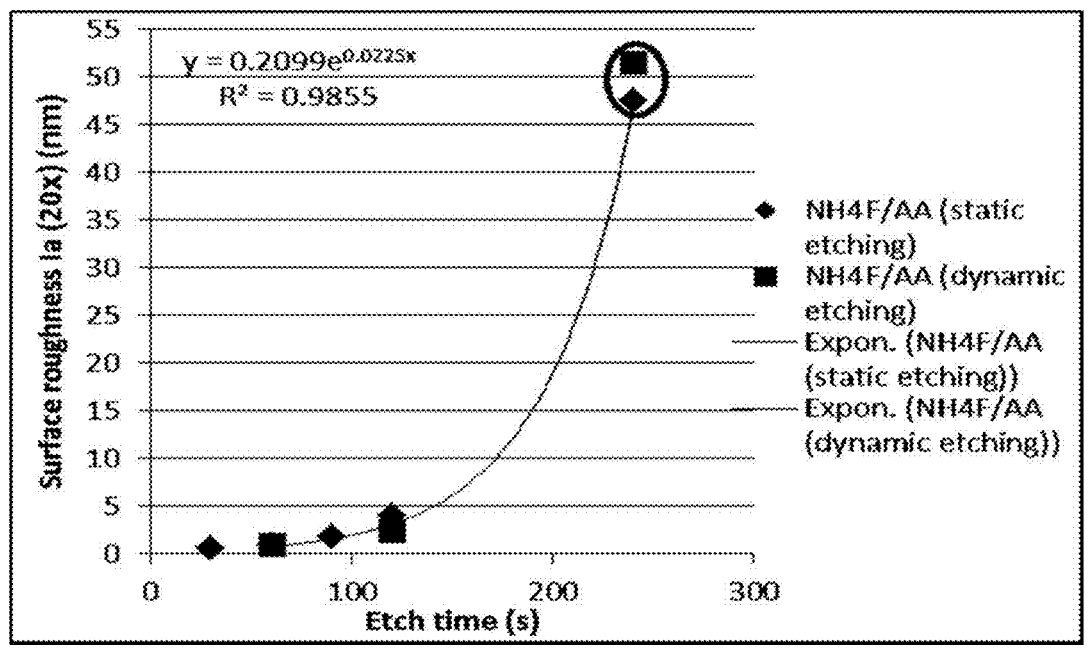
FIG. 26A is a plot comparing surface roughness as a function of etch time for glass samples wherein an acetic acid/ammonium fluoride etchant was static and wherein the etchant was agitated.
Figure 26B:
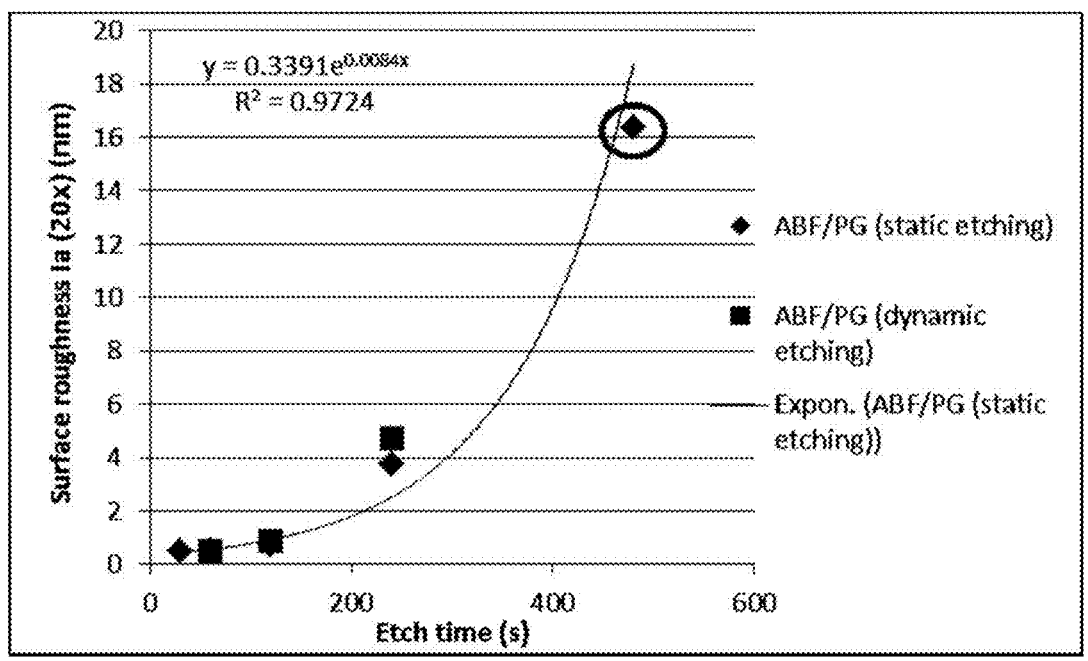
FIG. 26B is a plot comparing surface roughness as a function of etch time for glass samples wherein an polyethylene glycol/ammonium bifluoride etchant was static and wherein the etchant was agitated.

In manufacturing, glasses are traditionally wet etched using various means such as dipping, spray, brush touched, etc. Accordingly, another experiment was conducted to demonstrate that the disclosed method is applicable to different agitation conditions. As shown in FIGS. 26A and 26B, Lotus glass samples were etched in a solution comprising 11% ammonium bifluoride (NH$_4$FHF) and 25% polyethylene glycol 20%, PG, (FIG. 26A) and a solution composed of 20% ammonium fluoride (NH$_4$F) and 50% acetic acid, AA. The roughness was measured by a Zygo instrument with a scan size of 180 micrometers×130 micrometers. Samples having visible haze on the glass substrate after treatment are circled. Glass samples were dipped in a static solution (symbol: diamond), while other samples were dipped in a stirred solution (symbol: square). The data indicate no significant difference in respect of the resulting glass roughness.

For further comparison, the etchant was changed to ammonium bifluoride, ABF, (NH$_4$FHF) and polyethylene glycol (PG) as the organic solvent component, which was again used to etch Corning Lotus glass (FIG. 26B). Similarly, the experiment was conducted in both static and stirring solutions. As expected, the same magnitude of glass roughness is achieved in both conditions. This example implies that the method is applicable to either static or dynamic etching condition and is applicable to any combination of fluorinated acid or salt and an organic solvent (i.e., acetic acid, polyethylene glycol).

Example 10

Figure 27A:
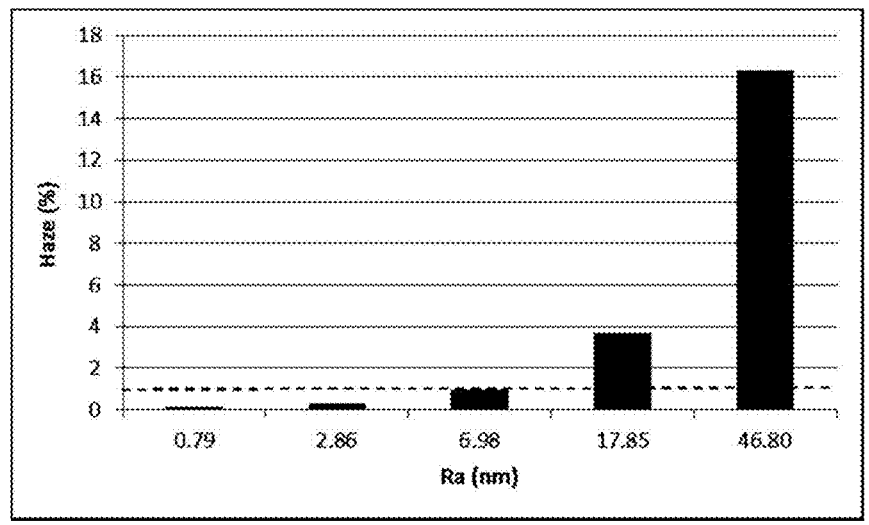
FIG. 27A depicts haze as a function of $R_a$ obtained through in situ mask etching approach with a solution of 20% by weight $NH_4F$ and 50% by weight acetic acid.
Figure 27B:
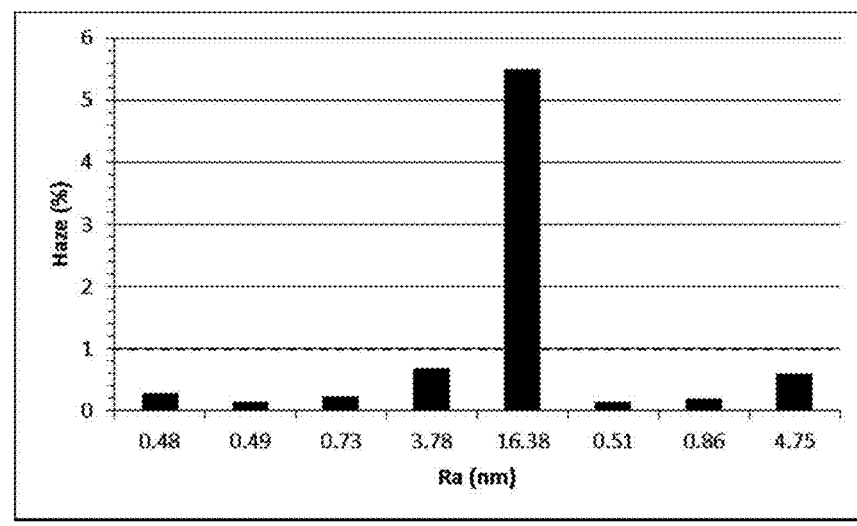
FIG. 27B plots haze as a function of $R_a$ for glass etched in a solution of 11% by weight $NH_4FHF$ and 25% by weight polyethylene glycol.
Figure 28A:
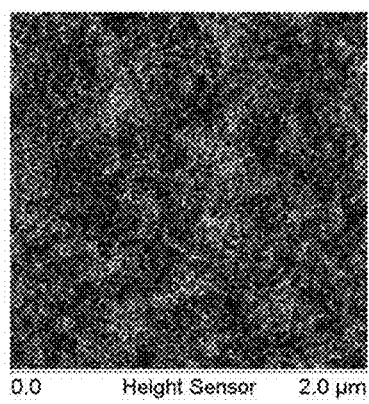
FIG. 28A through FIG. 28F are AFM plots of the surfaces for 6 samples C0 through C5, respectively, wherein C0 is a control sample and C1 through C5 are samples etched with various etchants and showing the surface texture of each surface.
Figure 28B:
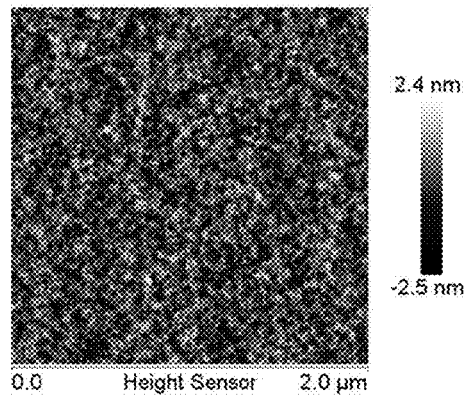
Figure 28C:
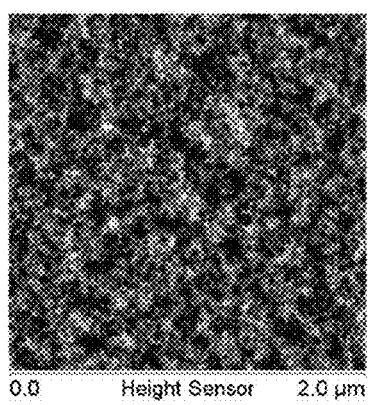
Figure 28D:
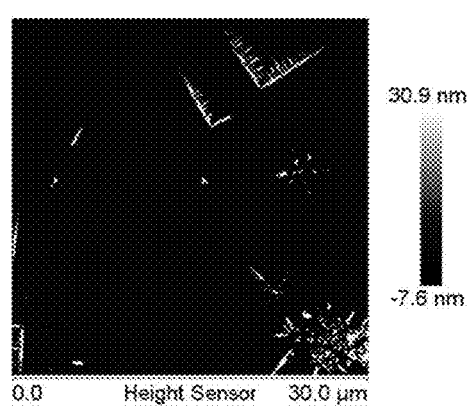
Figure 28E:
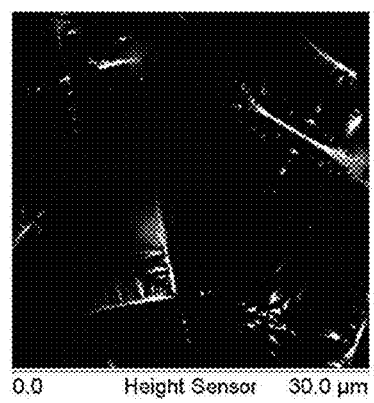
Figure 28F:
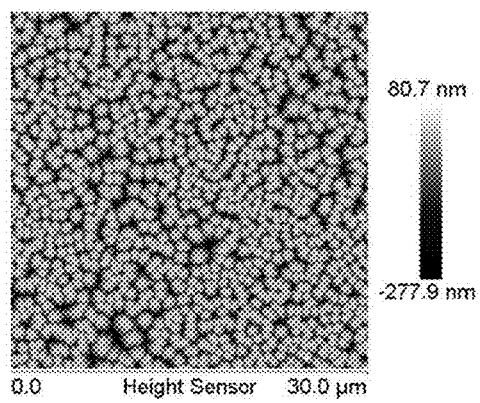

As previously described, for display applications the electrostatic charge-enhanced glass must perform satisfactorily both electrostatically and optically. Generally, roughening a glass surface may facilitate a reduction of accumulated electrostatic charge on the glass substrate, but at the same time it may cause the optical problems due to the scattering of light on a rough surface. For display applications, the glass should typically be transparent, although electrostatic charge may be considered even for opaque substrates. The glass clarity was therefore evaluated by visual inspection by lighting the glass samples from an edge surface thereof, and a clarity value assigned. While this approach is admittedly subjective, it was adequate to evaluate clarity on a relative basis. Glass substrate samples were etched in a first solution of 20% by weight NH$_4$F and 50% by weight acetic acid. Additional glass samples were etched in a second solution of 11% by weight NH$_4$FHF and 25% by weight polyethylene glycol. It was observed that for a 90 second exposure to the etchant the obtained average glass roughness ($R_a$) was 6.98 and haze was 0.94% (see Table 8), and the glass clarity was degraded. Haze was measured for each sample and plotted as a function of glass roughness and is shown in FIGS. 27A and 27B. FIG. 27A depicts haze as a function of $R_a$ obtained through in situ mask etching approach with the first solution of 20% by weight NH$_4$F and 50% by weight acetic acid. Glass surface roughness was measured by AFM with a scan size of 100 micrometers×100 micrometers. FIG. 27B plots haze as a function of $R_a$ for glass etched in the second solution of 11% by weight NH$_4$FHF and 25% by weight polyethylene glycol. Glass surface roughness was measured by a Zygo instrument with a scan size of 180 micrometers×130 micrometers. The dashed line represents a haze value equals to 1%, considered to be an optimal maximum haze for some applications. With the exception of several outlier examples, the data show that glass surface haze can be controlled within an acceptable range, e.g. equal to or less than about 6%. The results further suggest that to maintain optimal clarity while at the same time facilitating a reduction in electrostatic charging, the glass roughness should be controlled in a range from about 0.4 nanometer to about 10 nanometer, with haze equal to or less than about 1%.

The glass surface composition for the samples was then analyzed by scanning electron microscopy-electron dispersive X-ray spectrometry (SEM-EDX). The composition of the surface protrusions (peaks) was found to be identical to the glass substrate composition. There was no etching by-product residue, (NH$_4$)$_2$SiF$_6$, found on the glass surface, meaning the acid rinse after the etching step efficiently removed the in situ mask material from the glass surface.

This result supports a conclusion that the addition of an organic solvent to an etchant solution facilitates the nucleation of crystals, the etching byproduct, on the glass. These crystals mask the underlying glass surface and hinder etching in these locations. Residual crystalline precipitates can then be dissolved away during a subsequent acid wash or hot water wash, leaving textured features on the glass surface.

Example 11

In another experiment, the performance of the FOM metric and its correlation to ESD response was evaluated. Glass substrate samples were etched with a variety of etchants. All samples were 180 millimeters×230 millimeters×0.5 millimeters of Corning® Lotus™ glass. The glass substrates were then subjected to a lift test and surface voltage was measured.

A first etchant comprised 1.5M HCl and 1.5 M HF produced in a 7 liter batch by combining 862 milliliters HCl, 381 milliliters HF and 5757 milliliters deionized $H_2O$. The samples were installed together in a carriage and bathed in the first etchant at a temperature of 30° C. for 60 seconds, then rinsed in deionized water at room temperature for 30 seconds.

A second etchant comprised 1M $H_3PO_4$ and 0.35M NaF produced in a 7 liter batch by combining 479 ml $H_3PO_4$, 103 grams NaF and 6521 ml deionized $H_2O$. The samples were installed together in a carriage and bathed in the second etchant at a temperature of 40° C. for 81 seconds, then rinsed in deionized water at room temperature for 30 seconds.

A third etchant comprised 20% by weight $NH_4F$ and 50% by volume acetic acid produced in a 1 liter batch by combining 200 grams $NH_4F$, 500 ml acetic acid and 300 milliliters deionized $H_2O$. The samples were installed together in a carriage and bathed in the third etchant at room temperature for 40 seconds, then rinsed in 1 liter of an acid solution comprising produced by combining 56.1 milliliters $H_2SO_4$ and 943.9 milliliters deionized water at room temperature for 30 seconds. This acid rinse was followed by further rinsing in deionized water.

A fourth etchant comprised 20% by weight $NH_4F$ and 50% by volume acetic acid produced in a 1 liter batch by combining 200 grams $NH_4F$, 500 ml acetic acid and 300 milliliters deionized $H_2O$. The samples were installed together in a carriage and bathed in the fourth etchant at room temperature for 80 seconds, then rinsed in 1 liter of an acid solution comprising produced by combining 56.1 milliliters $H_2SO_4$ and 943.9 milliliters deionized water at room temperature for 30 seconds. This acid rinse was followed by further rinsing in deionized water.

A fifth etchant comprised 4.1% by weight $NH_4F$ and 94.1% by weight acetic acid produced in a 1000 gram batch by combining 41 grams $NH_4F$, 896 milliliters acetic acid and 18 milliliters deionized $H_2O$. The samples were installed together in a carriage and bathed in the fifth etchant at room temperature for 210 seconds, then rinsed in deionized water at room temperature for 30 seconds.

Shown in FIG. 28A through 28F are AFM images at feature-appropriate X/Y/Z scales the electrostatic charging results (FIG. 29) for the different conditions highlighting the progression of reducing the electrostatic-induced voltage as a function of surface preparation, include topographies that represent "random" roughness, as well as some containing obvious topographic features.

After etching the glass substrates were subjected to a lift test with a commercially available lift tester manufactured by the Harada Corporation using a grounded 304 stainless steel chuck plate. Surface voltage was measured during the lift testing. A −36 kPa vacuum was created against the glass samples through a single vacuum port in the chuck table and insulative Vespel pins (5 mm radius) were used to lift the glass substrate samples from the chuck plate. The lift pin speed was 10 mm/sec. Four samples per etch time were sampled and run in random order. Six lift cycles per sample were conducted with ionization used between lift cycles to neutralize the samples. Values were reported at an 80 mm pin height. The voltage probe was configured to track with the glass substrate during lift pin movement. The glass samples were cleaned using a wash with 4% SemiClean KG, and the samples conditioned in a class 100 clean room for 1 hour prior to test execution at a relative humidity of about 12%-13%. The chuck and pins were HEPA vacuumed and wiped down with DI cleanroom wipe 1 hour before testing. A sacrificial glass sample was used to contact clean the chuck and pins at start of testing, side B then side A. Individual measurements were averaged to produce the reported peak voltage change.

Figure 29:
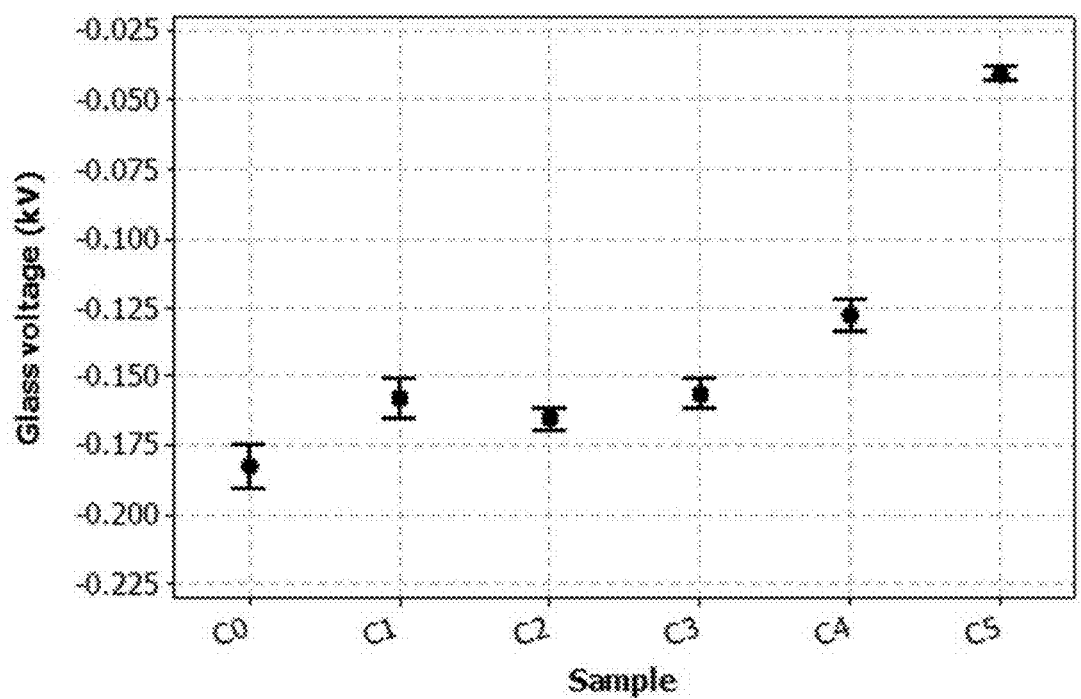
FIG. 29 is a plot showing peak surface voltage resulting from the application of a peel test for four different etchants to samples C1-C5, and a control sample C0.
Figure 30A:
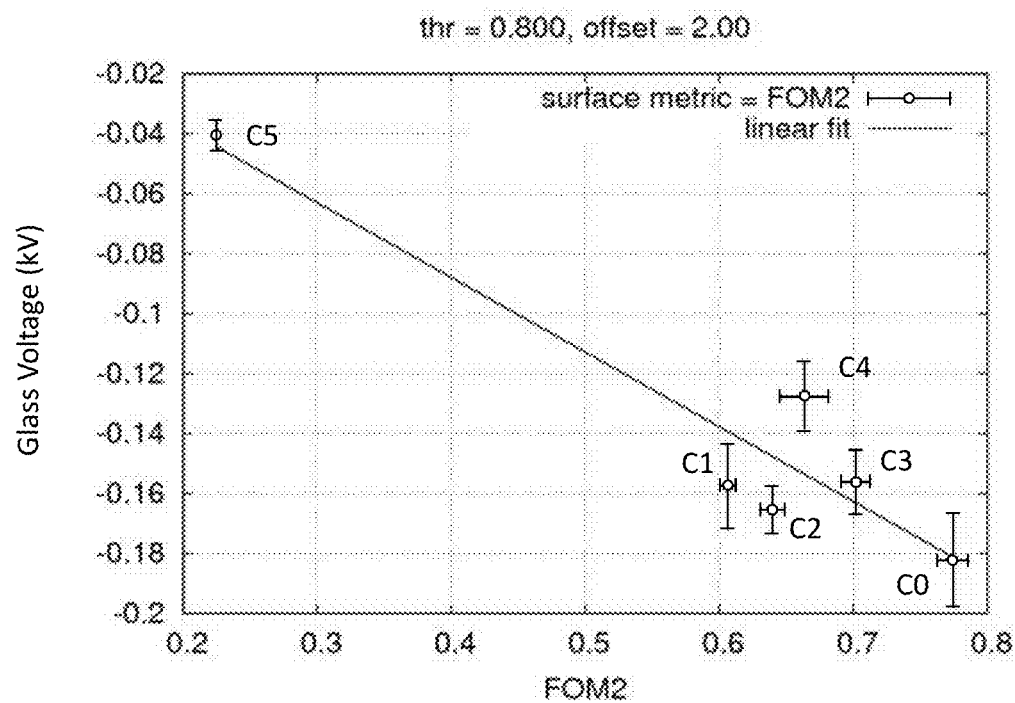
FIGS. 30A and 30B are a plots showing the degree of correlation between FOM (m=2, 6) and electrostatic charge-induced glass surface voltage for various topographical embodiments C0-C5.
Figure 30B:
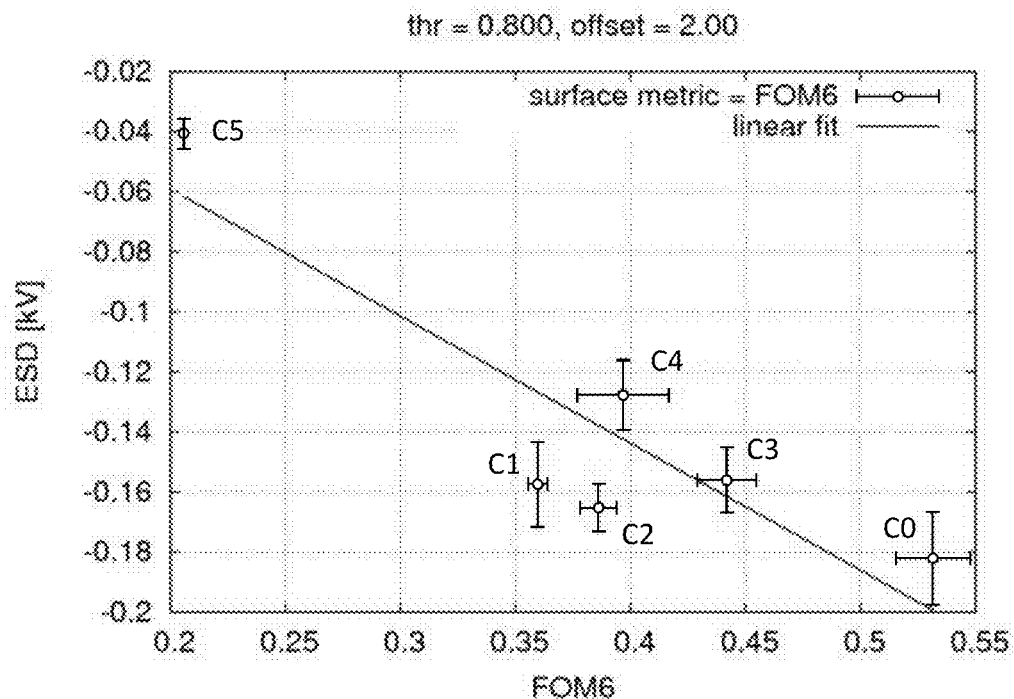
Figure 31A:
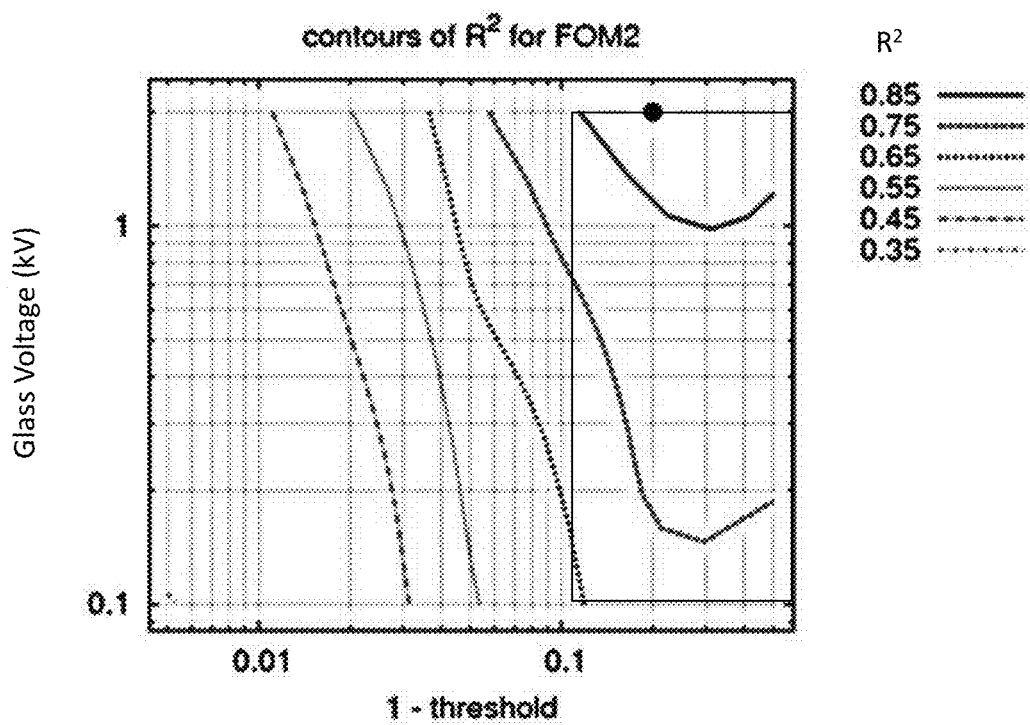
FIGS. 31A and 31B are contour plots showing the effect of FOM calculation parameters on the correlation coefficient $R^2$, i.e. the ability to best correlate with electrostatic charge voltage response.
Figure 31B:
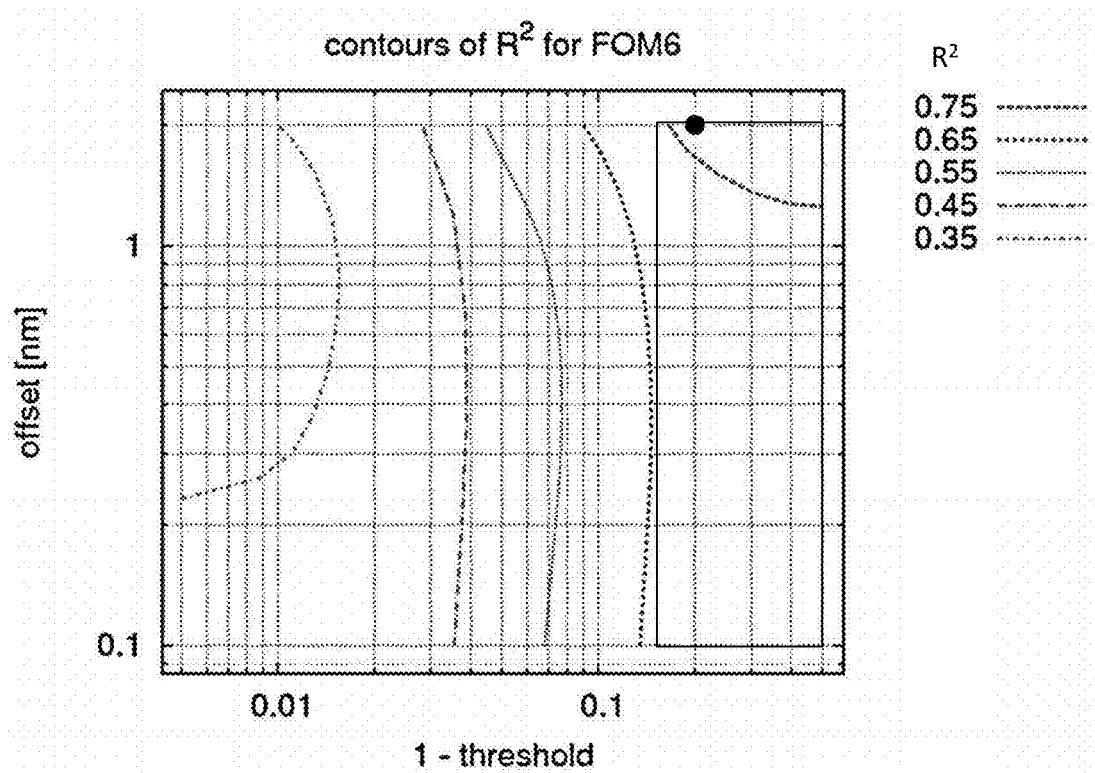
Figure 32A:
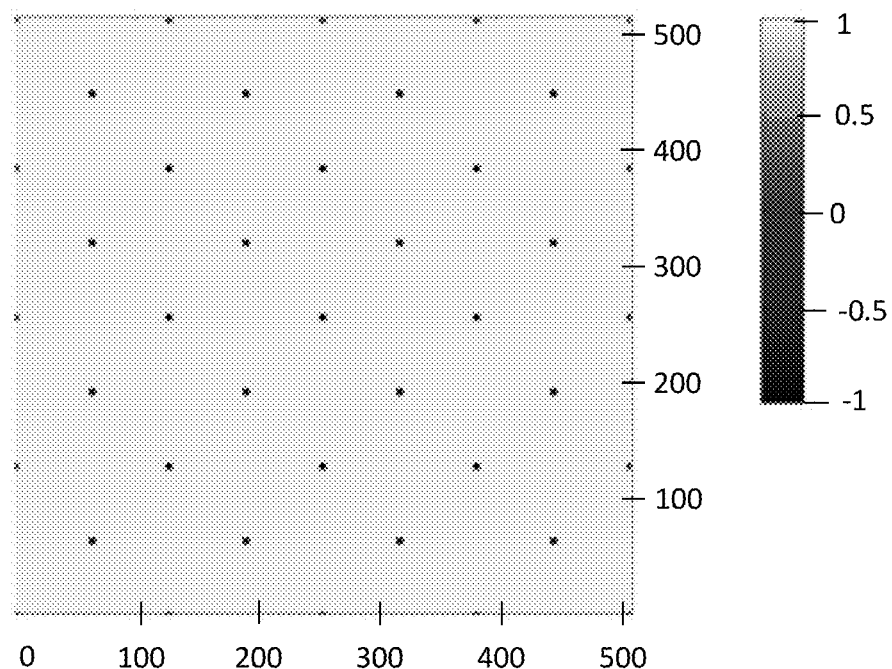
FIGS. 32A and 32B illustrate an idealized surface topographies and a profile thereof (in arbitrary units), respectively, that assist in describing the unique space wherein FOM and Ra ($R_q$) diverge.
Figure 32B:
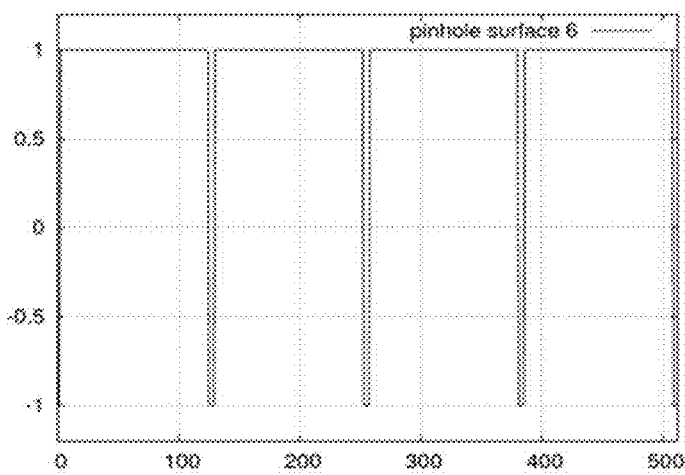
Figure 33A:
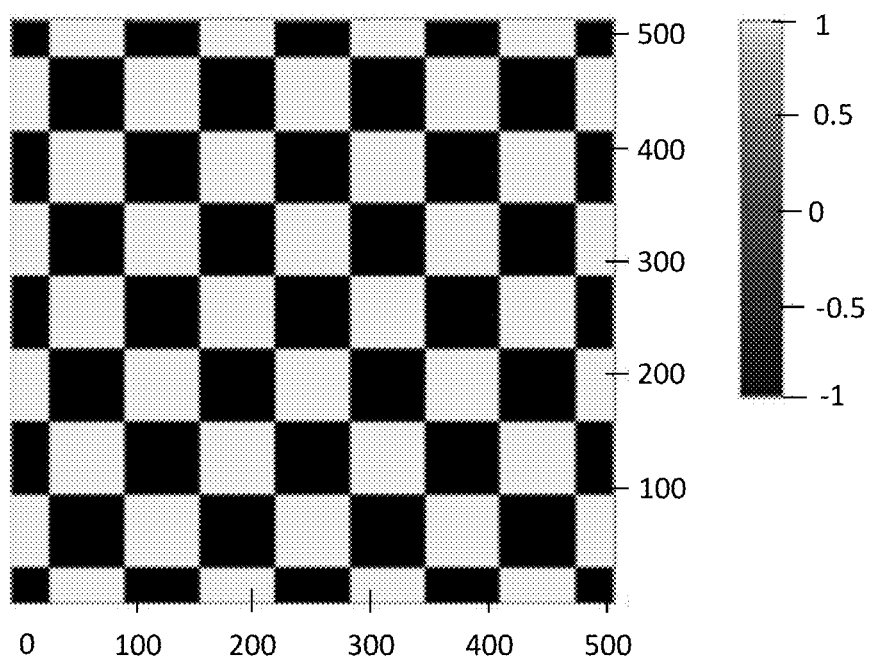
FIGS. 33A and 33B illustrate another idealized surface topographies and a profile thereof (in arbitrary units), respectively, that assist in describing the unique space wherein FOM and Ra ($R_q$) diverge.
Figure 33B:
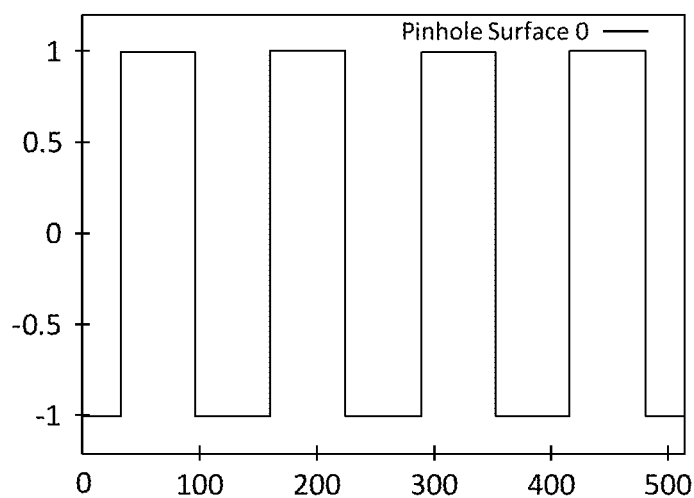
Figure 34A:
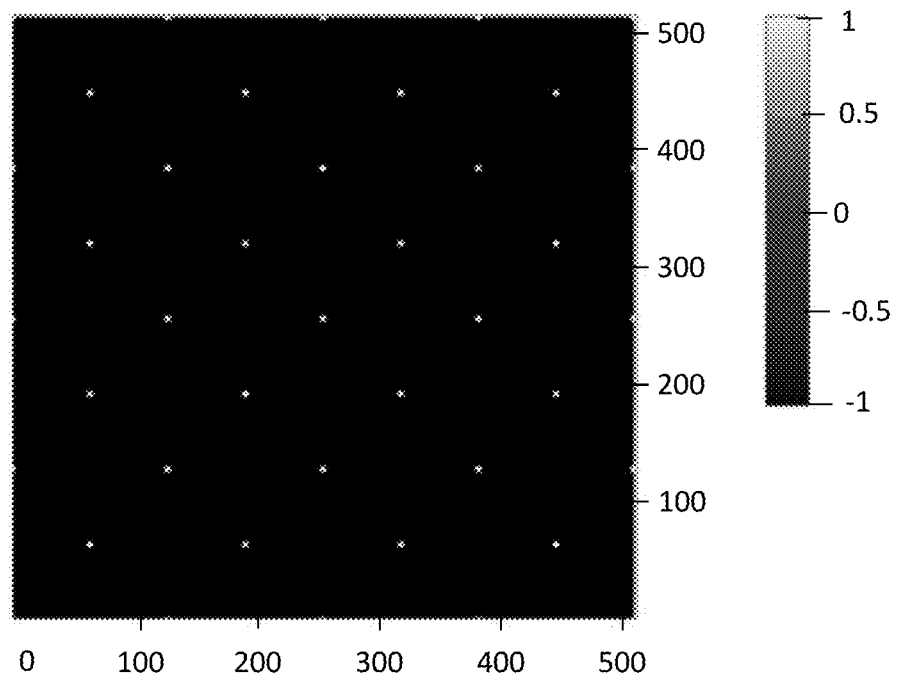
FIGS. 34A and 34B illustrate still another idealized surface topographies and a profile thereof (in arbitrary units), respectively, that assist in describing the unique space wherein FOM and Ra ($R_q$) diverge.
Figure 34B:
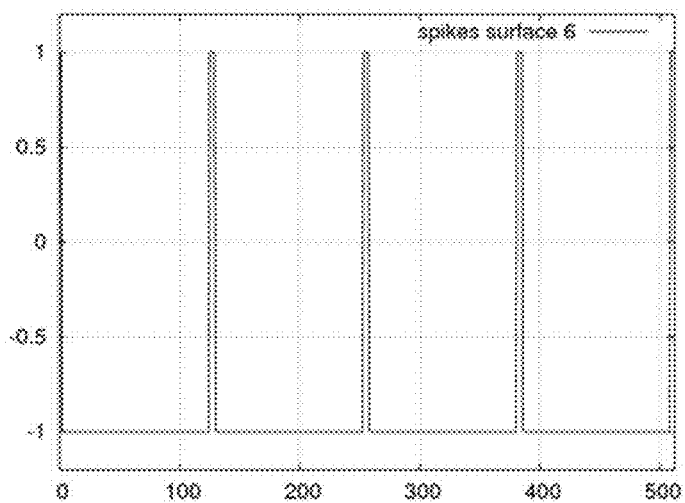

Peak surface voltage in kilovolts for the samples is depicted in FIG. 29, shown with 95% confidence limits. The samples are referenced along the bottom (x-axis) as C0 through C5, where C0 refers to a control sample that did not undergo etching, and where C1 through C5 refer to the first through fifth etchants. It should be apparent from FIG. 29 that all five etchants had a noticeable effect on electrostatic charging. However, it should also be noted that the samples etched with an inorganic acid and an organic solvent (ammonium fluoride and acetic acid, respectively), produced significantly better results that etchants 1 through 3.

In addition to voltage testing, 50 millimeter×50 millimeter samples of the etched glass were tested for haze and transmittance using a Haze-Gard Plus instrument, and the data is presented in Table 9 below. In this instance clarity was a measured quantity obtained directly from the Haze-Gard instrument and not a subjective grading as previously performed. The samples were also measured for Ra, Rq correlation length T. The data were also used to calculate FOM for m=2.

TABLE 9

| Sample | $R_a$ (nm) | $R_q$ (nm) | T (nm) | FOM(2) | Haze | Transmittance | Clarity |
|---|---|---|---|---|---|---|---|
| C0 | 0.28 | 0.34 | 6.20 | 0.77 | 0.12 | 94.3 | 100 |
| C1 | 0.68 | 0.85 | 18.77 | 0.61 | 0.10 | 94.3 | 100 |
| C2 | 0.57 | 0.72 | 14.97 | 0.64 | 0.07 | 94.3 | 100 |
| C3 | 1.02 | 3.93 | 177.76 | 0.70 | 0.12 | 94.3 | 100 |
| C4 | 7.49 | 17.07 | 357.34 | 0.66 | 1.08 | 94.3 | 99.8 |
| C5 | 42.4 | 54.92 | 283.40 | 0.22 | 17.3 | 94.3 | 99.8 |

As is apparent from Table 9, all the sample sets exhibited good haze performance except for sample set C5. Good haze performance from the control samples, C0, was expected, since the surfaces were pristine and untreated. Sample sets C1 through C4 exhibit some improvement in electrostatic charging performance, as represented by a reduction in peak voltage when compared to the control sample set C0. However, sample set C5, while showing the greatest improvement in peak voltage reduction, also showed a high haze value. Visual examination of the C5 samples revealed noticeable haze. The high haze value for C5 compared to the results attributable for earlier surface treatment with comparable solutions used for light guide substrates can be attributed to the differences in glass compositions, further reinforcing the need to adapt the chemistry to account for differences in glass composition.

For these data depicted in FIGS. 28A-F and 29, a series of plots are shown in FIGS. 30A, 30B, 31A, 31B demonstrating the correlation between the electrostatically-induced voltage and FOM for specific values of m, $h_t$ ("thr"), and standoff δ ("offset"). Correlation coefficients ($R^2$) are greater than 0.75 indicating substantial correlative value to the metric.

To optimize the correlative value of a given topographical metric, it is helpful to explore the impact of various mathematical parameters going into its calculation, such as m, $h_t$, and δ. In the contour plots depicted in FIGS. 31A, 31B, the variation in the correlation coefficient as a function of $h_t$ and δ for two values of m (FOM2, FOM6) is highlighted. In the plots, the x-axis "1−threshold" equates to (1−$h_t$), and the y-axis "offset" equates to δ. For these particular topographies, the shaded regions represent a selection of $h_t$ and δ values that tend to maximize the strength of the correlation. The black dots indicate examples of particularly high high correlation points.

The foregoing analysis shows that choosing the right $h_t$ is a stronger factor than δ in having FOM correlate and predict an electrostatic charging response. Typical values of $h_t$ might range from 0.7 to 0.9, while δ ranges from 0.5 to 2.0, and m=2 provides a higher $R^2$ value than m=6, though the fit of FOM2 to electrostatic charge data is somewhat eccentric. As with any topographical metric, the selection of "best-fitting" parameters like threshold heights may be influenced by specific topographical feature dimensions, such that appropriate values can be chosen for a given surface texture with some judgment. This practice can even be performed when calculating $R_a$ on a surface containing features, since an underlying parameter in the calculation is the selection of a suitable image size (e.g., for $R_a$ to be meaningful, one needs an image suitable to capture the features of interest. That is, if one is trying to calculate the roughness of a range of mountains, it is inappropriate to use data zoomed in on one of the mountainsides.

The unique space wherein FOM and $R_a$ ($R_q$) diverge can be readily described using the idealized topographies shown in FIGS. 32A, 32B, 33A, 33B, 34A and 34B. FIGS. 32A-34B illustrate alternately pairs of surface features in a surface plane (x-y plane), and a corresponding slice in the vertical (height) plane along the x-axis (height profile on the z-axis).

For a given $R_a$ being held constant, FOM can vary almost independently from the limit of "pinholes" to "spikes" simply by varying the lateral feature size. Likewise, at a given FOM (i.e. contact-area), $R_a$ can vary almost independently by simply increasing the depth of the pinholes (or the height of the spikes). When short, narrow spikes are mixed with random roughness, it is also likely to create a scenario where the contribution of the spikes will hardly be detected in the calculation of $R_a$. However, in all situations a surface with a multitude of sharp spikes providing contact separation will anticipate a much better electrostatic charging response than a surface featuring pinholes or random roughness alone.

Figure 35:
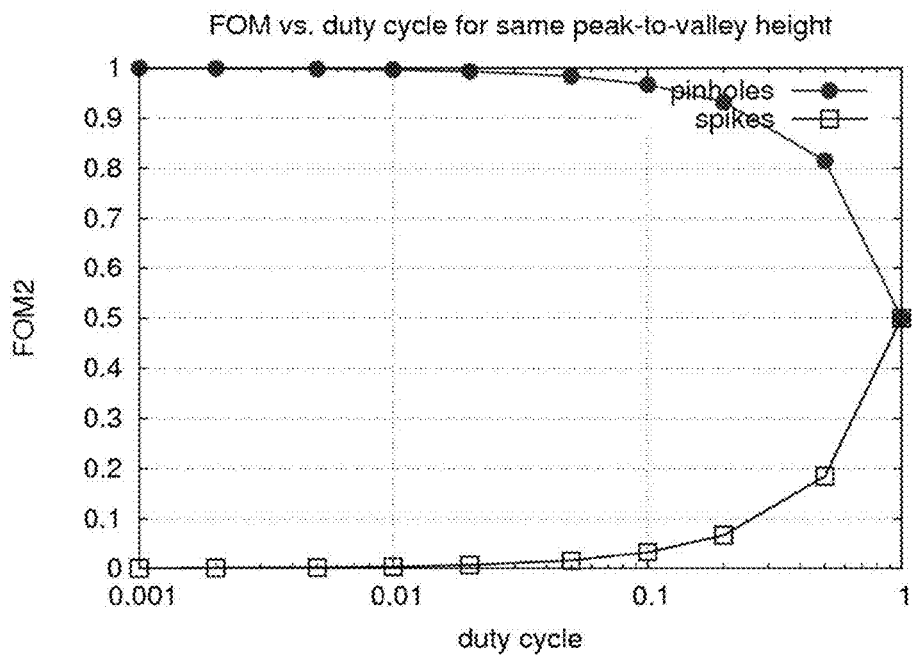
FIG. 35 is a graphical illustration of FOM vs. duty cycle for the idealized surface topographies of FIGS. 32A through 34B, the surface having a constant roughness $R_a$ (or $R_q$) and showing the relative dependence of FOM on surface area and independence from roughness.
Figure 36:
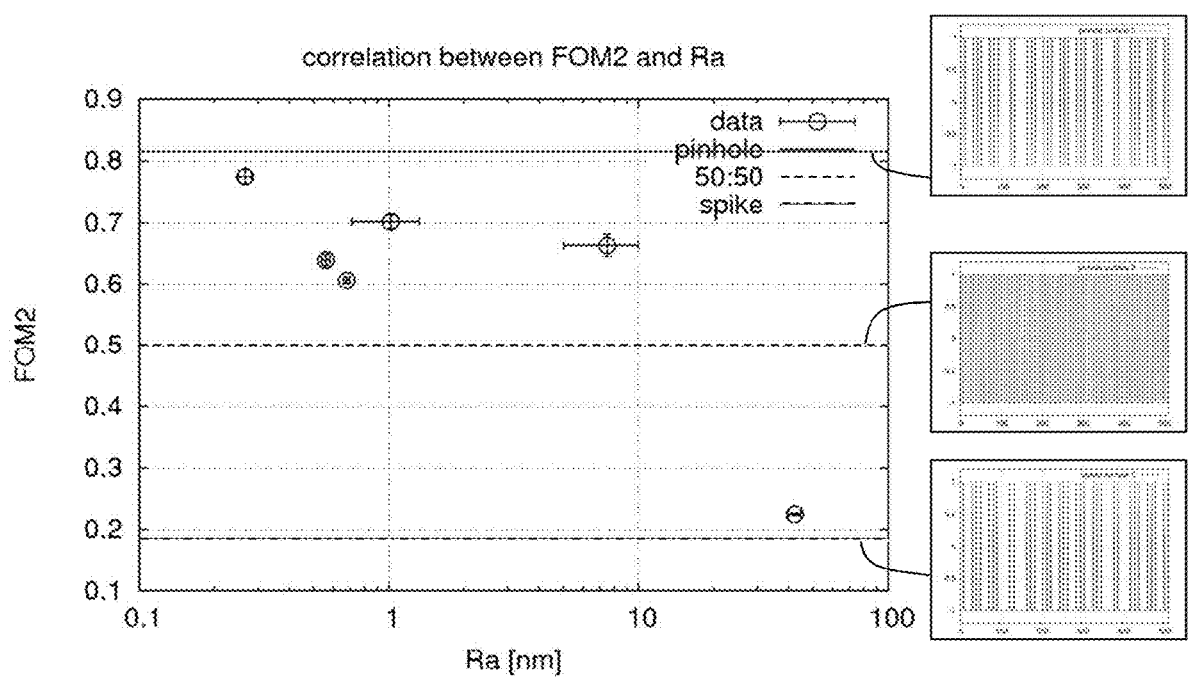
FIG. 36 is a graphical illustration of FOM as a function of roughness ($R_a$) showing the independence of FOM from roughness.

This is illustrates graphically in FIGS. 35 and 36. FIG. 35 depicts FOM (m=2) as the "duty cycle" of the idealistic features (waveforms) depicted in FIGS. 32b, 33B and 34B vary (essentially, as the peaks broaden). The top curve shows the progression of a high FOM (m=2) as it varies from 1 toward a midpoint 0.5, whereas the bottom curve shows the progression of a low FOM (m=2) as it varies from zero toward a midpoint 0.5. The plot shows that for a constant peak-to-valley height (roughness), as the peaks broaden (and hence the contact area between the substrate and a contacting surface increases), the FOM varies. On the other hand, FIG. 36 shows that for a broad range of roughness, for each the conditions of FIG. 35 (varying duty cycle), the FOM (m=2), is constant, illustrating that FOM is independent of roughness.

Figure 37:
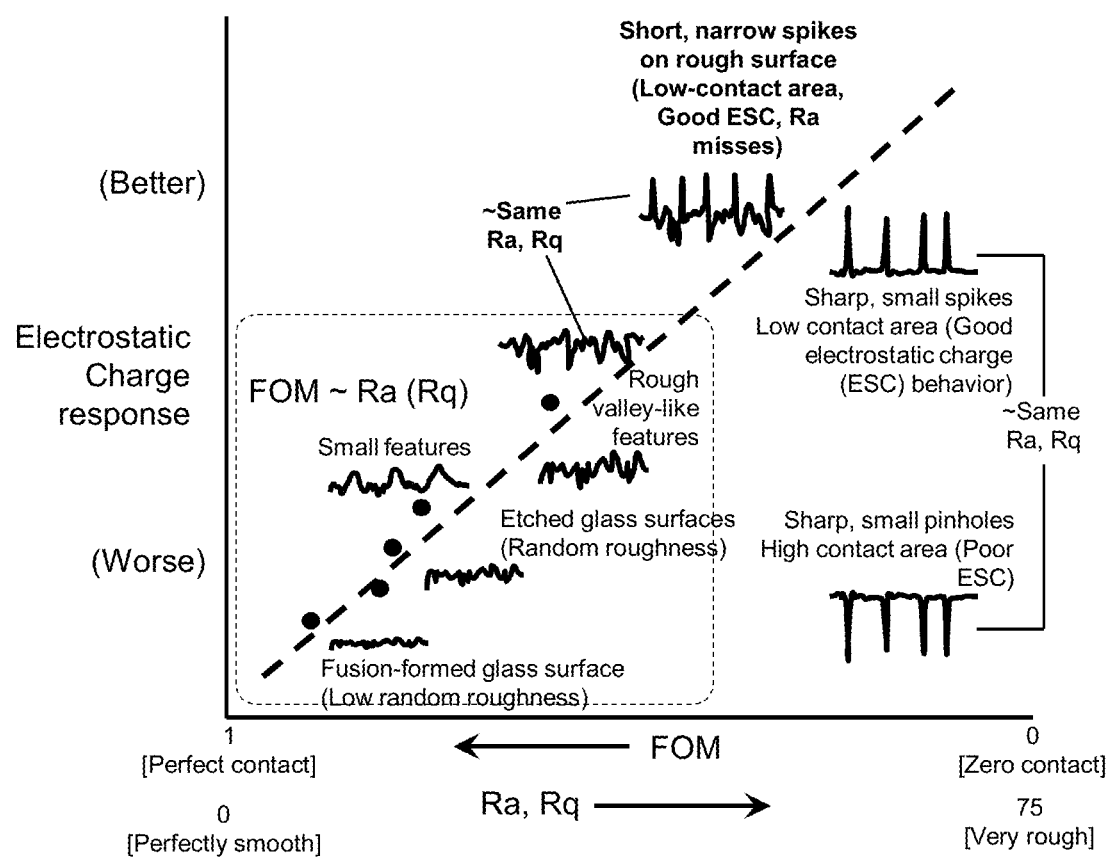
FIG. 37 is a schematic illustration showing electrostatic charge response as a function of FOM and highlighting examples where roughness ($R_a$ or $R_q$) is insufficient and/or doesn't uniquely describe contact-area/electrostatic charge reduction.

As a whole, the variety of FOM and $R_a$ ($R_q$) responses are depicted schematically in FIG. 37, showing a regime where FOM & $R_a$ ($R_q$) mostly correlate well, but also highlighting the topographies where $R_a$ would fail to correlate with electrostatic charging response.

For the embodiments described above, both $R_a$ ($R_q$) actually still correlate with electrostatic charging response, and cross-correlate with FOM. This happens to be true for the surface topographies on these particular embodiments. However, it is not true as a rule, and there are clearly topographies for which FOM and $R_a$ ($R_q$) will diverge. In these instances, FOM will serve as a better correlative descriptor for reduced contact area.

It will be apparent to those skilled in the art that various modifications and variations can be made to disclosed embodiments without departing from the spirit and scope of the disclosure. Thus it is intended that the present disclosure cover the modifications and variations of these embodiments provided they come within the scope of the appended claims and their equivalents.

What is claimed is:

1. A substrate comprising at least one textured major surface comprising a figure of merit FOM in a range from greater than zero to about 0.78, wherein FOM is calculated as $$FOM = \frac{CA \cdot \delta^m}{N} \times \sum_{i=1}^{N} \frac{1}{\Delta_i^m} \text{ and}$$

$$\Delta_i = \begin{cases} h_t - h_i + \delta & h_i \leq h_t \\ h_t + \delta & h_i > h_t \end{cases},$$

where δ represents a minimum distance between a contacted area of the textured major surface with a contact plane for which 0.1≤δ≤10 nm, Δ represents the extent of separation from the contact plane, CA is the contact area given by the number of pixels for which $h_i \geq h_t$, $h_i$ represents the surface height data for N surface height elements, $h_t$ represents a threshold height defining the contribution of uppermost heights on the textured surface that come into contact with the contact plane for which 0.5≤$h_t$≤0.999, and m weights the importance of separation distance for pixels not contacting the contact plane for which m is a whole number in a range from 2 to 6.

2. The substrate according to claim 1, wherein the substrate comprises a transmittance equal to or greater than 94%.

3. The substrate according to claim 1, wherein the substrate comprises a haze equal to or less than 6%.

4. The substrate according to claim 3, wherein the haze is equal to or less than 1%.

5. The substrate according to claim 1, wherein an average roughness $R_a$ of the textured surface is 0.4≤$R_a$≤10 nm.

6. The substrate according to claim 1, wherein a correlation length T of the surface texture is equal to or less than 150 nm.

7. The substrate according to claim 6, wherein an RMS roughness $R_q$ of the textured surface is 5 nm≤$R_q$≤75 nm.

8. The substrate according to claim 1, wherein the substrate is a glass substrate.

9. The substrate according to claim 1, wherein m is 2.

10. The substrate according to claim 1, wherein m is 6.

11. The substrate according to claim 1, wherein $0.1 \leq \delta \leq 2$ nm.

12. The substrate according to claim 11, wherein $0.5 \leq \delta \leq 2$ nm.

13. The substrate according to claim 1, wherein $0.75 \leq h_r \leq 0.99$.

14. The substrate according to claim 1, wherein $0.7 \leq h_r \leq 0.9$.

15. The substrate according to claim 1, wherein the FOM is in a range from 0.22 to 0.77.

16. The substrate according to claim 15, wherein the FOM is in a range from 0.61 to 0.77.

17. The substrate according to claim 1, wherein the substrate comprises a transmittance in a range from greater than 94% to 100%.

\* \* \* \* \*

UNITED STATES PATENT AND TRADEMARK OFFICE
CERTIFICATE OF CORRECTION

| | |
|---|---|
| PATENT NO. | : 10,698,151 B2 |
| APPLICATION NO. | : 16/385740 |
| DATED | : June 30, 2020 |
| INVENTOR(S) | : James Patrick Hamilton et al. |

It is certified that error appears in the above-identified patent and that said Letters Patent is hereby corrected as shown below:

On the Title Page

On page 2, in Column 2, item (56), Other Publications, Line 5, delete "Office Patent." and insert -- Patent Office. --, therefor.

On page 2, in Column 2, item (56), Other Publications, Line 12, delete "blacklight" and insert -- backlight --, therefor.

Signed and Sealed this
Third Day of November, 2020

Andrei Iancu
*Director of the United States Patent and Trademark Office*